US008379003B2

(12) United States Patent
Kawaguchi et al.

(10) Patent No.: US 8,379,003 B2
(45) Date of Patent: Feb. 19, 2013

(54) DISPLAY DEVICE AND WIRING ROUTING METHOD

(75) Inventors: Hidehiro Kawaguchi, Kanagawa (JP); Masato Doi, Kanagawa (JP); Toshiaki Kanemitsu, Kanagawa (JP); Makoto Natori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 12/183,959

(22) Filed: Jul. 31, 2008

(65) Prior Publication Data

US 2009/0033644 A1 Feb. 5, 2009

(30) Foreign Application Priority Data

Aug. 3, 2007 (JP) ................................ 2007-203530

(51) Int. Cl.
*G06F 3/038* (2006.01)

(52) U.S. Cl. ........... 345/205; 345/87; 345/100; 349/150

(58) Field of Classification Search .................. 345/204, 345/205, 87, 100; 349/139, 149, 150, 151, 349/152, 56, 84

See application file for complete search history.

(56) References Cited

U.S. PATENT DOCUMENTS

| | | | | |
|---|---|---|---|---|
| 5,003,302 | A * | 3/1991 | Richard et al. | 345/205 |
| 5,467,210 | A * | 11/1995 | Kishigami | 349/150 |
| 5,657,056 | A * | 8/1997 | Izumi et al. | 345/205 |
| 5,677,712 | A * | 10/1997 | Murahashi | 345/205 |
| 6,232,938 | B1 * | 5/2001 | Tsuchida et al. | 345/88 |
| 6,256,024 | B1 * | 7/2001 | Maekawa | 345/205 |
| 6,407,508 | B1 * | 6/2002 | Kawada et al. | 315/169.3 |
| 6,590,553 | B1 * | 7/2003 | Kimura et al. | 345/92 |
| 6,633,284 | B1 * | 10/2003 | Hanari | 345/204 |
| 6,825,826 | B1 * | 11/2004 | Mikami et al. | 345/98 |
| 7,002,657 | B2 * | 2/2006 | Hirosue et al. | 349/149 |
| 7,015,882 | B2 * | 3/2006 | Yumoto | 345/76 |
| 7,259,740 | B2 * | 8/2007 | Haga et al. | 345/98 |
| 7,808,494 | B2 * | 10/2010 | Lee et al. | 345/206 |
| 2003/0193298 | A1 | 10/2003 | Okada et al. | |
| 2004/0246427 | A1 * | 12/2004 | Iwanaga et al. | 349/149 |
| 2006/0103620 | A1 * | 5/2006 | Joo et al. | 345/98 |
| 2010/0156947 | A1 * | 6/2010 | Moon et al. | 345/690 |

FOREIGN PATENT DOCUMENTS

| | | |
|---|---|---|
| JP | 2-25893 | 1/1990 |
| JP | 09-274451 | 10/1997 |
| JP | 2003-280586 | 10/2003 |

OTHER PUBLICATIONS

Japanese Office Action issued on Jul. 28, 2009, for corresponding Japanese Patent Application JP 2007-203530.

* cited by examiner

*Primary Examiner* — Amare Mengistu
*Assistant Examiner* — Koosha Sharifi-Tafreshi
(74) *Attorney, Agent, or Firm* — K&L Gates LLP

(57) ABSTRACT

A display device for displaying an image using matrix driving includes: an emission element corresponding to each pixel to be displayed, disposed on L lines, with the scanning direction as lines; a display portion whereby the M lines worth of the emission elements are simultaneously driven; and a connection unit for connecting an on-substrate wiring line extracted from the emission element of the display portion externally; with the connection units including connection terminals for connecting each of the on-substrate wiring lines externally, and at least a part of the connection terminals being arrayed two-dimensionally so as to make up M columns; and with each of the M columns worth of the connection terminals being connected with the on-substrate wiring lines which are thinned out (M−1) wiring lines at a time.

13 Claims, 28 Drawing Sheets

| FIG. 10A |
| --- |
| FIG. 10B |

DISPLAY DEVICE AND WIRING ROUTING METHOD

CROSS REFERENCE TO RELATED APPLICATION

The present application claims priority to Japanese Patent Application JP 2007-203530 filed in the Japanese Patent Office on Aug. 3, 2007, the entire contents of which are incorporated herein by reference.

BACKGROUND

The present application relates to a display device and wiring routing method, and particularly, relates to a display device and wiring routing method suitable to be employed in the case of displaying an image using matrix driving.

A simple matrix (passive matrix) method is employed for driving emission elements such as LEDs (Light Emitting Diodes), liquid crystal elements, or the like which are provided on intersecting points by disposing X electrodes and Y electrodes in a grid pattern, and turning on/off these electrodes in accordance with a certain timing. With liquid crystal devices employing the simple matrix method, few electrodes are employed, manufacturing is facilitated, and accordingly, price is less inexpensive as compared to products employing the active matrix method. With a display panel employing the simple matrix method, the emission duration of one pixel at one frame of an image can be expressed as display duration of one frame/number of scan lines.

Description will be made regarding a display device 1 employing an existing simple matrix method with reference to FIG. 1. The display device 1 is configured of a controller 11, display portion 12, data driver 13, and scan driver 14. In response to input of the image data corresponding to an image to be displayed on the display portion 12, the controller 11 controls the data driver 13 and scan driver 14.

With the display portion 12, wiring lines for connecting the outputs from the data driver 13 and scan driver 14 to electrodes included in an emission element 21 are wired around in a vertical and horizontal grid pattern. Image signal wiring lines connected to the output from the data driver 13 will be referred to as data wiring lines, and scan signal wiring lines connected to the output from the scan driver 14 will be referred to as scan wiring lines. Multiple emission elements 21 are provided on an intersection portion between a data wiring line and scan wiring line. The display portion 12 displays an image using emission of the emission element 21 driven by the data driver 13 and scan driver 14.

That is to say, in a case wherein the display portion 12 is monochrome display, data wiring lines equivalent to the number of pixels arrayed in the horizontal direction at one frame are provided in a column manner (vertical direction in FIG. 1), and are connected to the output of the data driver 13. On the other hand, in a case wherein the display portion 12 is full-color display, there is a need to supply signals equivalent to three colors worth of R (Red), G (Green), and B (Blue) to each pixel, and accordingly, data wiring lines which are triple the number of pixels arrayed in the horizontal direction at one frame are provided in a column manner, and are connected to the output of the data driver 13. Also, even in a case wherein the display portion 12 is monochrome display or full-color display, scan wiring lines equivalent to the number of horizontal lines of one frame are provided in a line manner (horizontal direction in FIG. 1), and are connected to the output of the scan driver 14.

With the display portion 12, the emission elements 21 equivalent to the number of pixels are provided in the case of monochrome display, and the emission elements 21 which are triple the number of pixels are provided in the case of full-color display, and each of the emission elements 21 includes a data electrode connected to the output of the data driver 13, and a scan electrode connected to the output of the scan driver 14.

With the display device 1 employing the simple matrix method, LEDs (Light Emitting Diodes) can be employed as the emission elements 21. Also, an arrangement may be made wherein with the display device 1, liquid crystal is employed as the emission elements 21, and a display method such as the STN (Super Twisted Nematic) method, DSTN (Dual-scan Super Twisted Nematic) method, or the like, which are the simple matrix methods, is employed.

In a case wherein each of the emission elements 21 of the display portion 12 is distinguished, each will be referred to as "emission element 21-*n*-*m*", wherein its line is n, and its column is m. Specifically, in FIG. 1, the emission elements 21 provided on the top line of the display portion 122 are referred to as an emission element 21-1-1, emission element 21-1-2, and so on. Similarly, the emission elements 21 provided on the next line are referred to as an emission element 21-2-1, emission element 21-2-2, and so on, and the emission elements 21 further provided on the next line are referred to as an emission element 21-3-1, emission element 21-3-2, and so on. In a case wherein each of the emission elements 21 of the display portion 12 is not distinguished, each will be referred to simply as "emission element 21".

The data driver 13 obtains one line worth of data signals indicating information to be displayed on the display portion 12 at a time, latches (holds) one line worth of the data signals corresponding to the respective pixels internally, performs PWM (Pulse Width Modulation) control based on the latched data signals, converts the data signals into the corresponding current values, and applies electric charge to the data electrode of the emission elements 21 at predetermined timing. Description will be made later regarding the detailed configuration of the data driver 13 with reference to FIG. 2.

The scan driver 14 is configured of shift registers equivalent to the number of horizontal lines, and receives supply of a scan start pulse having the same pulse width as the scan clock at the top of each frame from the controller 11. The pulse width (one cycle of ON/OFF) of the scan clock is equal to display duration of one frame/number of scan lines.

With the respective shift registers of the scan driver 14, the supplied scan start pulse is shifted from the shift register corresponding to the first line to the shift register corresponding to the lower line thereof in order based on the scan clock. Thus, a switching element (e.g., switching transistor) connected to the shift register which receives the ON signal of the scan start pulse is turned to ON, the corresponding line is scanned, and the pixels of the relevant line are lit corresponding to the data signal.

The scan electrodes of the emission elements 21 disposed in a matrix manner at the display portion 12 are common for each line, and while the switching element connected to the scan wiring is ON, the emission elements 21 of the line thereof are lit based on the current value supplied from the data driver 13. ON/OFF action of the scan driver 14 and emission timing for each line will be described later with reference to FIGS. 3 and 4.

FIG. 2 illustrates the further detailed configuration of the data driver 13. There are provided shift registers 41-1 through 41-*a*, latches 42-1 through 42-*a*, comparators 43-1 through 43-*a*, and drivers 44-1 through 44-*a*, which are equivalent to the number of data wiring lines (the number of data wiring lines wired from the data driver 13 is taken as a, here), which are equivalent to the number of pixels arrayed in the horizontal direction at one frame, or triple the number of pixels, and a counter 45 for counting the number of clocks employed for PWM control by the comparators 43-1 through 43-*a*.

Hereafter, in a case wherein the shift registers 41-1 through 41-*a* are not individually distinguished, each will be referred to simply as "shift register 41", and in a case wherein the latches 42-1 through 42-*a* are not individually distinguished, each will be referred to simply as "latch 42". Similarly, in a case wherein the comparators 43-1 through 43-*a* are not individually distinguished, each will be referred to simply as "comparator 43", and in a case wherein the drivers 44-1 through 44-*a* are not individually distinguished, each will be referred to simply as "driver 44".

The shift register 41-1 shifts the image data signal supplied from the controller 11 to the shift register 41-2. The subsequent shift registers of the shift register 41-2 and thereafter similarly supply the image data signal to the next shift register. When image data signals on a certain line, i.e., the signals corresponding to emission intensity of the frame including a pixels of one line, or a sub pixels corresponding to each of RGB making up a pixel, are all transmitted to the shift registers 41-1 through 41-*a*, the shift registers 41-1 through 41-*a* supply the signals thereof to the latches 42-1 through 42-*a* to store (latch) these. Now, sub pixels indicate elements making up a pixel, and at the time of monochrome display, the number of sub pixels is equal to the number of pixels, and at the time of color display, the number of sub pixels is triple the number of pixels.

In response to supply of a data latch clock, the latches 42-1 through 42-*a* supply the stored data signal to the comparators 43-1 through 43-*a* at predetermined timing simultaneously.

The comparator 43 controls the driver 44 which drives the emission elements 21 using PWM (Pulse Width Modulation) control. That is to say, the comparator 43 controls the emission period of the emission elements 21 by controlling duration wherein the driver 44 is ON within a predetermined period (PWM cycle) based on the data signal supplied from the latch 42. The driver 44 drives the emission elements 21 based on the control of the comparator 43. Also, while the emission elements 21 are driven by the comparator 43 and driver 44, the shift register 41 and latch 42 perform transmission and latching of the data of the next line.

Next, description will be made regarding emission timing control of the emission elements 21 and transmission of data with reference to FIGS. 3 through 5.

FIG. 3 illustrates the scan start pulse, scan clock, and the emission timing of each line. The scan clock is a clock for controlling the emission start timing of each line, and in a case wherein the emission duration of each line is T, i.e., in the case of T=display duration of one frame/number of scan lines, the emission start timing of each line is also shifted by T.

When receiving supply of the scan start pulse at the top of each frame from the controller 11, the scan driver 14 counts the scan clock, light-emits the first line by the duration T from point-in-time $t_1$ to point-in-time $t_2$, following which light-emits the second line by the duration T from point-in-time $t_2$ to point-in-time $t_3$, and hereafter, similarly, light-emits the b'th line (b is a positive integer which is equal to or greater than 3 and equal to or less than the number of lines of one frame) by the duration T from point-in-time $t_b$ to point-in-time $t_{(b+1)}$.

Description will be made with reference to FIG. 4 regarding the operation of the scan driver 14 for light-emitting each line the timing described with reference to FIG. 3.

The scan driver 14 is configured of shift registers 61-1 through 61-*c* (c is the number of horizontal lines making up one frame), and switching transistors 62-1 through 62-*c* corresponding to the respective shift registers thereof. When the scan start pulse is supplied to the shift transistor 61-1, the scan start pulse is supplied to the shift register 61-1, the corresponding switching transistor 62-1 is turned ON, and voltage is applied to the respective scan electrodes of the emission elements 21 on the first line. Subsequently, based on the output from the data driver 13 at that time, each of the emission elements 21 on the first line is lit for predetermined duration.

That is to say, as described with reference to FIG. 2, in a case wherein image data signals corresponding to one line are sequentially supplied to the data driver 13, and the data driver 13 can latch only one line worth of image data signals at a time, duration necessary for transmitting one line worth of data signals of image data from the controller 11 to the data driver 13 needs to be equal to or less than T.

Subsequently, after elapse of the duration T from the emission start of the first line, the shift register 61-1 shifts the ON signal corresponding to the scan start pulse to the shift register 61-2, so that the subsequent emission will be on time. The scan start pulse is an ON signal having the Width equivalent to one cycle of the scan clock, so the shift register 61-1 shifts the ON signal (High) corresponding to the scan start pulse to the shift register 61-2, following which receives supply of an OFF signal (Low). Accordingly, at this time, the switching transistor 62-1 is turned OFF. In response to the ON signal corresponding to the scan start pulse, the shift register 61-2 turns on the switching transistor 62-2, thereby applying voltage to the scan electrode of each of the emission elements 21 on the second line. Subsequently, based on the output from the data driver 13 at that time, each of the emission elements 21 is lit for predetermined duration.

Subsequently, after elapse of the duration T from the emission start of each line, the emission of the line thereof is completed, and the ON signal corresponding to the scan start pulse is shifted to the shift registers 61-3 through 61-*c*.

Data transmission to the data driver 13, and the emission timing of each line will be described with reference to FIG. 5. The image data signal on the k'th line (k is a positive integer which is equal to or greater than 1 and also equal to or smaller than the number of lines c making up one frame) is supplied from the controller 11 to the data driver 13. As described above, in a case wherein the emission duration of each line is T, duration necessary for data transmission of one line needs to be equal to or smaller than T. Subsequently, data transmission and latching of the image data signal on the k'th line ends, and at point-in-time $t_{(k+1)}$ after elapse of the duration T from the transmission start point-in-time $t_k$ of the image data signal on the k'th line, the k'th line is lit, and supply of the image data signal on the k+1'th line is started. Subsequently, data transmission and latching of the image data signal on the k+1'th line ends, and at point-in-time $t_{(k+2)}$ after elapse of the duration T from the transmission start point-in-time $t_{(k+1)}$ of the image data signal on the k+1'th line, the k+1'th line is lit, and supply of the image data signal on the k+2'th line is started. Subsequently, data transmission and latching of the image data signal on the k+2'th line ends, and at point-in-time $t_{(k+3)}$ after elapse of the duration T from the transmission start point-in-time $t_{(k+2)}$ of the image data signal on the k+2'th line, the k+2'th line is lit, and supply of the image data signal on the k+3'th line is started. Hereafter, similarly, while a certain line is lit up to the last line of the frame thereof, the image data signal on the next line is supplied.

In FIG. 5, with the emission cycle of each line as fH, the transmission cycle of data and the horizontal frequency of the display of the display portion 12 also become fH, and With the number of pixels of one horizontal line as a, and the number of gradations at the emission of each pixel as D, an emission clock frequency fp is represented with fp=fH×D, and a data transmission clock frequency fd is represented with fd=fH×a.

Specific description of the overall operation of the display device 1 described above will be as follows.

First, the image data on the first line is transmitted to the shift register 41 of the data driver 13 from the controller 11, and is latched at the latch 42. Subsequently, in response to supply of the scan start pulse, the scan driver 14 turns on the first column of the display portion 12, i.e., the switching transistor 62-1 connected to the scan electrodes of the column of the emission element 21-1-1, emission element 21-1-2, and so on by the period of display duration of one frame/number of scan lines=duration T.

Subsequently, at that time, the first column of the display portion 12, i.e., the emission element 21-1-1, emission element 21-1-2, and so on are lit with the brightness corresponding to the ON duty of the driver 44 controlled by each comparator 43 of the data driver 13. While emission of the first column of the display portion 12 is performed, the image data on the second line is transmitted to the shift register 41 of the data driver 13, and is latched at the latch 42.

Subsequently, at the next timing thereof the scan driver 14 turns on the second column of the display portion 12, i.e., the switching transistor 62-2 connected to the scan electrodes of the column of the emission element 21-2-1, emission element 21-2-2, and so on during the period of the duration T. Subsequently, at that time, the second column of the display portion 12, i.e., the emission element 21-2-1, emission element 21-2-2, and so on are lit with the brightness corresponding to the ON duty of the driver 44 controlled by each comparator 43 of the data driver 13. While emission of the second column of the display portion 12 is performed, the image data on the third line is transmitted to the shift register 41 of the data driver 13, and is latched at the latch 42.

Hereafter, similarly, the switching transistor 62 connected to the scan electrodes on the k'th column is turned on during the period of the duration T, and at that time, the k'th column of the display portion 12 is lit with the brightness corresponding to the ON duty of the driver 44 controlled by each comparator 43 of the data driver 13. Subsequently, while emission of the k'th column of the display portion 12 is performed, the image data on the k+1'th line is transmitted to the shift register 41 of the data driver 13, and is latched at the latch 42. Subsequently, such processing is repeated one line at a time, thereby displaying the image data of one frame.

With the simple matrix method described with reference to FIGS. 1 through 5, the configuration is simple, so the panel can be manufactured inexpensively, but as described above, the emission duration of one pixel at one frame of an image is display duration of one frame/number of scan lines, and accordingly, sufficient brightness may not be able to be obtained. Accordingly, with the flat display field, not the simple matrix method but the active matrix method, such as TFT (Thin Film Transistor), has been frequently employed.

With the active matrix method, signal input is performed as to only the line being scanned, but a TFT is provided for each emission element of each of RGB included in one pixel, whereby applied voltage can be maintained even during a non-scan period. That is to say, the active matrix method is a hold-type driving display method whereby each of the sub pixels can maintain constant brightness up to the next scanning.

Heretofore, of display devices performing matrix driving, in order to perform halftone display, some display devices are configured to apply a scanning signal to multiple line electrodes simultaneously in a duplicated manner (see Japanese Unexamined Patent Application Publication No. 2-25893).

Also, some display devices are configured to obtain sufficient brightness even using the simple matrix method by dividing a display portion into two in the horizontal direction, providing driving drivers of the data electrodes of two regions separately, and light-emitting each of the two regions one line at a time at the same timing, i.e., by light-emitting two lines on one screen simultaneously (see Japanese Patent Application No. 2003-280586).

SUMMARY

Due to improvement in broadcasting, communication, information technology, and so forth, currently, there is a trend toward increasingly more information amount of pictures and images, and accordingly there is great demand for improvement in resolution (number of pixels) regarding display devices. For example, with televisions, a specification With display performance of 1920×1080 which is referred to as FHD (Full High Definition) is becoming standard as compared to existing 640 (or 854)×480 pixels which is referred to as SD (Standard Definition). For example, with an existing liquid crystal display device or the like, in the case of realizing FHD resolution with color display, there is a need to provide 5760 data wiring lines, and 1080 scan wiring lines.

Also, in order to improve the number of pixels or display quality or the like, there is a tendency wherein the number of wiring lines on a substrate made up of, for example, glass or the like, on which the emission elements 21 are mounted, increases.

It has been recognized that there is a need to enable distance between terminals to be ensured even in the case of having a great number of wiring lines on a substrate.

According to an embodiment, a display device for displaying an image using matrix driving includes: an emission element corresponding to each pixel to be displayed, disposed on L lines, with the scanning direction as lines; a display portion whereby the M lines worth of the emission elements are simultaneously driven; and a connection unit for connecting an on-substrate wiring line extracted from the emission element of the display portion externally; with the connection units including connection terminals for connecting each of the on-substrate wiring lines externally, and at least a part of the connection terminals being arrayed two-dimensionally so as to make up M columns; and with each of the M columns worth of the connection terminals being connected with the on-substrate wiring lines which are thinned out (M−1) wiring lines at a time.

The emission elements provided on the same line may be connected to the connection terminals on the same column of the M columns worth of the connection terminals.

The display device may further include: a scanning driving unit configured to scan and drive the emission elements; and M data signal driving units configured to drive the emission means to be scanned and driven by the scanning driving unit to display a predetermined image; with the connection terminals on the same column of the M columns worth of the connection terminals being connected to the same data signal driving unit of the M data signal driving units.

The connection units may be connected to a plurality of TAB substrates; with a single TAB substrate being connected to the connection terminals on the same column of the M columns worth of the connection terminals.

According to an embodiment, with a wiring routing method of a display device for displaying an image using matrix driving, the display device includes: an emission element corresponding to each pixel to be displayed, disposed on L lines, with the scanning direction as lines; a display portion whereby the M lines worth of the emission elements are simultaneously driven; and a connection unit for connecting an on-substrate wiring line extracted from the emission element of the display portion externally; with the connection units including connection terminals for connecting each of the on-substrate wiring lines externally, and at least a part of the connection terminals being arrayed two-dimensionally so as to make up M columns; and with each of the M columns worth of the connection terminals being connected with the on-substrate wiring lines which are thinned out (M−1) wiring lines at a time.

According to an embodiment, a display device for displaying an image using matrix driving includes: an emission element corresponding to each pixel to be displayed, disposed on L lines, with the scanning direction as lines; a display portion whereby the M lines worth of the emission elements are simultaneously driven; and a connection unit for connecting an on-substrate wiring line extracted from the emission element of the display portion externally: with the connection units including connection terminals for connecting each of the on-substrate wiring lines externally, and at least a part of the connection terminals being arrayed two-dimensionally so as to make up M columns; and with the emission elements provided on the same line being connected to the connection terminals on the same column of the M columns worth of the connection terminals.

With N as an integer which is $0 \leqq N \leqq \{(\text{number of scanning lines}-1)/M\}$, and a as an integer of $1<a \leqq M$, the connection terminals included in the a'th column of the M columns worth of the connection terminals are connected to the emission elements on the (MN+a)'th line.

The display device may further include: a scanning driving unit configured to scan and drive the emission elements; and M data signal driving units configured to drive the emission elements to be scanned and driven by the scanning driving unit to display a predetermined image; with the connection terminals on the same column of the M columns worth of the connection terminals being connected to the same data signal driving unit of the M data signal driving units.

The connection units may be connected to a plurality of TAB substrates; with a single TAB substrate being connected to the connection terminals on the same column of the M columns worth of the connection terminals.

According to an embodiment, with a wiring routing method of a display device for displaying an image using matrix driving, the display device includes: an emission element corresponding to each pixel to be displayed, disposed on L lines, with the scanning direction as lines; a display portion whereby the M lines worth of the emission elements are simultaneously driven; and a connection unit for connecting an on-substrate wiring line extracted from the emission element of the display portion externally; with the connection units including connection terminals for connecting each of the on-substrate wiring lines externally, and at least a part of the connection terminals being arrayed two-dimensionally so as to make up M columns; and with the emission elements provided on the same line being connected to the connection terminals on the same column of the M columns worth of the connection terminals.

With the above-described configuration, an emission element corresponding to each pixel to be displayed is disposed on L lines with the scanning direction as lines, the M lines worth of the emission elements are simultaneously driven, an on-substrate wiring line extracted from the emission element of the display portion is connected externally, of the connection terminals for connecting each of the on-substrate wiring lines externally at least a part of the connection terminals is arrayed two-dimensionally so as to make up M columns, and the emission elements provided on the same line is connected to the connection terminals on the same column of the M columns worth of the connection terminals.

An arrangement may be made wherein the display device is an independent device, or may be a block for performing display processing of a television receiver or information processing device.

According to the above-described configurations, the emission elements can connect to an external driver or the like, and particularly, even in a case wherein there are many wiring lines on the substrate, distance between terminals can be ensured.

Additional features and advantages are described herein, and will be apparent from the following Detailed Description and the figures.

DETAILED DESCRIPTION

Figure 1:
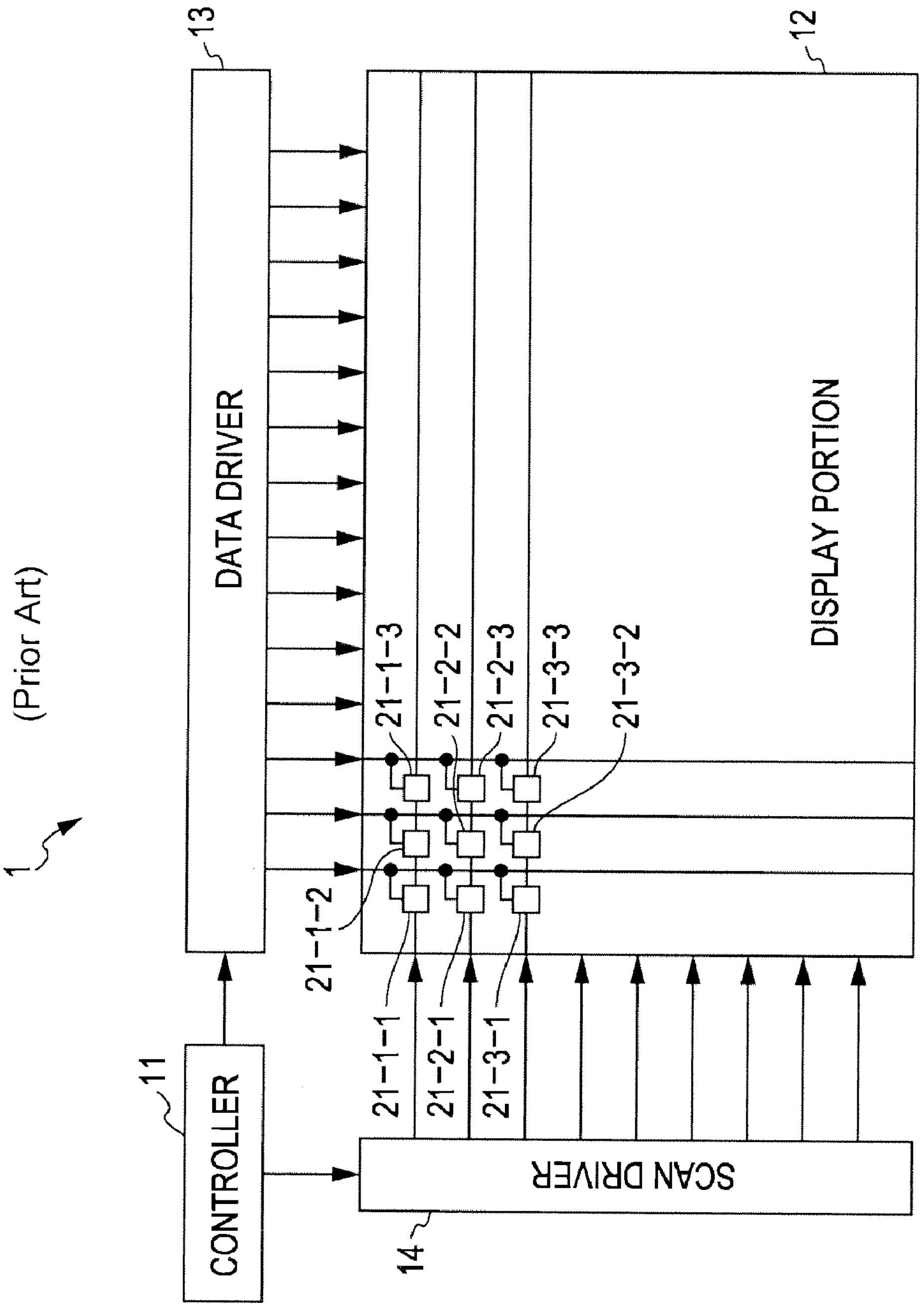
FIG. 1 (Prior Art)
FIG. 1 is a diagram illustrating the configuration of an existing display device.

Before describing an embodiment, the correspondence between the features of the claims and the specific elements disclosed in an embodiment, with or without reference to drawings, is discussed below. This description is intended to assure that an embodiment supporting the claimed application is described in this specification. Thus, even if an element in the following embodiment is not described as relating to a certain feature, that does not necessarily mean that the element does not relate to that feature of the claims. Conversely, even if an element is described herein as relating to a certain feature of the claims, that does not necessarily mean that the element does not relate to the other features of the claims.

A display device according to an embodiment is a display device for displaying an image using matrix driving, comprising: an emission element (e.g., emission element 21) corresponding to each pixel to be displayed, disposed on L lines, with the scanning direction as lines; a display portion (e.g., image display area) whereby the M lines worth of the emission elements are simultaneously driven; and a connection unit (e.g., connection portion 321) for connecting an on-substrate wiring line extracted from the emission element of the display portion externally; with the connection units including connection terminals (e.g., electrode pads 311) for connecting each of the on-substrate wiring lines eternally, and at least a part of the connection terminals being arrayed two-dimensionally so as to make up M columns; and with each of the M columns worth of the connection terminals (e.g., electrode pad arrays 331) being connected with the on-substrate wiring lines which are thinned out (M−1) wiring lines at a time.

An arrangement may be made wherein the emission elements provided on the same line are connected to the connection terminals on the same column of the M columns worth of the connection terminals (e.g., electrode pad arrays 331).

An arrangement may be made wherein the display device further includes: a scanning driving unit (e.g., scan driver 126 shown in FIG. 6) configured to scan and drive the emission elements; and M data signal driving units (e.g., #1 data driver 123, #2 data driver 124, and #3 data driver 125) configured to drive the emission means to be scanned and driven by the scanning driving unit to display a predetermined image; with the connection terminals on the same column of the M columns worth of the connection terminals (e.g., electrode pad arrays 331) being connected to the same data signal driving unit of the M data signal driving units.

An arrangement may be made wherein the connection units are connected to multiple TAB substrates (e.g., FPC, etc.); with a single TAB substrate being connected to the connection terminals on the same column of the M columns worth of the connection terminals.

A wiring routing method according to the above configuration is a wiring routing method of a display device for displaying an image using matrix driving, the display device comprising: an emission element (e.g., emission element 21) corresponding to each pixel to be displayed, disposed on L lines, with the scanning direction as lines; a display portion (e.g., image display area) whereby the M lines worth of the emission elements are simultaneously driven; and a connection unit (e.g., connection portion 321) for connecting an on-substrate wiring line extracted from the emission element of the display portion externally; with the connection units including connection terminals (e.g., electrode pads 311) for connecting each of the on-substrate wiring lines externally, and at least a part of the connection terminals being arrayed two-dimensionally so as to make up M columns; and with each of the M columns worth of the connection terminals (e.g., electrode pad arrays 331) being connected with the on-substrate wiring lines which are thinned out (M−1) wiring lines at a time.

A display device according to an embodiment is a display device for displaying an image using matrix driving, comprising: an emission element (e.g., emission element 21) corresponding to each pixel to be displayed, disposed on L lines, with the scanning direction as lines; a display portion (e.g., image display area) whereby the M lines worth of the emission elements are simultaneously driven; and a connection unit (e.g., connection portion 321) for connecting an on-substrate wiring line extracted from the emission element of the display portion externally; with the connection units including connection terminals (e.g., electrode pads 311) for connecting each of the on-substrate wiring lines externally, and at least a part of the connection terminals being arrayed two-dimensionally so as to make up M columns; and with the emission elements provided on the same line being connected to the connection terminals on the same column of the M columns worth of the connection terminals (e.g., electrode pad arrays 331).

An arrangement may be made wherein with N as an integer which is $0 \leqq N \leqq \{(\text{number of scanning lines}-1)/M\}$, and a as an integer of $1 < a \leqq M$, the connection terminals included in the a'th column of the M columns worth of the connection terminals are connected to the emission elements on the (MN+a)'th line.

An arrangement may be made wherein the display device further includes: a scanning driving unit (e.g., scan driver 126 shown in FIG. 6) configured to scan and drive the emission elements; and M data signal driving units (e.g., #1 data driver 123, #2 data driver 124, and #3 data driver 125) configured to drive the emission elements to be scanned and driven by the scanning driving unit to display a predetermined image; with the connection terminals on the same column of the M columns worth of the connection terminals (e.g., electrode pad arrays 331) being connected to the same data signal driving unit of the M data signal driving units.

An arrangement may be made Wherein the connection units are connected to multiple TAB substrates (e.g., FPC, etc.); with a single TAB substrate being connected to the connection terminals on the same column of the M columns worth of the connection terminals.

A wiring routing method according an embodiment is a wiring routing method of a display device for displaying an image using matrix driving, the display device comprising: an emission element (e.g., emission element 21) corresponding to each pixel to be displayed, disposed on L lines, with the scanning direction as lines; a display portion (e.g., image display area) whereby the M lines worth of the emission elements are simultaneously driven; and a connection unit (e.g., connection portion 321) for connecting an on-substrate wiring line extracted from the emission element of the display portion externally; with the connection units including connection terminals (e.g., electrode pads 311) for connecting each of the on-substrate wiring lines externally, and at least a part of the connection terminals being arrayed two-dimensionally so as to make up M columns; and with the emission elements provided on the same line being connected to the connection terminals on the same column of the M columns worth of the connection terminals (e.g., electrode pad arrays 331).

Description will be made below regarding embodiments with reference to the drawings.

Figure 6:
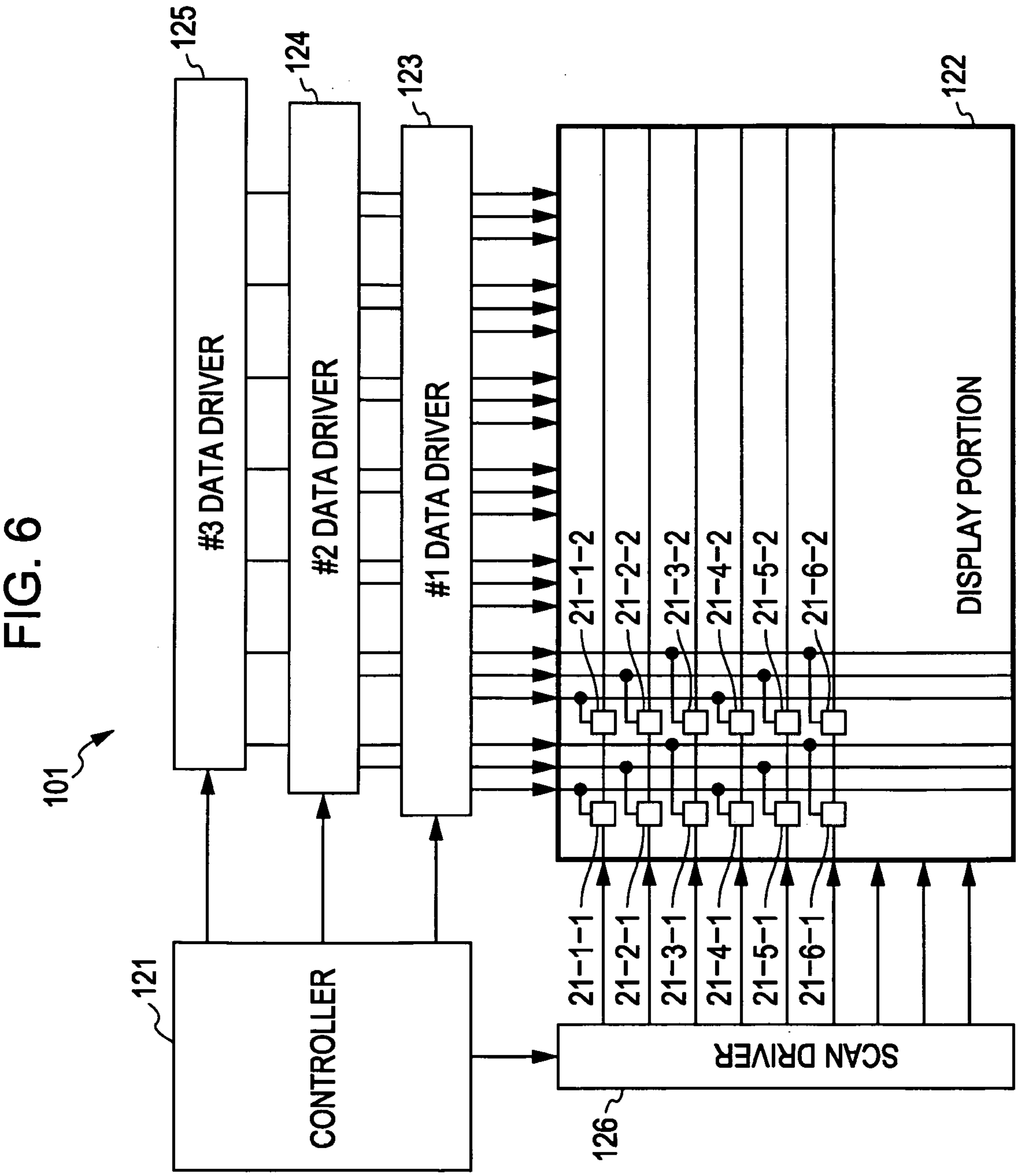
FIG. 6 is a diagram illustrating the configuration of a display device to which an embodiment has been applied.

Description will be made with reference to FIG. 6 regarding a display device 101 to which an embodiment has been applied. The display device 101 is configured of a controller 121, display portion 122, #1 data driver 123, #2 data driver 124, #3 data driver 125, and scan driver 126.

In response to input of image data corresponding to an image to be displayed on the display portion 122, the controller 121 divides the image data in increments of horizontal line to supply the divided image data to the #1 data driver 123, #2 data driver 124, and #3 data driver 125, respectively. Also, the controller 121 controls the #1 data driver 123, #2 data driver 124, #3 data driver 125, and scan driver 126.

Specifically, the controller 121 supplies an image data signal corresponding to the 3N+1'th line (where N is an integer; $0 \leqq N \leqq \{(\text{number of scan lines}-1)/3\}$) of one frame to the #1 data driver 123, supplies an image data signal corresponding to the 3N+2'th line to the #2 data driver 124, and supplies an image data signal corresponding to the 3N+3'th line to the #3 data driver 125. Also, the controller 121 supplies a scan start pulse to the scan driver 126 with pulse width which is triple a scan clock. The pulse width (one cycle of ON/OFF) of the scan clock is equal to display duration of one frame/number of scan lines.

With the display portion 122, the data wiring lines in the vertical direction in the drawing from the #1 data driver 123, #2 data driver 124, and #3 data driver 125, and the scan wiring lines in the horizontal direction in the drawing from the scan driver 126 are wired around in a vertical and horizontal grid pattern. Multiple emission elements 21 are provided at an intersection portion between a data wiring line and scan wiring line. The display portion 122 displays an image using emission of the emission element 21 driven by the #1 data driver 123, #2 data driver 124, #3 data driver 125, and scan driver 126.

Let us say that with the display device 101, the emission elements 21 provided at the display device 122 are configured of LEDs. In the case of employing LEDs as the emission elements 21, consumption power can be reduced as compared to the case of employing liquid crystal display elements.

For example, in the case of the display portion 122 being monochrome display, the number of data wiring lines from each of the #1 data driver 123, #2 data driver 124, and #3 data driver 125 is equal to the number of pixels arrayed in the horizontal direction of one frame. Accordingly, with the display portion 122, the data wiring lines which are triple the number of pixels, arrayed in the horizontal direction of one frame, are provided in a column manner (vertical direction in FIG. 6).

Also, in the case of the display portion being full-color display, the number of data wiring lines from each of the #1 data driver 123, #2 data driver 124, and #3 data driver 125 is triple the number of pixels arrayed in the horizontal direction at one frame. That is to say, with the display portion 122, data wiring lines of which the number is further ninefold (triple× triple) the number of pixels arrayed in the horizontal direction at one frame are provided in a column manner (vertical direction in FIG. 6).

Also, even in a case wherein the display portion 12 is monochrome display or full-color display, scan wiring lines equivalent to the number of horizontal lines are provided in a line manner (horizontal direction in FIG. 6), and are connected to the output of the scan driver 126.

With the display portion 122, the emission elements 21 equivalent to the number of pixels are provided in the case of monochrome display, and the emission elements 21 triple the number of pixels are provided in the case of full-color display. Each of the emission elements 21 has an electrode connected to one of the #1 data driver 123, #2 data driver 124, and #3 data driver 125, and an electrode connected to the output of the scan driver 126.

For example, each of the emission elements 21 of the display portion 122 is distinguished with lines being represented by n, and columns being represented by m, i.e., by emission element 21-*n*-*m*. Specifically, in FIG. 6, the emission elements 21 provided on the top line in the drawing of the display portion 122 are represented as an emission element 21-1-1, emission element 21-1-2, and so on, the emission elements 21 provided on the next line are represented as an emission element 21-2-1, emission element 21-2-2, and so on, and the emission elements 21 provided on the further next line are represented as an emission element 21-3-1, emission element 21-3-2, and so on. Further, with the display portion 122, the emission elements 21 of n=1, 4, 7, 10, and so on are connected to the #1 data driver 123, the emission elements 21 of n=2, 5, 8, 11, and so on are connected to the #2 data driver 124, and the emission elements 21 of n=3, 6, 9, 12, and so on are connected to the #3 data driver 125.

Figure 2:
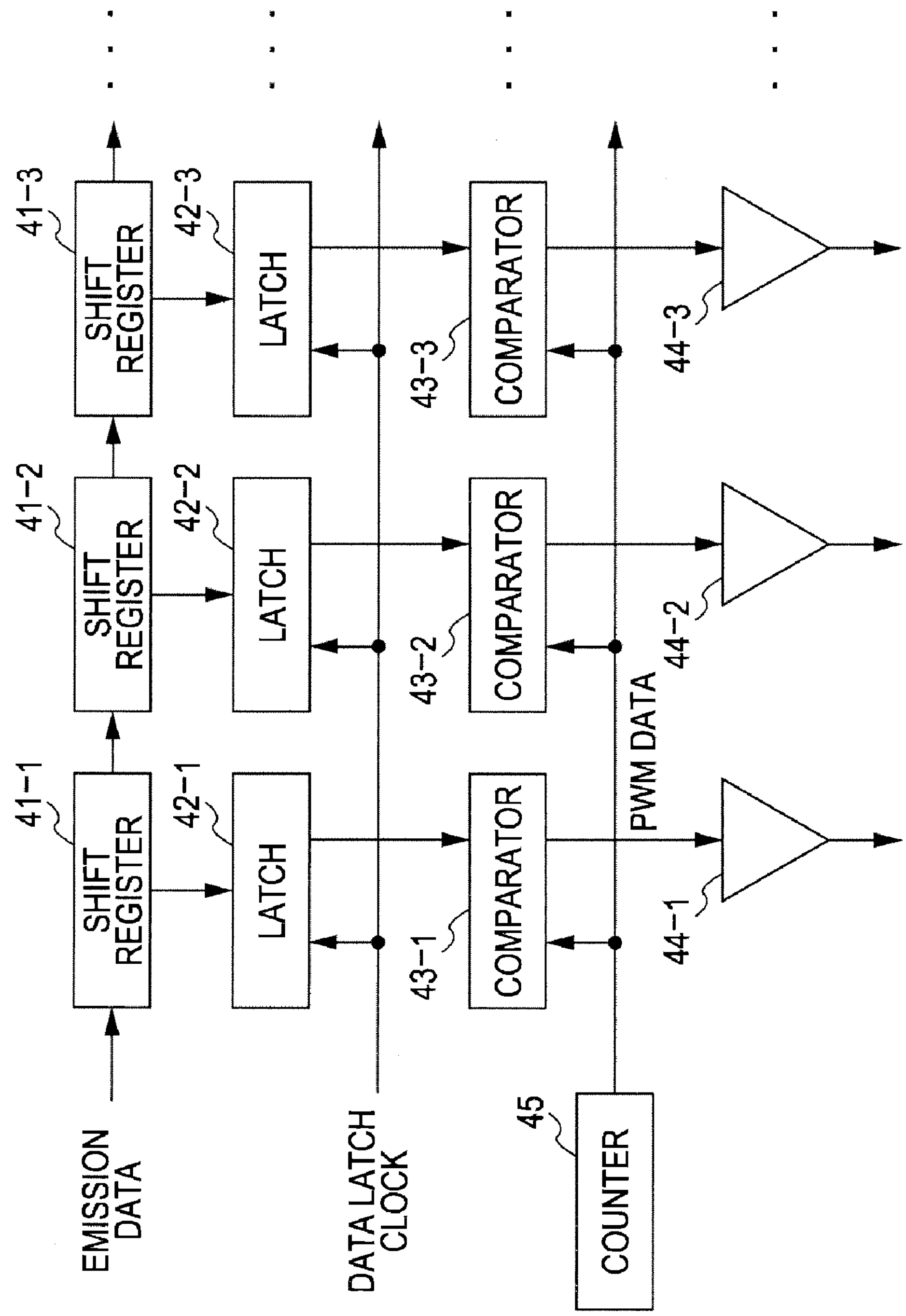
FIG. 2 (Prior Art)
FIG. 2 is a block diagram illustrating a part of the configuration of the data driver shown in FIG. 1.

The #1 data driver 123 has basically the same configuration as the existing data driver 13 described with reference to FIG. 2, receives supply of an image data signal corresponding to the 3N+1'th line of one frame, and supplies the current value corresponding to the image data to the emission elements 21 of n=1, 4, 7, 10, and so on at predetermined timing using PWM control.

The #2 data driver 124 has basically the same configuration as the existing data driver 13 described with reference to FIG. 2, receives supply of an image data signal corresponding to the 3N+2'th line of one frame, and supplies the current value corresponding to the image data to the emission elements 21 of n=2, 5, 8, 11, and so on at predetermined timing using PWM control.

The #3 data driver 125 has basically the same configuration as the existing data driver 13 described with reference to FIG. 2, receives supply of an image data signal corresponding to the 3N+3'th line of one frame, and supplies the current value corresponding to the image data to the emission elements 21 of n=3, 6, 9, 12, and so on at predetermined timing using PWM control.

The scan driver 126 is, similar to the existing scan driver 14, configured of the shift registers 61-1 through 61-*c*, and switching transistors 62-1 through 62-*c*, which are equivalent to the number of horizontal lines. The scan driver 126 receives supply of the scan start pulse at the top of each frame from the controller 121, and applies predetermined electric charge to the scan electrodes of the emission elements 21 three lines at a time at predetermined timing.

That is to say, with the display device 101, three lines worth of the emission elements 21 of the display portion 122 are lit simultaneously. The scan driver 126 light-emits and drives three lines worth of the emission elements 21 at one time, but basically, the emission start timing of each line is shifted by display duration of one frame/number of scan lines=duration T, and the one-time emission duration of each line is {(display duration of one frame/number of scan lines)×3}=duration 3T.

The scan start pulse of which the pulse width is triple that of the scan clock is supplied to the scan driver 126 from the controller 121. With the scan driver 126, the ON signal of the scan start pulse is supplied to the shift register 61-1, the switching transistor 62-1 is turned on, and the emission elements 21 on the first line are lit based on the output from the #1 data driver 123 at that time.

Subsequently, after elapse of the duration T from the emission start of the first line, the shift register 61-1 supplies the ON signal corresponding to the scan start pulse to the shift register 61-2 based on the scan clock. At this time, the scan start pulse supplied to the shift register 61-1 is still high (ON), so the switching transistor 62-1 is also still ON. Subsequently, the shift transistor 61-2 to which the ON signal is shifted turns on the switching transistor 62-2. Accordingly, the emission elements 21 on the first line are lit based on the output from the #1 data driver 123 at that time, and the emission elements 21 on the second line are lit based on the output from the #2 data driver 124 at that time.

Subsequently, after elapse of the duration T from the emission start of the second line, the shift register 61-1 supplies the ON signal corresponding to the scan start pulse to the shift register 61-2, and the shift transistor 61-2 supplies the ON signal corresponding to the scan start pulse to the shift transistor 61-3. At this time, the scan start pulses supplied to the shift registers 61-1 and 61-2 are still high (ON), so the switching transistors 62-1 and 62-2 are also still ON. Subsequently, the shift transistor 61-3 to which the ON signal is shifted turns on the switching transistor 62-3. Accordingly, the emission elements 21 on the first line are lit based on the output from the #1 data driver 123 at that time, the emission elements 21 on the second line are lit based on the output from the #2 data driver 124 at that time, and the emission elements 21 on the third line are lit based on the output from the #3 data driver 125 at that time.

Figure 7:
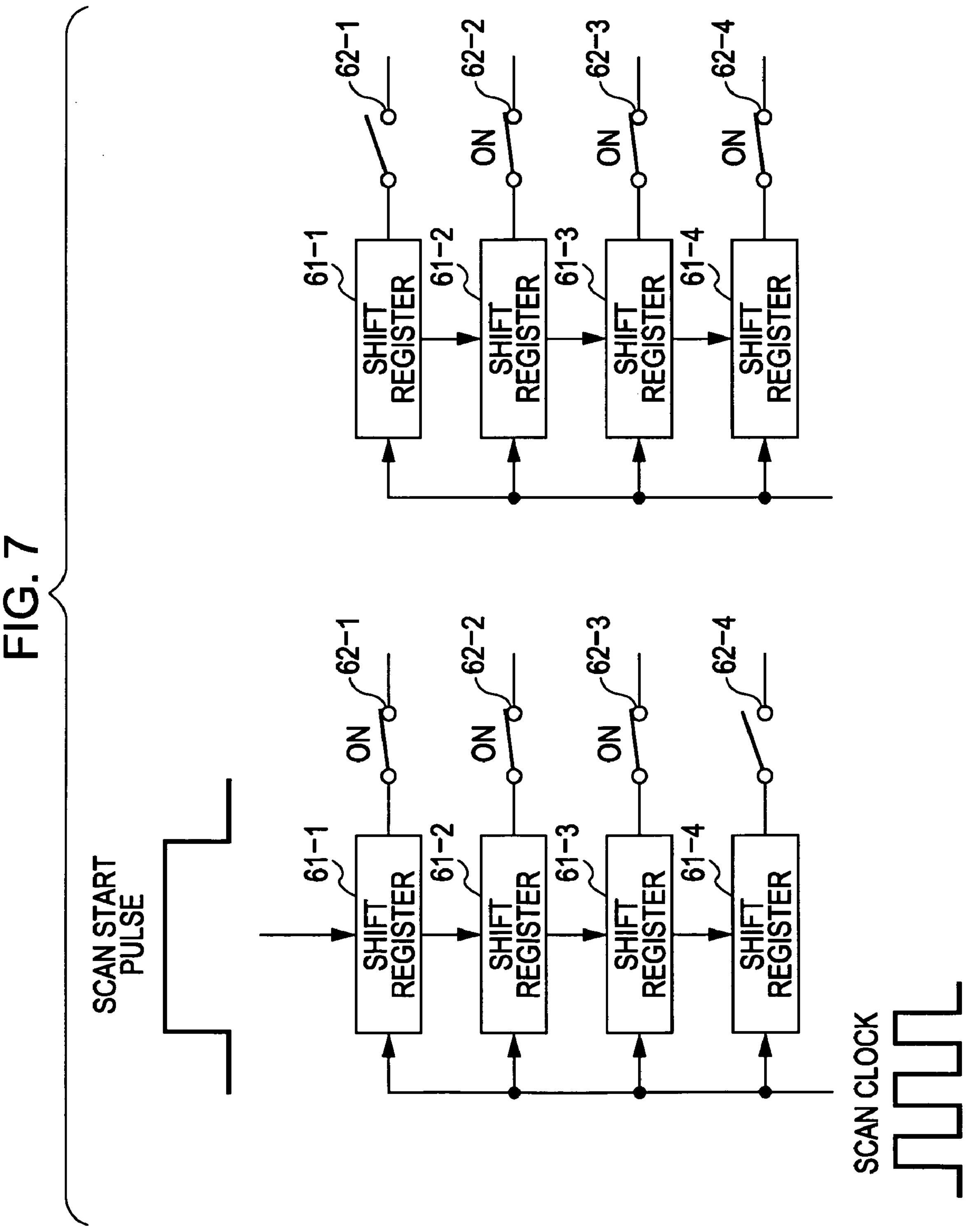
FIG. 7 is a diagram for describing the operation of the scan driver shown in FIG. 6.

Subsequently, as shown in FIG. 7, in a state in which three of the shift registers 61-1 through 61-3 are ON, in other words, after elapse of the duration T from a state in which the first through third lines are lit, the shift register 61-1 supplies the ON signal corresponding to the scan start pulse to the shift register 61-2, the shift register 61-2 supplies the ON signal corresponding to the scan start pulse to the shift register 61-3, and further, the shift register 61-3 supplies the ON signal corresponding to the scan start pulse to the shift register 61-4. Subsequently, the shift register 61-4 to which the ON signal is shifted turns on the switching transistor 62-4. At this time, the scan start pulses supplied to the shift registers 61-2 and 61-3 are still high (ON), so the switching transistors 62-2 and 62-3 are also still ON, but the scan start pulse supplied to the shift register 61-1 is changed to low (OFF), and accordingly, the switching transistor 62-1 is turned off.

Subsequently, thereafter, operation is repeated wherein the shift register 61 on the next line turns on the corresponding switching transistor 62 for each elapse of duration $$T\text{=display duration of one frame/number of scan lines,}$$

and of the shift registers emitting light, the shift register 61 on the top turns off the corresponding switching transistor 62.

That is to say, the ON duration of each switching transistor 62, in other words, the emission duration of the emission elements 21 on each line becomes 3T. Also, timing wherein each switching transistor 62 is turned on, in other words, the emission start point-in-time of each of the emission elements 21 on each line is shifted by T.

Figure 8:
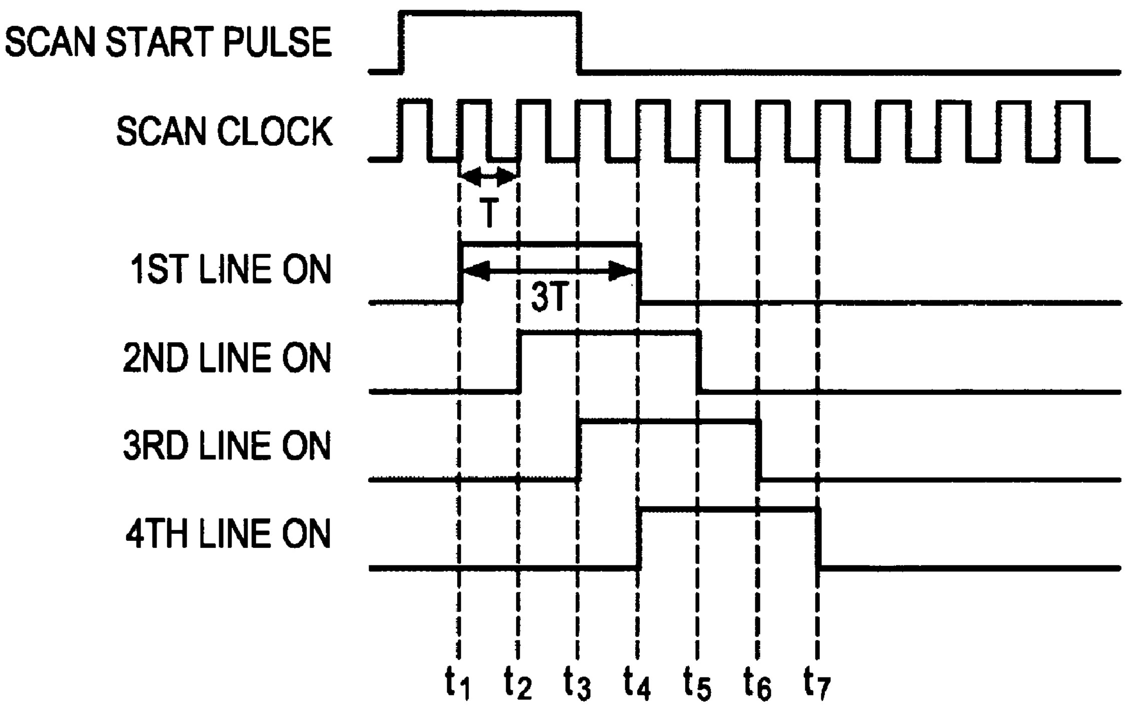
FIG. 8 is a diagram for describing the scan timing of the display device shown in FIG. 6.

The emission timing of each line in the case of the shift register 61 being thus turned on/off is shown in FIG. 8.

As shown in FIG. 8, after the scan start pulse is generated, emission of the first line is started at point-in-time $t_1$ based on the timing controlled with the scan clock, and at this time, the image data signal corresponding to each pixel on the first line is output from the #1 data driver 123. Subsequently, the emission of the second line is started at point-in-time $t_2$, and at this time, the image data signal corresponding to each pixel of the second line is output from the #2 data driver 124. Subsequently, the emission of the third line is started at point-in-time $t_3$, and at this time, the image data signal corresponding to each pixel of the third line is output from the #3 data driver 125. Subsequently, the emission of the fourth line is started at point-in-time $t_4$, and at this time, the image data signal corresponding to each pixel of the fourth line is output from the #1 data driver 123.

Subsequently, the emission of the unshown fifth line is started at point-in-time $t_5$, and also the emission of the second line ends, the output of the image data corresponding to each pixel of the fifth line is started from the #2 data driver 124, and thereafter, similarly, after elapse of the duration T from the emission start of each line, the emission of the next line is started, after elapse of duration 3T from the emission start of each line, the emission of the line thereof ends, and the emission of the next line is started. Thus, the ON signal corresponding to the scan start pulse is shifted to the shift registers 61-3 through 61-*c*.

Figure 3:
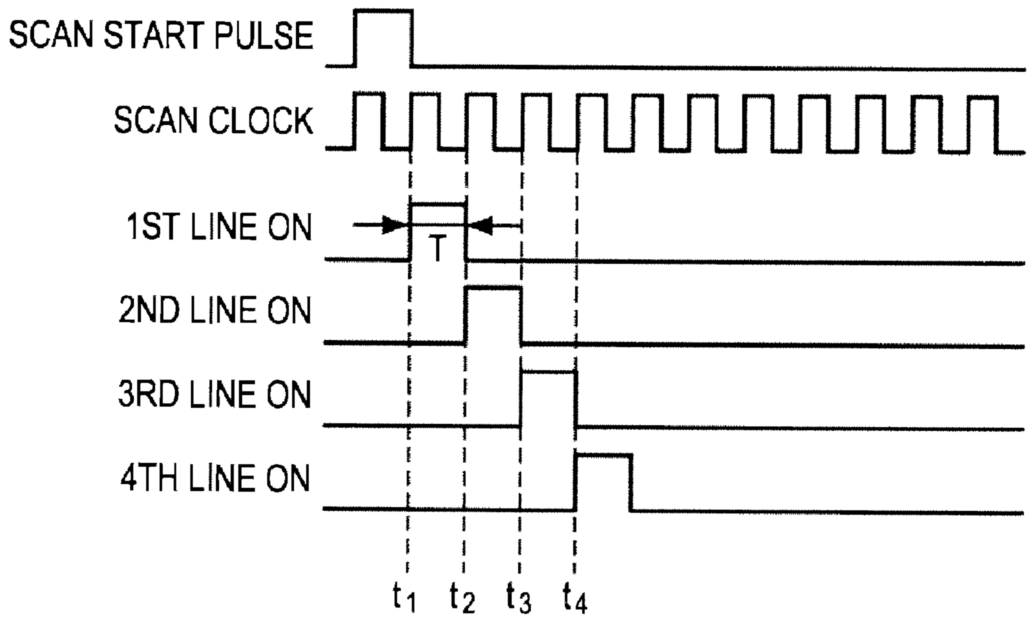
FIG. 3 (Prior Art)
FIG. 3 is a diagram for describing the scan timing of the display device shown in FIG. 1.
Figure 4:
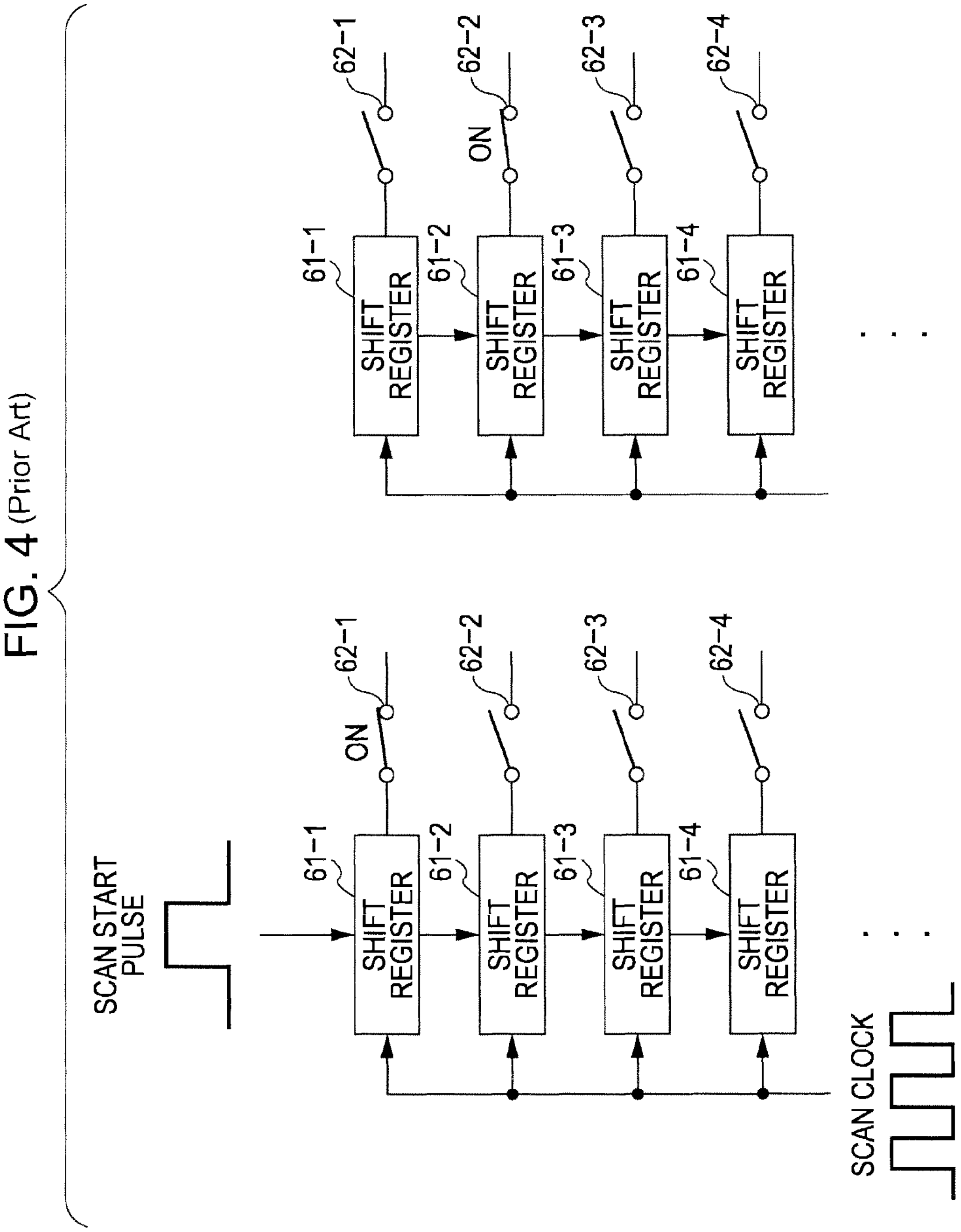
FIG. 4 (Prior Art)
FIG. 4 is a diagram for describing the operation of the scan driver shown in FIG. 1.
Figure 5:
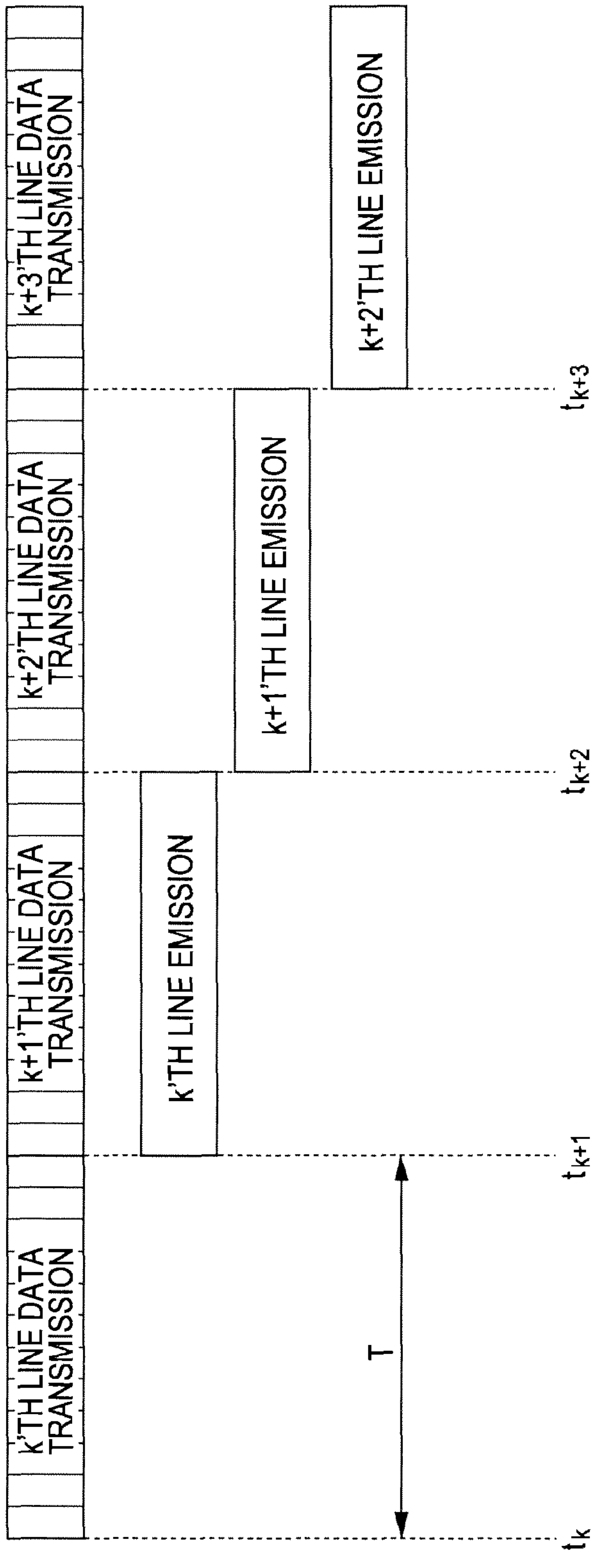
FIG. 5 (Prior Art)
FIG. 5 is a diagram for describing data transmission and emission timing for each line of the display device shown in FIG. 1.

Thus, with the display device 101, three consecutive lines are lit constantly at a time, the emission start timing of each line is arranged to be shifted by display duration of one frame/number of scan lines, so the response time for displaying one frame is similar to that in the related art described with reference to FIG. 3, but when assuming that {display duration of one frame/number of scan lines} in the related art described with reference to FIG. 3 is the duration T, the one-time emission duration of each line is triple the duration T, i.e., 3T. Accordingly, the brightness of each pixel increases by the worth wherein the emission duration is prolonged as compared to a case wherein the emission duration of one line is T.

Figure 9:
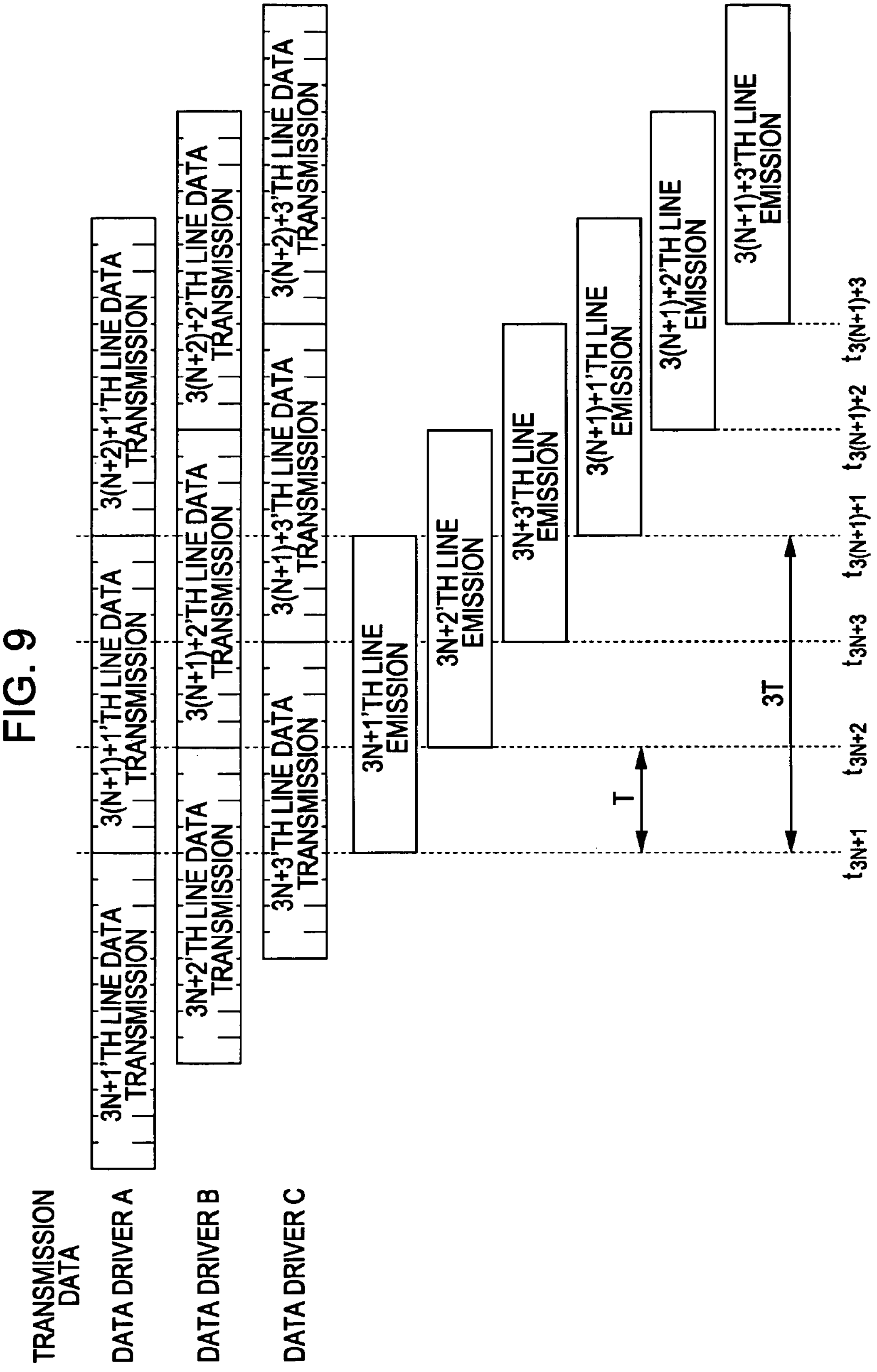
FIG. 9 is a diagram for describing data transmission and emission timing for each line of the display device shown in FIG. 6.

Description will be made with reference to FIG. 9 regarding data transmission from the controller 121 to the #1 data driver 123, #2 data driver 124, or #3 data driver 125, and the emission timing of each line.

The image data signal of the 3N+1'th line (where N is an integer; $0 \leqq N \leqq \{(\text{number of scan lines}-1)/3\}$) is supplied from the controller 121 to the #1 data driver 123. As described above, the lag regarding the emission start point-in-time of each line is $$T\text{=display duration of one frame/number of scan lines,}$$

and the emission duration of each line is 3T, and accordingly, the duration necessary for data transmission of one line needs to be within 3T. Subsequently, after elapse of the duration T from the transmission start point-in-time of the image data signal of the 3N+1'th line, the data of the 3N+2'th line which is the next line is supplied from the controller 121 to the #2 data driver 124, and further after elapse of the duration T, and the data of the 3N+3'th line which is the next line is supplied from the controller 121 to the #3 data driver 125.

Subsequently, at point-in-time $t_{3N+1}$ after elapse of the duration 3T from the transmission start point-in-time of the image data signal of the 3N+1'th line, the 3N+1'th line is lit, and supply of the image data signal of the 3(N+1)+1'th line to the #1 data driver 123 is started. Subsequently, after elapse of the duration 3T from the transmission start point-in-time of the image data signal of the 3N+2'th line, i.e., at point-in-time $t_{3N+2}$ after elapse of the duration T from the point-in-time $t_{3N+1}$, the 3N+2'th line is lit, and supply of the image data signal of the 3(N+1)+2'th line to the #2 data driver 124 is started. At the point-in-time $t_{3N+2}$, the 3N+1'th line is still being lit.

Subsequently, after elapse of the duration 3T from the transmission start point-in-time of the image data signal of the 3N+3'th line, i.e., at point-in-time $t_{3N+3}$ after elapse of the duration T from the point-in-time $t_{3N+2}$, the 3N+3'th line is lit, and supply of the image data signal of the 3(N+1)+3'th line to the #3 data driver 125 is started. At the point-in-time $t_{3N+3}$, the 3N+1'th line and 3N+2'th line are still being lit. Subsequently, after elapse of the duration 3T from the transmission start point-in-time of the image data signal of the 3(N+1)+1'th line, i.e., at point-in-time $t_{3(N+1)+}1$ after elapse of the duration T from the point-in-time $t_{3N+3}$, the 3(N+1)+1'th line is lit, and supply of the image data signal of the 3(N+2)+1'th line to the #1 data driver 123 is started. At the point-in-time $t_{3N+2}$, the emission of the 3N+1'th line ends, but the 3N+2'th line and 3N+3'th line are still being lit.

Subsequently, hereafter, similarly, each line is lit such that the emission start point-in-time of each line is shifted by the duration T, and the emission duration of each line becomes 3T, along with the emission start of each line, the transmission of the image data signal corresponding to the line after three lines from the line where the emission has been started is started.

That is to say, the data signal at any line is supplied from the controller 121 to one of the #1 data driver 123, #2 data driver 124, and #3 data driver 125 at the transmission rate which is a third of that in the related art. The lag of the transmission start timing in a case wherein the data signal of each line is transmitted from the controller 121 is the duration T similar to the related art. On the other hand, each of the #1 data driver 123, #2 data driver 124, and #3 data driver 125 starts reception of the data signal of one line for each duration 3T.

The emission duration of each line is the duration 3T which is triple that in the related art. The lag regarding the emission start point-in-time of consecutive lines is the duration T which is a third of the duration 3T which is the emission duration of each line. That is to say, the lag regarding the emission duration of consecutive lines is the same as that in the related art, so response time for displaying one frame is equal to that in the related art.

As described above, the display device 101 shown in FIG. 6 includes the three data drivers of the #1 data driver 123, #2 data driver 124, and #3 data driver 125, whereby the emission elements 21 of three lines can be lit simultaneously.

Also, with the display device 101, the emission start timing of each line of the display portion 122 is shifted by T in the same way as that in the related art, i.e., in a case wherein the response time for displaying one frame is in the same way as that in the related art, the emission duration of each line becomes 3T which is triple the duration T. Accordingly, the brightness increases as compared to that in the related art. Therefore, even if LEDs are employed as the emission elements of the display device 101 to which the simple matrix method has been applied, necessary brightness can be obtained without increasing the driving current value of the LEDs. Also, there is no need to increase the driving current value of the LEDs, and accordingly, the life of the LEDs is prolonged.

Also, with the display device 101, even in a case wherein each of the three data drivers of the #1 data driver 123, #2 data driver 124, and #3 data driver can latch only one line worth of image data signals, the duration necessary for data transmission of one line needs to be within 3T. Accordingly, the data transmission rate of the image signal corresponding to one line can be reduced as compared to the related art.

Further, the display device 101 has such a configuration, whereby one PWM cycle of PWM control executed by the #1 data driver 123, #2 data driver 124, and #3 data driver 125 becomes triple. That is to say, the switching frequency of PWM decreases, so the life of switching elements is prolonged, consumption power is reduced, and further, EMI (Electro Magnetic Interference) due to switching cannot be readily effected. Also, the switching frequency of the LEDs employed as the emission elements 21 decreases, whereby the life of the LEDs is prolonged as compared to that in a case wherein the PWM cycle is short.

Also, with the display device 101, the number of data drivers may be two or four or more, and with the display device 101, the emission elements 21 of the same number of lines as the number of provided data drivers can be lit simultaneously.

For example, when assuming that the number of lines to be lit simultaneously is M, M data drivers are provided in parallel. With the display portion of monochrome display, data wiring lines M times as many as the number of pixels arrayed in the horizontal direction are disposed. Also, with the display portion of color display, there are disposed data wiring lines M times as many as further three times as many as the number of pixels arrayed in the vertical and horizontal directions. Note that the number of scan wiring lines in the horizontal direction from the scan driver is the same as the number of horizontal lines making up one frame, and is not changed. The scan start pulse supplied from the controller to the scan driver is assumed to have pulse width M times the pulse width of the scan clock. Thus, one line worth of the emission elements are lit consecutively during duration M×T, the emission start point-in-time of consecutive lines is shifted by the duration T, and accordingly, the M lines are simultaneously lit at a time.

Figures 10, 10A:
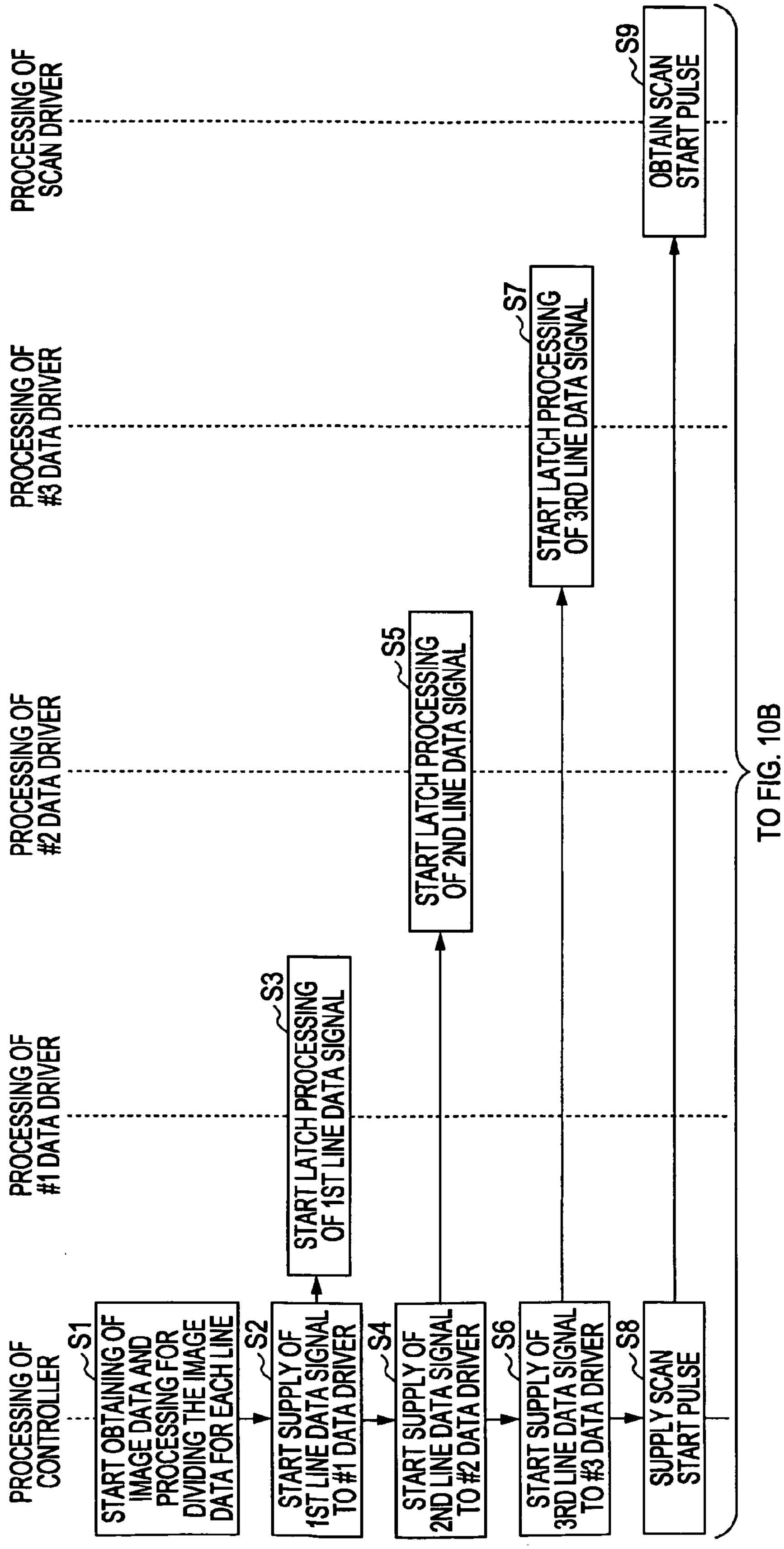
FIG. 10 is a flowchart for describing the processing of the display device shown in FIG. 6.
Figure 10B:
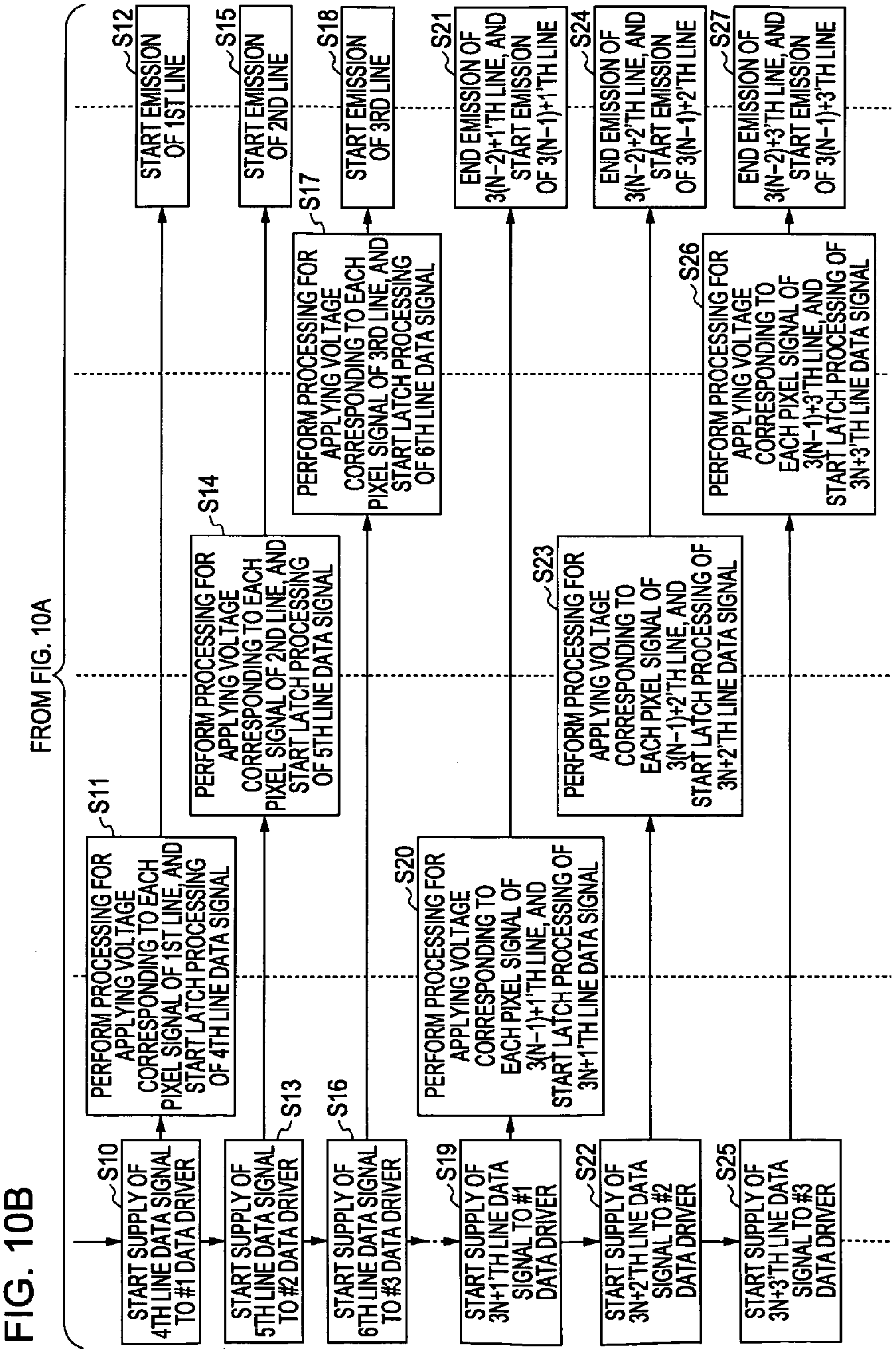

Next, description will be made with reference to the flowchart shown in FIG. 10 regarding processing which each of the controller 121, #1 data driver 123, #2 data driver 124, #3 data driver 125, and scan driver 126 executes when displaying one frame worth of image on the display portion 122, and the relation between those.

In step S1, the controller 121 starts obtaining of image data to be displayed on the display portion 122, and starts processing for dividing the obtained image data for each line.

In step S2, the controller 121 starts supply of the data signals of the first line to the #1 data driver 123.

In step S3, the #1 data driver 123 starts latch processing of the data signals of the first line of which the supply from the controller 121 has been started in parallel with the processing of the controller 121 in step S2.

In step S4, the controller 121 starts supply of the data signals of the second line to the #2 data driver 124.

In step S5, the #2 data driver 124 starts latch processing of the data signals of the second line of which the supply from the controller 121 has been started in parallel with the processing of the controller 121 in step S4.

In step S6, the controller 121 starts supply of the data signals of the third line to the #3 data driver 125.

In step S7, the #3 data driver 125 starts latch processing of the data signals of the third line of which the supply from the controller 121 has been started in parallel with the processing of the controller 121 in step S6.

In step S8, the controller 121 supplies the scan start pulse to the scan driver 126.

In step S9, the scan driver 126 obtains the scan start pulse generated at the controller 121.

After completion of supply of the data signals of the first line, in step S10 the controller 121 starts supply of the data signals of the fourth line to the #1 data driver 123.

In step S11, the #1 data driver 123 performs processing for applying voltage corresponding to each pixel signal of the first line subjected to the latch processing in step S3, and starts latch processing of the data signals of the fourth line of which the supply from the controller 121 has been started in parallel with the processing of the controller 121 in step S10.

In step S12, the scan driver 126 turns on the switching transistor 62-1 to start the emission of the first line simultaneously with the processing for applying voltage corresponding to each pixel signal of the first line by the #1 data driver 123. Thus, the first line of the image is displayed on the display portion 122.

After completion of supply of the data signals of the second line, in step S13 the controller 121 starts supply of the data signals of the fifth line to the #2 data driver 124.

In step S14, the #2 data driver 124 performs processing for applying voltage corresponding to each pixel signal of the second line subjected to the latch processing in step S5, and starts latch processing of the data signals of the fifth line of which the supply from the controller 121 has been started in parallel with the processing of the controller 121 in step S13.

In step S15, the scan driver 126 turns on the switching transistor 62-2 to start the emission of the second line simultaneously with the processing for applying voltage corresponding to each pixel signal of the second line by the #2 data driver 124. Consequently, the first and second lines of the image are displayed on the display portion 122.

After completion of supply of the data signals of the third line, in step S16 the controller 121 starts supply of the data signals of the sixth line to the #3 data driver 125.

In step S17, the #3 data driver 125 performs processing for applying voltage corresponding to each pixel signal of the third line subjected to the latch processing in step S7, and starts latch processing of the data signals of the sixth line of which the supply from the controller 121 has been started in parallel with the processing of the controller 121 in step S16.

In step S18, the scan driver 126 turns on the switching transistor 62-3 to start the emission of the third line simultaneously with the processing for applying voltage corresponding to each pixel signal of the third line by the #3 data driver 125. Consequently, the first through third lines of the image are displayed on the display portion 122.

Subsequently, hereafter, the following processing in steps S19 through S27 is repeatedly executed until display of one frame ends, where N is a positive integer, and N=2, 3, 4, and so on. Note that processing in the case of N=0 corresponds to the processing in steps S2 through S7, and processing in the case of N=1 corresponds to the processing in steps S10 through S18.

In step S19, the controller 121 starts supply of the data signals of the 3N+1'th line to the #1 data driver 123.

In step S20, the #1 data driver 123 performs processing for applying voltage corresponding to each pixel signal of the 3(N−1)+1'th line of which the latch processing has been executed immediately before, and also starts latch processing of the data signals of the 3N+1'th line of which the supply has been started from the controller 121 in parallel with the processing of the controller 121 in step S19.

In step S21, the scan driver 126 ends the emission of the 3(N−2)+1'th line simultaneously with the processing for applying voltage corresponding to each pixel signal of the 3(N−1)+1'th line by the #1 data driver 123, and starts the emission of the 3(N−1)+1'th line. Thus, the 3(N−1)+1'th line of the image is displayed on the display portion 122. At this time, the 3(N−2)+2'th line and 3(N−2)+3'th line have also been displayed.

In step S22, the controller 121 starts supply of the data signals of the 3N+2'th line to the #2 data driver 124.

In step S23, the #2 data driver 124 performs processing for applying voltage corresponding to each pixel signal of the 3(N−1)+2'th line of which the latch processing has been executed immediately before, and also starts latch processing of the data signals of the 3N+2'th line of which the supply has been started from the controller 121 in parallel with the processing of the controller 121 in step S22.

In step S24, the scan driver 126 ends the emission of the 3(N−2)+2'th line simultaneously with the processing for applying voltage corresponding to each pixel signal of the 3(N−1)+2'th line by the #2 data driver 124, and starts the emission of the 3(N−1)+2'th line. Thus, the 3(N−1)+2'th line of the image is displayed on the display portion 122. At this time, the 3(N−2)+3'th line and 3(N−2)+1'th line have also been displayed.

In step S25, the controller 121 starts supply of the data signals of the 3N+3'th line to the #3 data driver 125.

In step S26, the #3 data driver 125 performs processing for applying voltage corresponding to each pixel signal of the 3(N−1)+3'th line of which the latch processing has been executed immediately before, and also starts latch processing of the data signals of the 3N+3'th line of which the supply has been started from the controller 121 in parallel with the processing of the controller 121 in step S25.

In step S27, the scan driver 126 ends the emission of the 3(N−2)+3'th line simultaneously with the processing for applying voltage corresponding to each pixel signal of the 3(N−1)+3'th line b, the #3 data driver 125, and starts the emission of the 3(N−1)+3'th line. Thus, the 3(N−1)+3'th line of the image is displayed on the display portion 122. At this time, the 3(N−1)+1'th line and 3(N−1)+2'th line have also been displayed.

Subsequently, the processing in steps S19 through S27 is repeated until display of one frame ends, and the above-mentioned processing is repeated until the display, processing of the image ends.

According to such processing, consecutive three lines are lit while shifting the emission start timing, and the emission duration of each line is prolonged as compared to that in the related art, so the brightness of the display portion 122 is enhanced without increasing the driving current value of the LEDs employed as the emission elements 21. Also, one PWM cycle of PWM control for adjusting the brightness of each emission element is prolonged, whereby the life of the LEDs employed as the emission elements 21 is prolonged, and EMI (Electro Magnetic Interference) is not readily caused.

Figure 11:
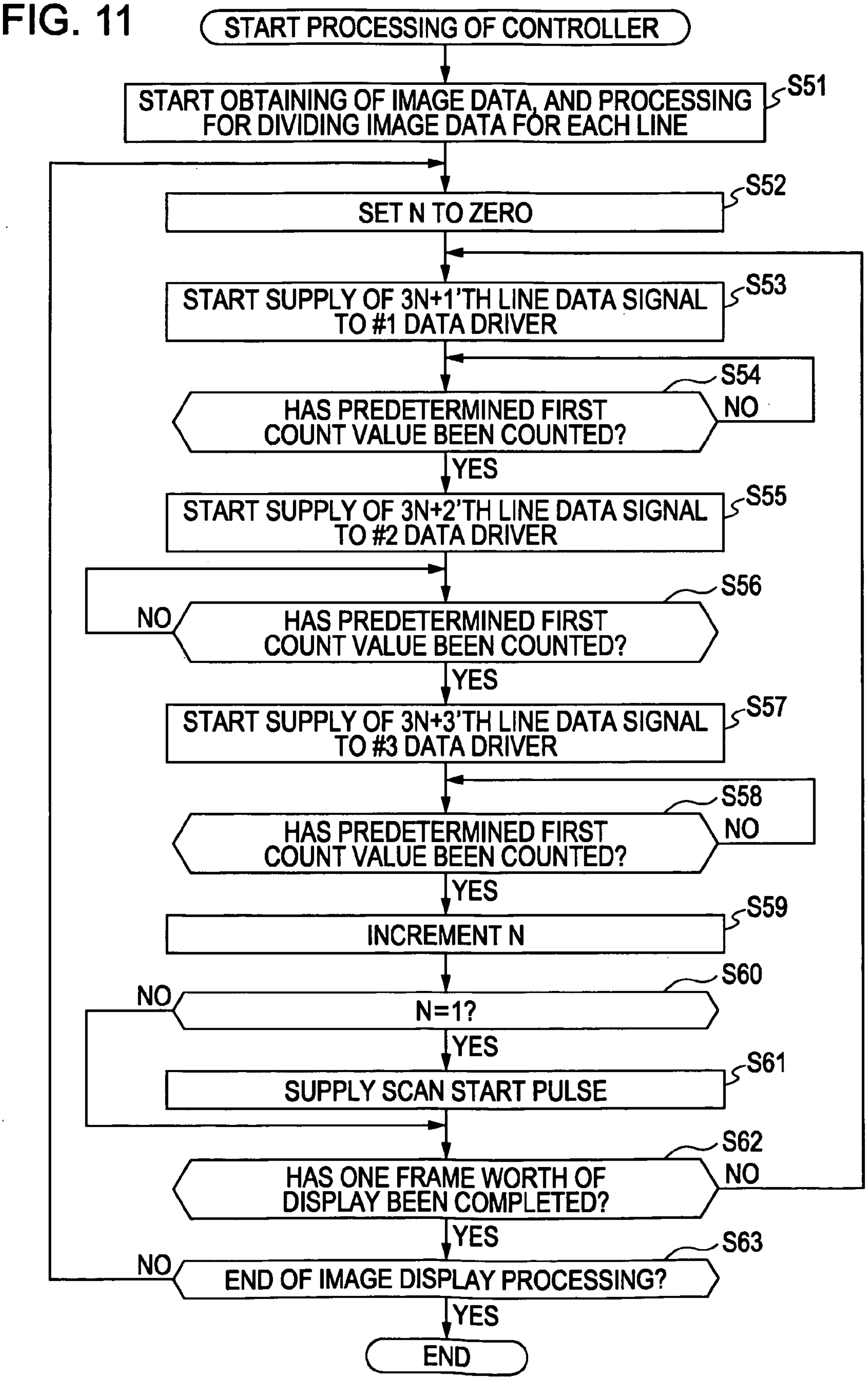
FIG. 11 is a flowchart for describing the processing of a controller.

Next, description will be made regarding the processing of the controller 121 with reference to the flowchart shown in FIG. 11.

In step S51, the controller 121 starts obtaining of image data, and processing for dividing the image data for each line.

In step S52, the controller 121 initializes a value N indicating which line of one frame the data being processed is to set N=0.

In step S53, the controller 121 starts supply of the data signals of the 3N+1'th line to the #1 data driver 123.

In step S54, the controller 121 determines whether or not display duration of one frame/number of scan lines=duration T which is a predetermined first count value has been counted since supply of the data signals to the #1 data driver 123 was started in step S53. In a case wherein determination is made in step S54 that the first count value has not been counted, the processing in step S54 is repeated until determination is made that the first count value has been counted.

In a case wherein determination is made in step S54 that the first count value has been counted, in step S55 the controller 121 starts supply of the data signals of the 3N+2'th line to the #2 data driver 124.

In step S56, the controller 121 determines whether or not the duration T which is the predetermined first count value has been counted since supply of the data signals to the #2 data driver 124 was started in step S55. In a case wherein determination is made in step S56 that the first count value has not been counted, the processing in step S56 is repeated until determination is made that the first count value has been counted.

In a case wherein determination is made in step S56 that the first count value has been counted, in step S57 the controller 121 starts supply of the data signals of the 3N+3'th line to the #3 data driver 125.

In step S58, the controller 121 determines whether or not the duration T which is the predetermined first count value has been counted since supply of the data signals to the #3 data driver 125 was started in step S57. In a case wherein determination is made in step S58 that the first count value has not been counted, the processing in step S58 is repeated until determination is made that the first count value has been counted.

In a case wherein determination is made in step S58 that the first count value has been counted, in step S59 the controller 121 increments the value N indicating the line corresponding to the data being processed.

In step S60, the controller 121 determines whether or not the value N indicating the line is 1, i.e., N=1.

In a case wherein determination is made in step S60 that N=1, in step S61 the controller 121 supplies the scan start pulse having pulse width triple that of the scan clock to the scan driver 126.

In a case wherein determination is made in step S60 that N≠1, or following ending of the processing in step S61, in step S62 the controller 121 determines whether or not one frame worth of display has been completed. In a case wherein determination is made in step S62 that one frame worth of display has not been completed, the processing returns to step S53, and the subsequent processing is repeated.

In a case wherein determination is made in step S62 that one frame worth of display has been completed, in step S63 the controller 121 determines whether or not the image display processing has been ended. In a case wherein determination is made in step S63 that the image display processing has not been ended, the processing returns to step S52, where the subsequent processing is repeated. In a case wherein determination is made in step S63 the image display processing has been ended, the processing ends.

According to such processing, the data is supplied to the multiple data drivers (#1 data driver 123, #2 data driver 124, and #3 data driver 125) one line at a time within the duration 3T. That is to say, each data transfer rate can be suppressed to a third that in the related art. Also, the scan start pulse having pulse width triple the scan clock is supplied to the scan driver 126.

Figure 12:
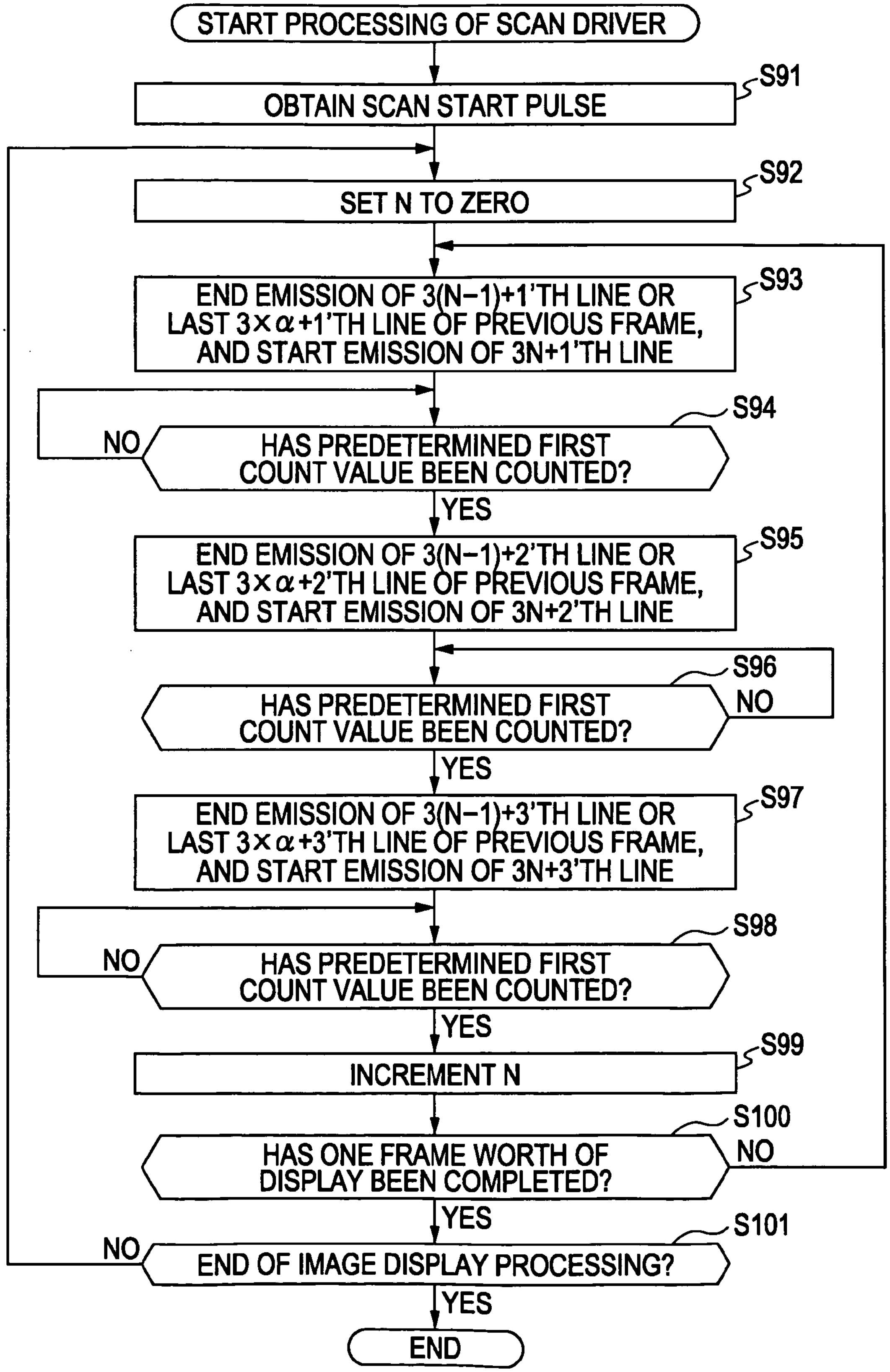
FIG. 12 is a flowchart for describing the processing of the scan driver.

Next, description will be made regarding the processing of the scan driver 126 with reference to the flowchart shown in FIG. 12.

In step S91, the scan driver 126 obtains the scan start pulse having pulse width triple the scan clock from the controller 121. This scan start pulse is the pulse which the controller 121 supplied to the scan driver 126 in the processing in step S61 of the controller 121 described with reference to FIG. 11.

In step S92, the scan driver 126 initializes a value N indicating which line of one frame the data being processed is to set N=0.

In step S93, the scan driver 126 ends the emission of the 3(N−1)+1'th line or the 3×α+1'th line where the data of the last line is displayed by the #1 data driver 123 of the previous frame, and starts the emission of the 3N+1'th line. Here, the value of a differs depending on the number of lines making up one frame.

Note that in the case of N=0, the 3(N−1)+1'th line does not exist, so when the frame being displayed is the first frame, the scan driver 126 does not end the emission of any line, but when the frame being displayed is the second frame and thereafter, the scan driver 126 ends the emission of the 3×α+1'th line of the previous frame. In the case of N≧1 the 3(N−1)+1'th line exists, so the scan driver 126 ends the emission of the 3(N−1)+1'th line of the frame thereof.

In step S94, the scan driver 126 determines whether or not display duration of one frame/number of scan lines=duration T which is a predetermined first count value has been counted since the emission of the 3N+1'th line was started in step S93. In a case wherein determination is made in step S94 that the predetermined first count value has not been counted, the processing in step S94 is repeated until determination is made that the predetermined first count value has been counted.

In a case wherein determination is made in step S94 that the predetermined first count value has been counted, in step S95 the scan driver 126 ends the emission of the 3(N−1)+2'th line or the 3×α+2'th line where the data of the last line is displayed by the #2 data driver 124 of the previous frame, and starts the emission of the 3N+2'th line. Note that in the case of N=0, the 3(N−1)+2'th line does not exist, so when the frame being displayed is the first frame, the scan driver 126 does not end the emission of any line, but when the frame being displayed is the second frame and thereafter, the scan driver 126 ends the emission of the 3×α+2'th line of the previous frame. In the case of N≧1, the 3(N−1)+2'th line exists, so the scan driver 126 ends the emission of the 3(N−1)+2'th line of the frame thereof.

In step S96, the scan driver 126 determines whether or not the duration T which is a predetermined first count value has been counted since the emission of the 3N+2'th line was started in step S95. In a case wherein determination is made in step S96 that the predetermined first count value has not been counted, the processing in step S96 is repeated until determination is made that the predetermined first count value has been counted.

In a case wherein determination is made in step S96 that the predetermined first count value has been counted, in step S97 the scan driver 126 ends the emission of the 3(N−1)+3'th line or the 3×α+3'th line where the data of the last line is displayed by the #3 data driver 125 of the previous frame, and starts the emission of the 3N+3'th line. Note that in the case of N=0, the 3(N−1)+3'th line does not exist, so when the frame being displayed is the first frame, the scan driver 126 does not end the emission of any line, but when the frame being displayed is the second frame and thereafter, the scan driver 126 ends the emission of the 3×α+3'th line of the previous frame. In the case of N≧1, the 3(N−1)+3'th line exists, so the scan driver 126 ends the emission of the 3(N−1)+3'th line of the frame thereof.

In step S98, the scan driver 126 determines whether or not the duration T which is a predetermined first count value has been counted since the emission of the 3N+3'th line was started in step S97. In a case wherein determination is made in step S98 that the predetermined first count value has not been counted, the processing in step S98 is repeated until determination is made that the predetermined first count value has been counted.

In a case wherein determination is made in step S98 that the predetermined first count value has been counted, in step S99 the scan driver 126 increments the value N indicating the line corresponding to the data being processed.

In step S100, the scan driver 126 determines whether or not one frame worth of display has been ended. In a case wherein determination is made in step S100 that one frame worth of display has not been ended, the processing returns to step S93, where the subsequent processing is repeated.

In a case wherein determination is made in step S100 that one frame worth of display has been ended, in step S101 the scan driver 126 determines whether or not the image display processing has been ended. In a case wherein determination is made in step S101 that the image display processing has not been ended, the processing returns to step S92, where the subsequent processing is repeated. In a case wherein determination is made in step S101 the image display processing has been ended, the processing ends.

According to such processing, three consecutive lines are lit while shifting the emission start timing by the duration T, and the emission duration of each line is prolonged triple that in the related art, so even if LEDs are employed as the emission elements of the display device 101 to which the simple matrix method has been applied, necessary brightness can be obtained without increasing the driving current value of the LEDs. Also, there is no need to increase the driving current value of the LEDs, so the life of the LEDs is prolonged. Also, the switching frequency of the LEDs employed as the emission elements 21 decreases, whereby occurrence of EMI (Electro Magnetic Interference) can be suppressed, and accordingly, the life of the LEDs is further prolonged as compared to that in a case wherein the PWM cycle is short.

Figure 13:
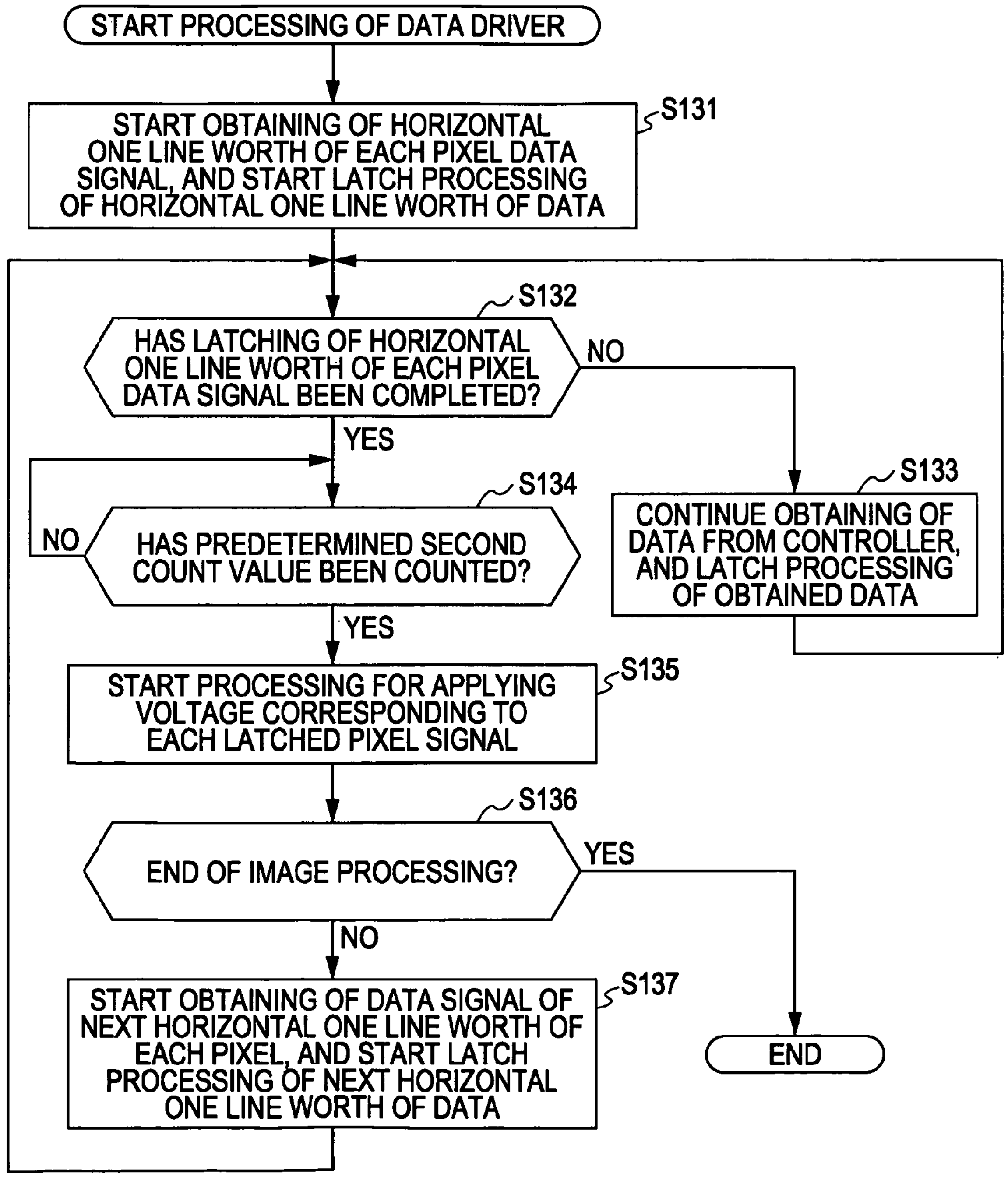
FIG. 13 is a flowchart for describing the processing of the data driver.

Next, description will be made regarding the processing of the #1 data driver 123, #2 data driver 124, and #3 data driver 125 with reference to the flowchart shown in FIG. 13. Note here that the processing executed by the #1 data driver 123 will be described as a representative, but the processing of the #2 data driver 124 and #3 data driver 125 is basically the same as the processing b, the #1 data driver, and different portions thereof will be described as appropriate.

In step S131, the #1 data driver 123 starts obtaining of one horizontal line worth of the data signal of each pixel, and starts latch processing of one horizontal line worth of data. The data signal of each pixel obtained here is the data signal corresponding to the image of the 3N+1'th line supplied in the processing in step S53 of the processing of the controller 121 described with reference to FIG. 11.

Note that when the data driver executing the processing is the #2 data driver 124, the data signal of each pixel obtained at the processing corresponding to step S131 is the data signal corresponding to the image of the 3N+2'th line supplied in the processing in step S55 of the processing of the controller 121 described with reference to FIG. 11. Also, when the data driver executing the processing is the #3 data driver 125, the data signal of each pixel obtained at the processing corresponding to step S131 is the data signal corresponding to the image of the 3N+3'th line supplied in the processing in step S57 of the processing of the controller 121 described with reference to FIG. 11.

In step S132, the #1 data driver 123 determines whether or not latching of one horizontal line worth of the data signal of each pixel has been completed.

In a case wherein determination is made in step S132 that latching of one horizontal line worth of the data signal of each pixel has not been completed, in step S133 the #1 data driver 123 continues obtaining of the data from the controller 121, and the latch processing of the obtained data. After completion of the processing in step S133, the processing returns to step S132, where the subsequent processing is repeated.

In a case wherein determination is made in step S132 that latching of one horizontal line worth of the data signal of each pixel has been completed, in step S134 the #1 data driver 123 determines whether or not display duration of one frame/number of scan lines×3=duration 3T which is a predetermined second count value has been counted since obtaining of one horizontal line worth of data signals was started. In a case wherein determination is made in step S134 that the duration 3T has not been counted, the processing in step S134 is repeated until determination is made that the duration 3T has been counted.

In a case wherein determination is made in step S134 that the duration 3T has been counted, in step S135 the #1 data driver 123 starts processing for applying voltage corresponding to each pixel signal latched. Specifically, the comparator 43 of the #1 data driver 123 controls the duration wherein the driver 44 is ON within a predetermined period (PWM cycle) based on the data signal supplied from the latch 42, thereby controlling the emission period of the corresponding emission element 21.

In step S136, the #1 data driver 123 determines whether or not the image processing has been ended. In a case wherein determination is made in step S136 that the image processing has been ended, the processing ends.

In a case wherein determination is made in step S136 that the image processing has not been ended, in step S137 the #1 data driver 123 starts obtaining of the next one horizontal line worth of the data signal of each pixel in parallel with the processing for applying voltage started in step S135, and also starts latch processing of the next one horizontal line worth of data. Subsequently, the processing returns to step S132, where the subsequent processing is repeated.

According to such processing, one PWM cycle of PWM control for adjusting the brightness of each emission element 21 is prolonged to the duration 3T from the duration T, thereby decreasing the switching frequency of the driver. Accordingly, the consumption power of the #1 data driver 123, #2 data driver 124, and #3 data driver 125 decreases, the life of the emission elements is prolonged, and EMI cannot readily be effected.

As described above, the display device 101 to which an embodiment has been applied includes the three data drivers of the #1 data driver 123, #2 data driver 124, and #3 data driver 125, whereby the emission elements 21 can light-emit three lines simultaneously.

Also, it goes without saying that the number of data drivers may be a number other than three. For example, in a case wherein the number of lines to be lit simultaneously is M, M data drivers are provided in parallel. Subsequently, data wiring lines M times triple the number of pixels arrayed in the vertical and horizontal directions are disposed on the display portion of monochrome display. Also, data wiring lines M times triple the number of pixels arrayed in the vertical and horizontal directions are disposed on the display portion of color display. Note that the number of scan wiring lines in the horizontal direction from the scan driver is the same as the number of horizontal lines making up one frame, and is unchanged. The scan start pulse supplied from the controller to the scan driver has pulse width M times the scan clock. Thus, the emission elements of one line are lit consecutively during the duration M×T, the emission start point-in-time of consecutive lines is shifted by the duration T, and accordingly, M lines are lit simultaneously at a time.

Also, the emission start timing of each line of the display portion 122 in the case of applying an embodiment is shifted by display duration of one frame/number of scan lines in the same way as the related art, so the response time for displaying one frame is the same as that in the related art. Note however, the emission duration of each line is 3T which is triple the length of that in the related art. Accordingly, as compared to the related art, brightness increases while maintaining the configuration according to the simple matrix method, which can be manufactured inexpensively.

Also, even in a case wherein each of the M data drivers can latch only one line worth of image data signals, in order to emit-light M lines at a time, the duration necessary for data transmission of one line needs to be within 3T. Accordingly, as compared to the related art, the data transmission rate of image signals corresponding to one line can be reduced.

Further, according to such a configuration, one PWM cycle of PWM control executed at the M data drivers becomes M times as to that in the related art. That is to say, the switching frequency of PWM decreases, so the life of the switching elements is prolonged, consumption power is reduced, and further EMI (Electro Magnetic Interference) by unnecessary radiation due to switching cannot readily be effected. Thus, the number of man-hour and number of components necessary for the measures against EMI can be reduced. Also, the switching frequency of LEDs employed as the emission elements 21 decreases, so the life of the LEDs is prolonged as compared to a case wherein the PWM cycle is short.

Also, lines to be lit are M consecutive lines, and control is performed such that the emission start point-in-time of each line is shifted by 1/M of the emission duration of one line. Accordingly, screen flickering and moving image blurring can be suppressed as compared to a case wherein separated multiple lines within a screen are arranged to be lit at a time.

Note that description has been made assuming that LEDs are employed as the emission elements 21 provided in the display portion of the display device 101, but even in a case wherein other elements such as liquid crystal are employed as the emission elements 21, the same configuration is provided, whereby brightness can be enhanced without changing the response rate of display, and occurrence of EMI can be suppressed as compared to a case wherein the PWM cycle is short.

Also, description has been made assuming that the number of lines worth of data drivers to be driven simultaneously are provided in parallel, but it goes without saying that a single data driver for performing the same driving processing as that in the case of employing the multiple data drivers may be connected to all of the data wiring lines.

Also, with the above description, the brightness of the LEDs employed as the emission elements 21 has been driven and controlled using PWM control, but the brightness of the LEDs may be controlled using not only PWM but also current control. Even in a case wherein the brightness of LEDs is controlled by current control, as described above, multiple lines are driven simultaneously, whereby the current value supplied per unit time to obtain the same brightness can be suppressed, and accordingly, the life of the LEDs can be prolonged.

Incidentally, in a case wherein the display device 101 is configured so as to perform color display, as described above, three LEDs of R, G, and B are provided as to one pixel. In this case, the number of data wiring lines necessary for one pixel becomes triple as to that in the case of monochrome display.

Like the above-mentioned display device 101, in a case wherein the emission elements 21 of three horizontal lines are lit simultaneously, when color display is performed, and three LEDs of R, G, and B (LEDs corresponding to each of RGB sub pixels) are provided as to one pixel, wiring lines ninefold (triple×triple) the number of pixels arrayed in the vertical and horizontal directions are disposed on the display portion 122 thereof. Also, for example, when the number of horizontal lines to be lit simultaneously is M, wiring lines further M times triple the number of pixels arrayed in the vertical and horizontal directions are disposed on the display portion 122.

Figure 14:
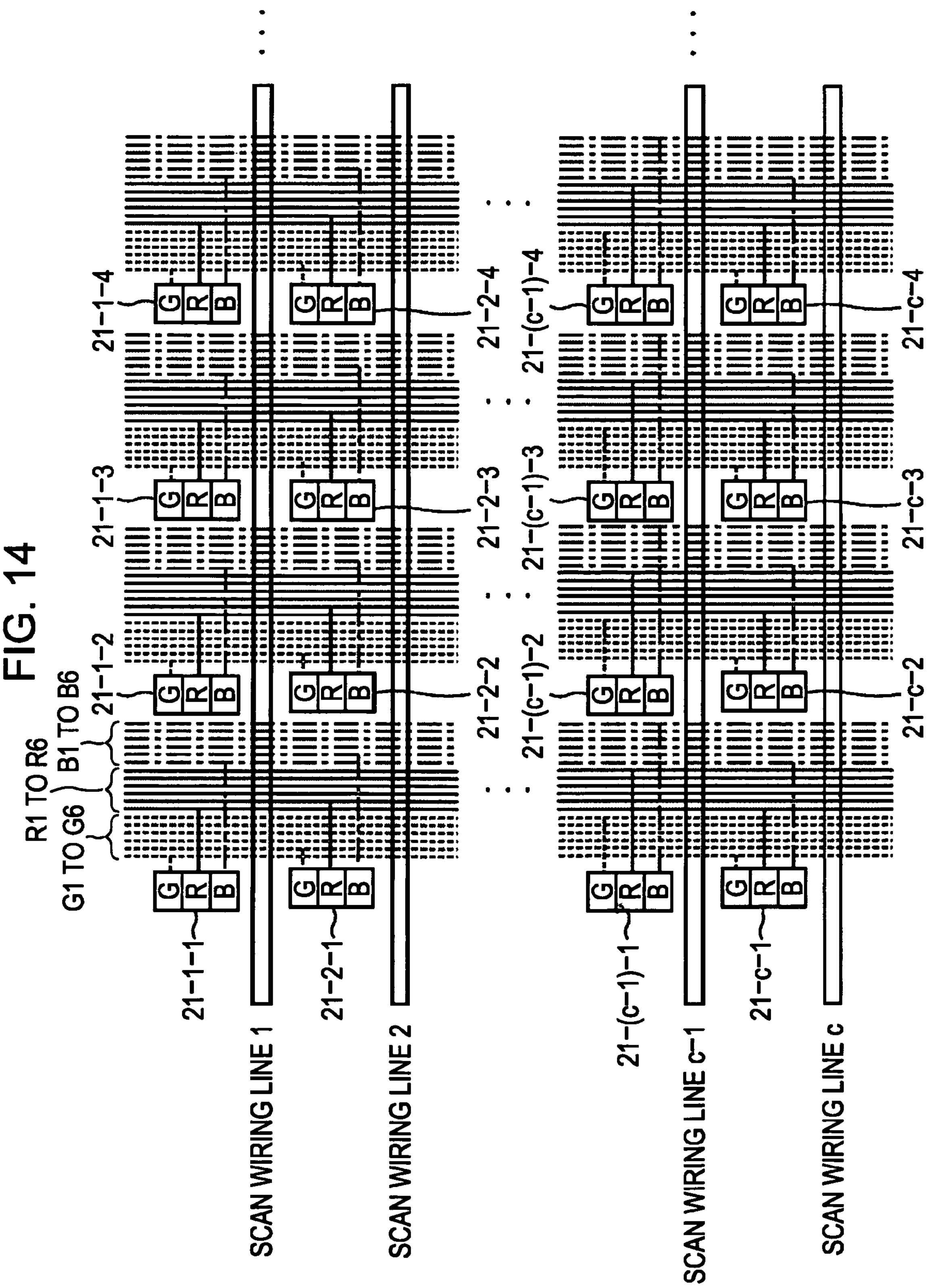
FIG. 14 is a diagram for describing a data wiring example in the case of emitting the light of six lines simultaneously.

For example, description will be made with reference to FIG. 14 regarding a case wherein with a simple matrix driven display device in which 1920×1080=2070000 sets are disposed with three LEDs of RGB as one pixel on a 40-inch type FHD (Full High Definition) panel, there is a need to light-emit six lines simultaneously to obtain necessary brightness. In FIG. 14, data wiring lines corresponding to G are represented with dotted lines, data wiring lines corresponding to R are represented with solid lines, and data wiring lines corresponding to B are represented with dashed dotted lines.

As shown in FIG. 14, as vertical wiring lines for supplying the output from six data drivers for driving emission elements 21-1-1, 21-2-1, . . . , **21-(*c*-1)-1, and 21-*c*-1 making up one column of pixels disposed on the leftmost position of one frame, there are provided 18 vertical wiring lines of G1 through G6 for G LEDs, R1 through R6 for R LEDs, and B1 through B6** for B LEDs. For example, in a case wherein with a 40-inch type FHD panel, the distance between pixel pitches is around 460 μm, RGB LEDs of 100 μm angular size are arrayed closely in the vertical direction, and the pixel dimensions of one pixel are 100μ in width, and 300μ in height, the space in the lateral direction where data wiring lines can be wired on the same flat surface is equal to or smaller than 360 μm. In a case wherein 18 lines worth of data wiring lines necessary for one pixel are wired thereupon, wiring of which the pitch is equal to or smaller than 20 μm is needed, and the wiring thereof is needed to be performed with precision of ±several μm as to 40-inch lateral screen size, i.e., 885 mm.

Further, in the case of employing LCD as the emission elements 21, in order to improve view angle characteristic (characteristic wherein brightness and chromaticity change depending on the screen viewing angle), a pixel configuration wherein each sub pixel is divided into two is employed in some cases. In this case, the number of data wiring lines further increases.

Accordingly, instead of employing three color set of RGB as emission elements making up one pixel, let us say that two colors of GR are assigned to a certain pixel, and two colors of GB are assigned to the pixel adjacent to the pixel thereof in the horizontal direction. In other words, each pixel is configured such that G, and either of R or B are paired to make up one pixel.

The emission elements making up one pixel is configured of a pair between G and either of R or B, and thus, for example, even in the case of simultaneous driving of six lines, 12 data wiring lines are needed as to one pixel, and accordingly, six data wiring lines can be reduced as to one pixel as compared to a case wherein one pixel is configured of three colors, and 18 data wiring lines are needed as to one pixel. Thus, the wiring pitch of the data wiring lines can be set to around 1.5 times (e.g., 30μ as to 20μ in the case of 40-inch type FHD panel) that in a case wherein one pixel is configured of three colors of RGB.

Thus, not only the precision of wiring pattern formation can be alleviated, but also the pitch of a portion being connected externally can be increased, and accordingly, an inexpensive LED display panel having a relatively simple configuration can be provided.

Figure 15:
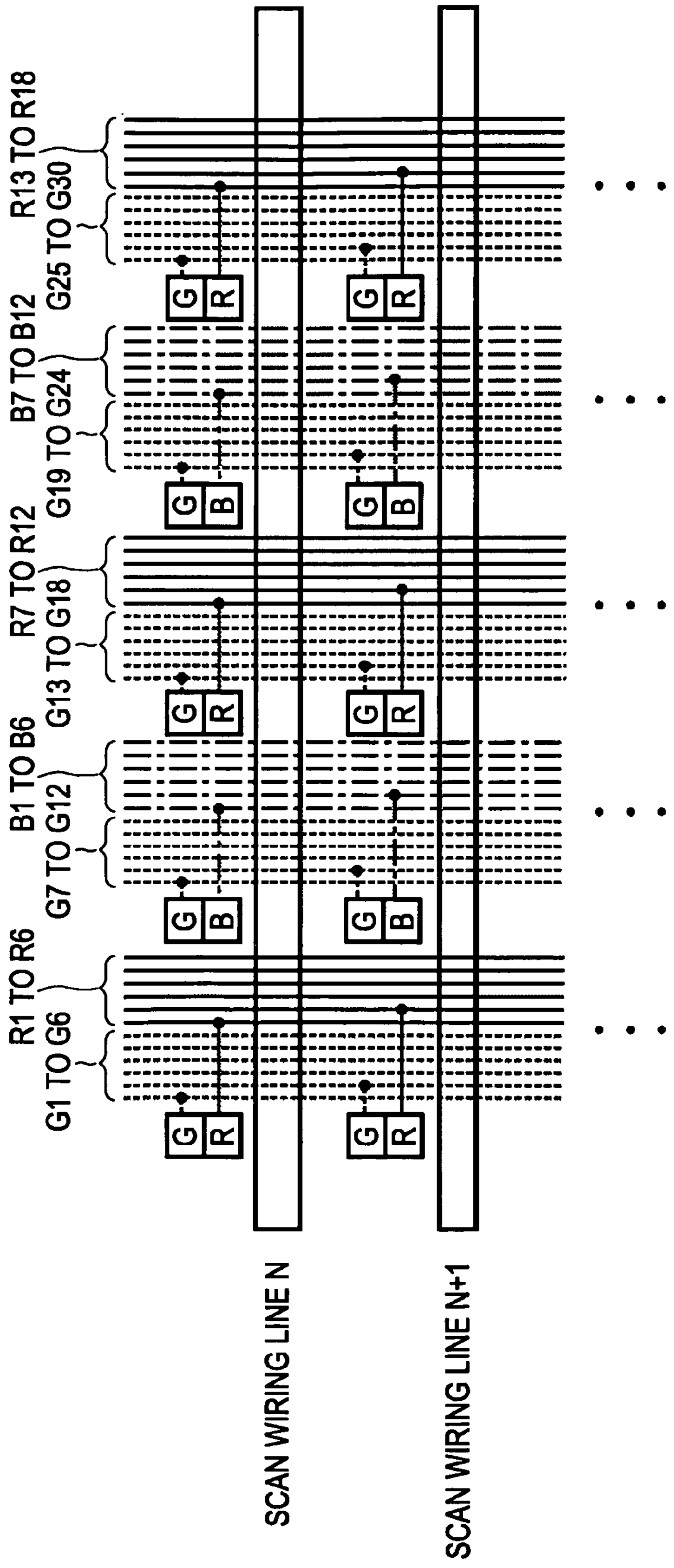
FIG. 15 is a diagram for describing a data wiring example in the case of configuring a pixel by taking each pixel and one of G, R, and B as a pair.
Figure 16:
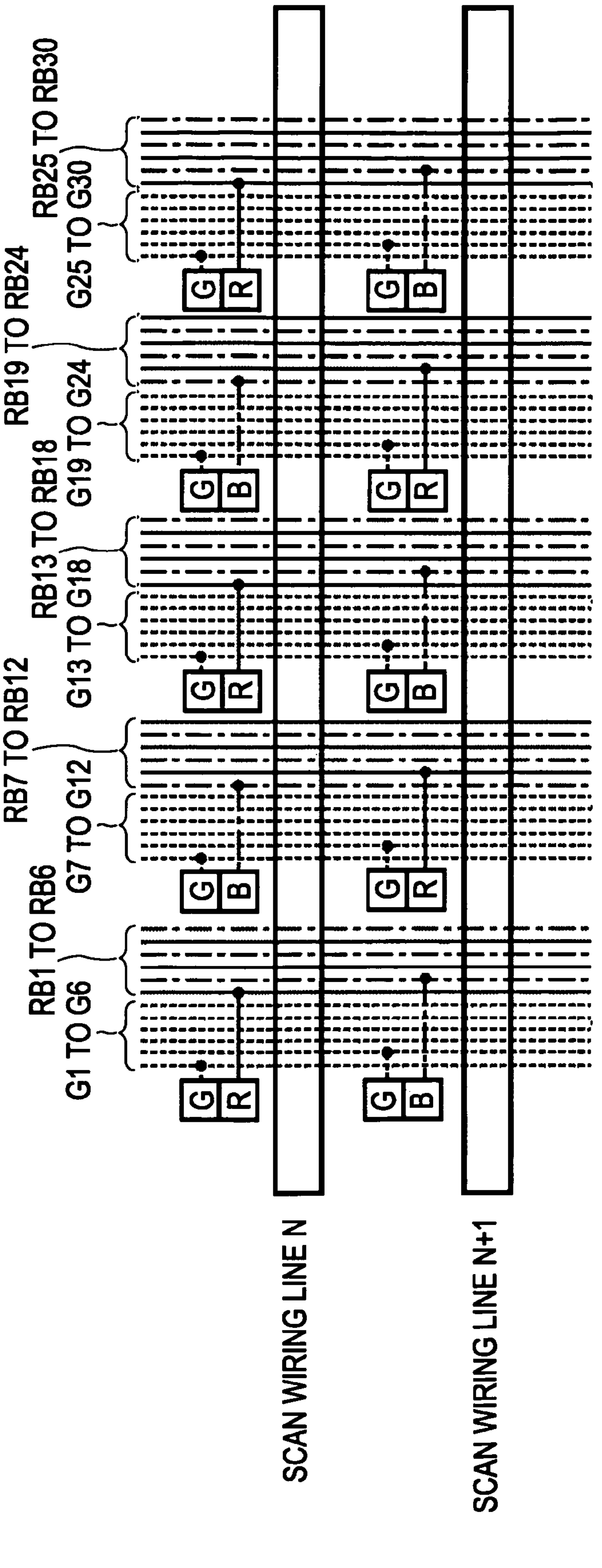
FIG. 16 is a diagram for describing a data wiring example in the case of configuring a pixel by taking each pixel and one of G, R, and B as a pair.
Figure 17:
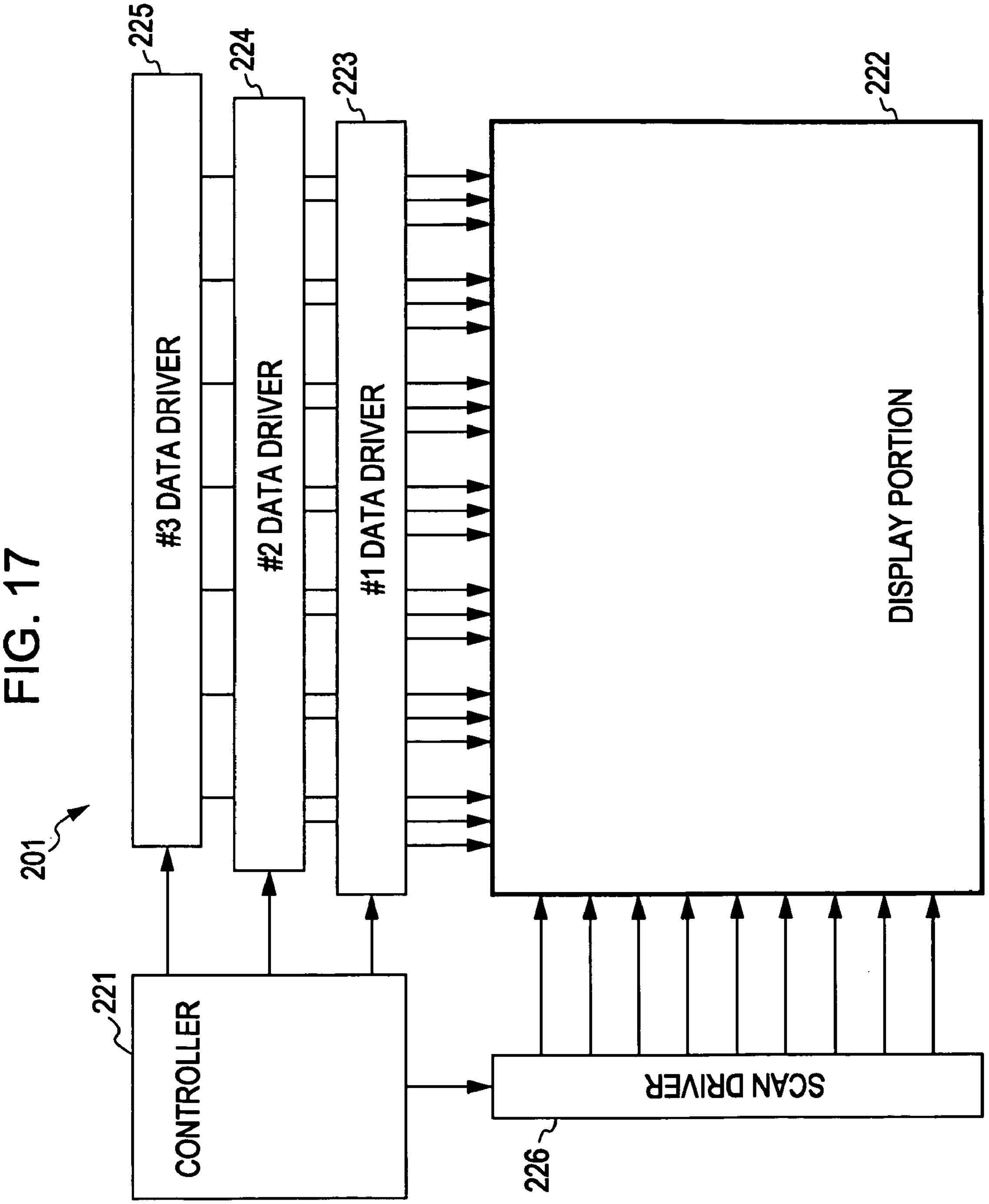
FIG. 17 is a diagram illustrating the configuration of the display device in the case of configuring a pixel by taking each pixel and one of G, R, and B as a pair.

Description will be made with reference to FIGS. 15 through 17 regarding a display device having a configuration wherein each pixel is configured of a pair between G and either of R or B.

First, description will be made with reference to FIG. 15 regarding a first example of an emission element array in a case wherein six lines are lit simultaneously, and a pixel is configured of a pair between G and either R or B. In FIG. 15 as well, data wiring lines corresponding to G are represented with dotted lines, data wiring lines corresponding to R are represented with solid lines, and data wiring lines corresponding to B are represented with dashed dotted lines.

In this example, with odd-numbered columns and even-numbered columns of emission elements making up a display portion, the emission elements of any one columns are configured such that a pair of G and R makes up one pixel, and the emission elements of the other columns are configured such that a pair of G and B makes up one pixel. Accordingly, as data wiring lines which are wiring lines for data signals of the leftmost column wherein the emission elements are configured such that a pair of G and R makes up one pixel, a total of 12 lines of G1 through G6 for G LEDs, and R1 through R6 for R LEDs are provided. As data wiring lines the second column from the left wherein the emission elements are configured such that a pair of G and B makes up one pixel, a total of 12 lines of G7 through G12 for G LEDs, and B1 through B6 for B LEDs are provided.

That is to say, with regard to G, the six data Wiring lines are consecutively arrayed and disposed between respective pixels, the data wiring lines G1, G7, G13, and so on are connected to pixels serving as the first line of the six lines to be driven simultaneously, the data Wiring lines G2, G8, G14, and so on are connected to pixels serving as the second line, hereafter, similarly, the data wiring lines G6, G12, G18, and so on are connected to pixels serving as the sixth line to be driven simultaneously.

Also, with regard to R and B, data wiring lines are disposed at intervals of one pixel in the horizontal direction, so the six data wiring lines for R are disposed between the first pixel and second pixel, the six data wiring lines for B are disposed between the second pixel and third pixel, and similar to the case of G, the data wiring lines R1, R7, R13, and so on, or data wiring lines B1, B7, B13, and so on are connected to pixels serving as the first line of the six lines to be driven simultaneously, the data wiring lines R2, R8, R14, and so on, or data wiring lines B2, B8, B14, and so on are connected to pixels serving as the second line, hereafter, similarly, the data Wiring lines R6, R12, R18, and so on, or data wiring lines B6, B12, B18, and so on are connected to pixels serving as the sixth line to be driven simultaneously.

That is to say, a total of 12 data wiring lines are disposed between the respective pixels, wherein the six data wiring lines for G are arrayed and disposed, and also the six data wiring lines for R or B are arrayed and disposed.

Next, description will be made with reference to FIG. 16 regarding a second example of an emission element array in a case wherein six lines are lit simultaneously, and a pixel is configured of a pair between G and either R or B. In FIG. 16 as well, data wiring lines corresponding to G are represented with dotted lines, data wiring lines corresponding to R are represented with solid lines, and data wiring lines corresponding to B are represented with dashed dotted lines.

In this example, with emission elements making up a display portion, the pixels adjacent to in the vertical and horizontal directions of emission elements wherein a pair of G and R makes up one pixel are taken as emission elements wherein a pair of G and B makes up one pixel, and the pixels adjacent to in the oblique directions of emission elements wherein a pair of G and R makes up one pixel are taken as emission elements wherein a pair of G and R makes up one pixel in the same way. Accordingly, as the data wiring lines of each column, there are provided a total of 12 lines of six lines for G LEDs, three lines for R LEDs, and three lines for B LEDs.

That is to say, with regard to G, in the same way as with the case of the first example, the six data wiring lines are consecutively arrayed and disposed between respective pixels, the data wiring lines G1, G7, G13, and so on are connected to pixels serving as the first line of the six lines to be driven simultaneously, the data wiring lines G2, G8, G14, and so on are connected to pixels serving as the second line, hereafter, similarly, the data wiring lines G6, G12, G18, and so on are connected to pixels serving as the sixth line to be driven simultaneously.

Also, with regard to R and B, data wiring lines are disposed at intervals of one pixel not only in the horizontal direction but also in the vertical direction, so the data wiring lines for R and data wiring lines for B are disposed at intervals of one pixel, the data wiring lines RB1, RB7, RB13, and so on are connected to pixels serving as the first line of the six lines to be driven simultaneously, the data wiring lines RB2, RB8, RB14, and so on are connected to pixels serving as the second line, hereafter, similarly, the data wiring lines RB6, RB12, RB18, and so on are connected to pixels serving as the sixth line to be driven simultaneously. Also, the data wiring lines RB1, RB2, RB3, and so on connected to the pixels of each line are provided such that the data wiring lines for R and the data wiring lines for B are provided alternately.

That is to say, a total of 12 data wiring lines are disposed between the respective pixels, wherein the six data wiring lines for G are arrayed and disposed, and also the six data wiring lines for R and B are alternately arrayed and disposed.

Thus, in order to configure a display panel compatible to FHD, the data wiring lines between pixels in the case of emission elements made up of horizontal 1920 pixels and vertical 1080 pixels (LEDs here, but this is true for elements other than LEDs) being arrayed are six lines for G and six lines for R or B. That is to say, the data wiring lines of the number of pixels in the horizontal direction, i.e., 1920×12=23040 lines are needed as the entire display portion.

In a case wherein a data wiring line is extracted to the substrate periphery for external connection, when laying out wiring lines and terminals (electrode pads and so forth provided on the end portions of wiring lines) evenly across the 40-inch lateral valid screen of 885 mm, around 38 μm pitch is realized, which enables connection employing an anisotropic conductive film (hereafter, referred to as ACF). Also, scan wiring lines wired in the horizontal direction for each line are connected to the side different from the data wiring lines of the emission elements 21 of all of the pixels (for each color) of a horizontal line, in the same way as those in the related art.

According to such a configuration, the number of data wiring lines for performing color display while light-emitting six horizontal lines simultaneously, can be reduced.

Note however, as described with reference to FIGS. 15 and 16, in the case of one pixel being configured of emission elements of two colors, as described with reference to FIG. 14, there is concern that resolution may deteriorate as compare to a case wherein one pixel is configured of emission elements of three colors.

Specifically, in order to configure a display panel compatible to FHD, in the case of emission elements made up of horizontal 1920 pixels and vertical 1080 pixels (LEDs here, but this is true for elements other than LEDs) being arrayed, with the emission elements 21 corresponding to G, all of the FHD pixels of 1920×1080 are arrayed, but with the emission elements 21 corresponding to R and B, a half of the number of pixels for G of 960×1080 are arrayed, respectively. Thus, in the case of the first example described with reference to FIG. 15, the effective resolution of R and B is a half in the horizontal direction, but in the case of the second example described with reference to FIG. 16, the effective resolution of R and B is the square roots of ½ each in the horizontal and vertical directions, i.e., around 0.7 times.

Note however, for example, such as television signals or the like, image signals to be displayed on a display device have already been thinned out on the signal transmission side, i.e., the picture fabrication side.

When generating an actual picture signal, on the transmission side of image signals to be displayed such as television signals, the pixels according to a broadcasting format are converted into a brightness component Y signal and color difference signals Cb and Cr, compression such as MPEG is performed based on the data thereof, following which the signals are transmitted to the reception side (i.e., a display device or reception device for supplying the television signals to a display device, etc.) of the television signals. At this time, processing for subjecting the signals Y, Cb, and Cr to digital sampling is performed, but with the sampling format on the transmission side necessary for high fidelity as well, the Y signal is subjected to sampling for each pixel, and Cb and Cr are subjected to sampling with the average of two pixels. Also, with MPEG compression or HD transmission signal, the vertical direction resolution of color difference signals further deteriorates, but this state causes no problem from the perspective of actual use.

Description will be made regarding the case of 4:2:2 format as an example wherein the sampling rate reaches the highest from the perspective of actual use on the transmission side. Sampling of component signals is performed for each pixel as to the maximum resolution on the imaging (transmission) side, i.e., 1920H×1080V. That is to say, transmission signals Y1, Cb1, and Cr1 are generated from imaging signals R1, G1, and B1 of the first pixel, transmission signals Y2, Cb2, and Cr2 are generated from imaging signals R1, G1, and B1 of the first pixel, and hereafter, similarly, the corresponding Y, Cb, and Cr are generated from the RGB of one pixel.

With the display device for obtaining image signals made up of Y, Cb, and Cr thus generated, and displaying these, first, as described with reference to FIG. 14, in a case wherein one pixel includes R, G, and B, description will be made regarding a case wherein the Y, Cb, and Cr of the obtained image signals are demodulated to R, G, and B corresponding to each LED.

If we say that the R, G, and B signals of a certain pixel are $r_a$, $g_a$, and $b_a$, the obtained image signals corresponding to the pixel thereof are $Y_a$, $Cb_a$, and $Cr_a$, the R, G, and B signals of a pixel adjacent to that pixel in the horizontal direction are $r_b$, $g_b$, and $b_b$, and the obtained image signals corresponding to the pixel thereof are $Y_b$, $Cb_b$, and $Cr_b$, the R, G, and B signals are demodulated based on the following Expressions (1) through (6). At this point, conversion from R, G, and B signals to Y, Cr, and Cb signals is reversible, and accordingly, complete demodulation can be performed.

$$g_a=Y_a-0.344Cb_a-0.714Cr_a \quad (1)$$

$$r_a=Y_a+1.402Cr_a \quad (2)$$

$$b_a=Y_a+1.772Cb_a \quad (3)$$

$$g_b=Y_b-0.344Cb_b-0.714Cr_b \quad (4)$$

$$r_b=Y_b+1.402Cr_b \quad (5)$$

$$b_b=Y_b+1.772Cb_b \quad (6)$$

Note however, in the case of a 4:2:2 format, as described above, with regard to the color difference signals Cb and Cr, one piece of data is sampled with two pixels adjacent to each other in the horizontal direction, so $Cb_a$ and $Cr_a$ are represented with the following Expressions (7) and (8).

$$Cb_a=Cb_b=0.564\times(B_a+B_b-Y_a-Y_b)/2 \quad (7)$$

$$Cr_a=Cr_b=0.713\times(R_a+R_b-Y_a-Y_b)/2 \quad (8)$$

Also, $Y_a$ and $Y_a$ are each represented with the following Expression (9).

$$Y_a=Y_b=0.299R+0.587G+0.144B \quad (9)$$

Now, if we say that $Cb_a=Cb_b=Cb$, and $Cr_a=Cr_b=Cr$, these two pixels are represented with the following Expressions (10) through (15). That is to say, demodulation is performed from the common Cb and Cr signals.

$$g_a=Y_a-0.344Cb-0.714Cr \quad (10)$$

$$r_a=Y_a+1.402Cr \quad (11)$$

$$b_a=Y_a+1.772Cb \quad (12)$$

$$g_b=Y_b-0.344Cb-0.714Cr \quad (13)$$

$$r_b=Y_b+1.402Cr \quad (14)$$

$$b_b=Y_b+1.772Cb \quad (15)$$

with the signal Cr, two pixels worth of signal level of $(R_a+R_b)$ is modulated with weighting of 70%, and similarly, two pixels worth of signal level of $(G_a+G_b)$ is modulated with weighting of around 60%. With the signal Cb, two pixels worth of signal level of $(B_a+B_b)$ is modulated with weighting of around 85%, and similarly, two pixels worth of signal level of $(G_a+G_b)$ is modulated with weighting of around 60%. Accordingly, even if the first pixel signal and the second pixel signal of G are each demodulated from different Y signals $(Y_a, Y_b)$, the first pixel of G gives influence not only with one pixel worth of signal level but also with two pixels worth of signal level with certain weighting at the time of subjecting Cr and Cb to two-pixel average sampling.

For example, in the case of demodulating $g_a$ from $Y_a$, even if $Y_a$ is a non-averaged signal, the two-pixel average weighting of G included in Cb gives influence of 60%×0.344, i.e., around 20%, the two-pixel average weighting of G included in Cr gives influence of 60%×0.71, i.e., around 40%, and in a case wherein there are brightness transitions of the first and second pixels of B and R, B gives influence of 35%, R gives influence of 50% as to the demodulation result of G.

Accordingly, even in a case wherein three colors of R, G, and B are disposed for each pixel, when performing signal transmission and demodulation using 4:2:2 format sampling, the signals of R, G, and B before transmission cannot be demodulated completely.

Next, similarly, with the display device for obtaining image signals made up of Y, Cb, and Cr, and displaying these, as described with reference to FIG. 15 or 16, in a case wherein one pixel is made up of G, and either R or B, description will be made regarding a case wherein the Y, Cb, and Cr of the obtained image signals are demodulated to R and G, or G and B corresponding to each LED.

In a case wherein a display portion configured of G and either R or B is driven with the image signals made up of Y, Cb, and Cr as described with reference to FIG. 15 or 16, for example, of two pixels adjacent to each other in the horizontal direction, G and R LEDs are provided at the first pixel, and G and B LEDs are provided at the second pixel, G can be processed for each pixel, but R and B needs to light-emit two pixels worth with one pixel.

That is to say, G and R of the first pixel are demodulated in accordance with the following Expressions (16) and (17), and G and B of the second pixel are demodulated in accordance with the following Expressions (18) and (19).

$$g_a = Y_a - 0.344Cb - 0.714Cr \tag{16}$$

$$r_a = ((Y_a + Y_b)/2 + 1.402Cr) \times 2 \tag{17}$$

$$g_b = Y_b - 0.344Cb - 0.714Cr \tag{18}$$

$$b_b = ((Y_a + Y_b)/2 + 1.772Cb) \times 2 \tag{19}$$

Note however, in the case of a 4:2:2 format, as described above, with regard to the color difference signals Cb and Cr, one piece of data is sampled with two pixels adjacent to each other in the horizontal direction, so $Cb_a$ and $Cr_a$ are represented with the following Expressions (7) and (8).

That is to say, when substituting Expressions (7) and (8) for Expressions (17) and (19), the following Expressions (20) and (21) are obtained.

$$r_a = R_a + R_b \tag{20}$$

$$b_b = B_a + B_b \tag{21}$$

That is to say, G is modulated for each pixel, and the original signal can be reproduced by adding two pixels worth signals to R and B for each two pixels.

That is to say, as compared to a case wherein one pixel includes R, G, and B, even in a case wherein R and B occupy a half of the number of pixels, with actual screen display, the pitch between R and B becomes coarse as viewed from close range, which sometimes makes a viewer feel color separation, but a transmitted picture is mostly reproducible in actual use.

That is to say, the Y signal represents a G component signal principally, Cb represents B and complementary color yellow component thereof, and Cr represents R and a complementary color cyan component signal, from the perspective of signal sampling on the transmission side, even if the number of pixels in the horizontal direction is reduced to a half on the display side, an image does not deteriorate greatly.

Next, description will be made with reference to FIG. 17 regarding the configuration of a display device 201 configured of a display portion including emission elements wherein one pixel is made up of G and either R or B.

The display device 201 is configured of a controller 221, display portion 222, #1 data driver 223, #2 data driver 224, #3 data driver 225, and scan driver 226.

In response to input of image data corresponding to an image to be displayed on the display portion 222, the controller 221 divides the image data in increments of horizontal line, executes the calculation processing for reproducing the original signal using the emission elements configured of a pair of G and either R or B, described with Expressions (16) through (21). Subsequently, the controller 221 supplies the image signal of each line obtained as a result of the calculation to each of the #1 data driver 223, #2 data driver 224, and #3 data driver 225. Also, the controller 221 controls the #1 data driver 223, #2 data driver 224, #3 data driver 225, and scan driver 226.

Specifically, the controller 221 supplies an image data signal after the calculation corresponding to the 3N+1'th line (where N is an integer; $0 \leqq N \leqq \{(\text{number of scan lines}-1)/3\}$) of one frame to the #1 data driver 223, supplies an image data signal after the calculation corresponding to the 3N+2'th line to the #2 data driver 224, and supplies an image data signal after the calculation corresponding to the 3N+3'th line to the #3 data driver 225. Also, the controller 221 supplies the scan start pulse to the scan driver 226 with pulse width which is six times the scan clock (multiples of the number of lines to be driven simultaneously).

With the display portion 222, the data wiring lines in the vertical direction in the drawing from the #1 data driver 223, #2 data driver 224, and #3 data driver 225, and the scan wiring lines in the horizontal direction in the drawing from the scan driver 226 are wired around in a vertical and horizontal grid pattern. The data wiring lines are wired as described with reference to FIGS. 15 and 16. Multiple emission elements are provided at an intersection portion between a data wiring line and scan wiring line. The display portion 222 displays an image using emission of the emission elements wherein one pixel is made up of G and either R or B, driven by the #1 data driver 223, #2 data driver 224, #3 data driver 225, and scan driver 226.

In response to supply of the scan start pulse having pulse width six times the scan clock (multiples of the number of lines to be driven simultaneously), the scan driver 226 light-emits six lines simultaneously, and scans and drives each emission element 21 provided on the display portion 222 such that the emission start timing of consecutive respective lines is shifted by the duration T, and each line is consecutively lit during duration 6T.

The #1 data driver 223 has basically the same configuration as the existing data driver 13 described with reference to FIG. 2, receives supply of the calculated image data signal wherein one pixel is made up of G and either R or B, corresponding to the 3N+1'th line of one frame, and supplies the current value corresponding to the image data to the emission elements 21 of n=1, 4, 7, 10, and so on at predetermined timing using PWM control.

The #2 data driver 224 has basically the same configuration as the existing data driver 13 described with reference to FIG. 2, receives supply of the calculated image data signal wherein one pixel is made up of G and either R or B, corresponding to the 3N+2'th line of one frame, and supplies the current value corresponding to the image data to the emission elements 21 of n=2, 5, 8, 11, and so on at predetermined timing using PWM control.

The #3 data driver 225 has basically the same configuration as the existing data driver 13 described with reference to FIG. 2, receives supply of the calculated image data signal wherein one pixel is made up of G and either R or B, corresponding to the 3N+3'th line of one frame, and supplies the current value corresponding to the image data to the emission elements 21 of n=3, 6, 9, 12, and so on at predetermined timing using PWM control.

Note that the number of data wiring lines from each of the #1 data driver 223, #2 data driver 224, and #3 data driver 225 is double the number of pixels arrayed in the horizontal direction at one frame. That is to say, with the display portion 222, the data wiring lines further six times (multiples of the number of lines to be driven simultaneously) double the number of pixels arrayed in the horizontal direction at one frame are provided in a column manner (vertical direction in FIG. 6). That is to say, with the display device 201, the total of the number of data wiring lines is reduced to ⅔ if the number of lines to be driven simultaneously is the same, as compared to the above-mentioned case wherein the data wiring lines from each of the #1 data driver 123, #2 data driver 124, and #3 data driver 125 of the display device 101 is triple the number of pixels arrayed in the horizontal direction at one frame.

Also, the output of the scan driver 226 and wiring of scan wiring lines are basically the same as those in the case of the above-mentioned display device 101, so detailed description thereof will be omitted.

Note that transmission of data signals and driving timing and so forth are basically the same as those in the case of the above-mentioned display device 101 through the number of lines to be driven simultaneously differs, so detailed description thereof will be omitted.

Thus, with the display device 201 to which the layout of the emission elements and data wiring described with reference to FIG. 15 or 16 have been applied, the number of data wiring lines for color display can be reduced.

Note that when displaying a color image at the display device 201 in the case of the layout of the emission elements and data wiring described with reference to FIG. 15, the emission points of R and B deviate, so the emission points are expanded. However, influence as to horizontal resolution causes no problem in actual use.

Specifically, with the Y signal, response around intermediate 1000 television lines (around two pitches) deteriorates, but the half value width of effective brightness even at high frequency is around 0.7 pitches for each pixel pitch, and is sufficiently resolved.

Also, with regard to color signals, Cb and Cr are both equal to or greater than sampling resolution on the B monochrome side and R monochrome side (plus side) respectively, which causes no problem. With the minus side of the complementary color side, the effective resolution of Cb is around 1.5 pitches at maximum, but the effective resolution of Cr is 2.8 pitches at maximum, which exceeds two pitches of Cr sampling resolution in some cases. However, this assumes a case wherein 4:2:2 is directly displayed, the resolution of an actual signal is less than that, which causes no problem in actual use.

Thus, with the display device 201 capable color display according to the simple matrix method by employing a configuration wherein the pixels of R and B are thinned out to one half without reducing the number of pixels of G which highly contributes to brightness and resolution, and one pixel is made up of a pair of G and either R or B, the number of data wiring lines can be reduced without causing image resolution to deteriorate greatly. That is to say, according to the properties of television signals, great image deterioration is not caused by thinning out the pixels of R and B. Also, reducing the number of data wiring lines enables the pitch interval of external connection terminals on a substrate making up the display portion 222 to be increased, and thus, connection between the substrate and driver or the like can be readily performed with reliability, and also FHD according to a small type panel can be realized.

Note here that description has been made regarding the case of employing LEDs as the emission elements, but even in a case wherein elements different from LEDs are employed as the emission elements, similarly, the number of wiring lines (supplied from the data drivers) in the vertical direction can be reduced by applying a configuration wherein one pixel is made up of a pair of G and either R or B.

Also, description has been made here regarding the case wherein multiple horizontal lines are lit simultaneously as an example, but for example, even in a case wherein with the existing simple matrix method described with reference to FIG. 1, a configuration wherein one pixel is made up of a pair of G and either R or B is applied, it goes without saying that the number of wiring lines (supplied from data drivers) in the vertical direction can be reduced similarly.

That is to say, in the case wherein multiple horizontal lines are lit simultaneously, in particular, the number of wiring lines (supplied from data drivers) in the vertical direction increases by the worth of multiplying the number of simultaneous emission lines, so with the display device 201 described with reference to FIG. 17, a very marked advantage can be provided so as to ensure brightness while reducing the number of data wiring lines. On the other hand, for example, with the existing simple matrix method described with reference to FIG. 1, in the case of applying a configuration wherein one pixel is made up of a pair of G and either R or B, as compared to the above-mentioned case of the display device 201 described with reference to FIG. 17, brightness cannot be ensured, but an advantage wherein the number of data wiring lines is reduced can be provided similarly.

Further, in a case wherein LCD is employed as the emission elements 21, in order to improve view angle characteristic (characteristic wherein brightness and chromaticity change depending on a screen view angle), a pixel configuration wherein each sub pixel is divided into two is employed in some cases, but in this case as well, an advantage wherein the number of data wiring lines is reduced can be provided by applying a configuration wherein one pixel is made up of a pair of G and either R or B.

Incidentally, as described above, with the display portions 122 and 222, multiple scan wiring lines and data wiring lines are arrayed on a substrate pair or a single substrate so as to intersect the emission elements 21 portion such as LEDs. For example, in a case wherein the display portion 122 or 222 is configured of a substrate pair, scan wiring lines are disposed on one substrate of the substrate pair, and data wiring lines are disposed on the other substrate. In this case, an arrangement is made wherein with each of the substrates, the wiring lines are bundled to a certain number of lines, and are extracted from a valid screen region on one substrate to the edge portion of the substrate, thereby preventing interference with the electrode wiring lines of the other substrate, and connecting to an external driving circuit.

Figure 18:
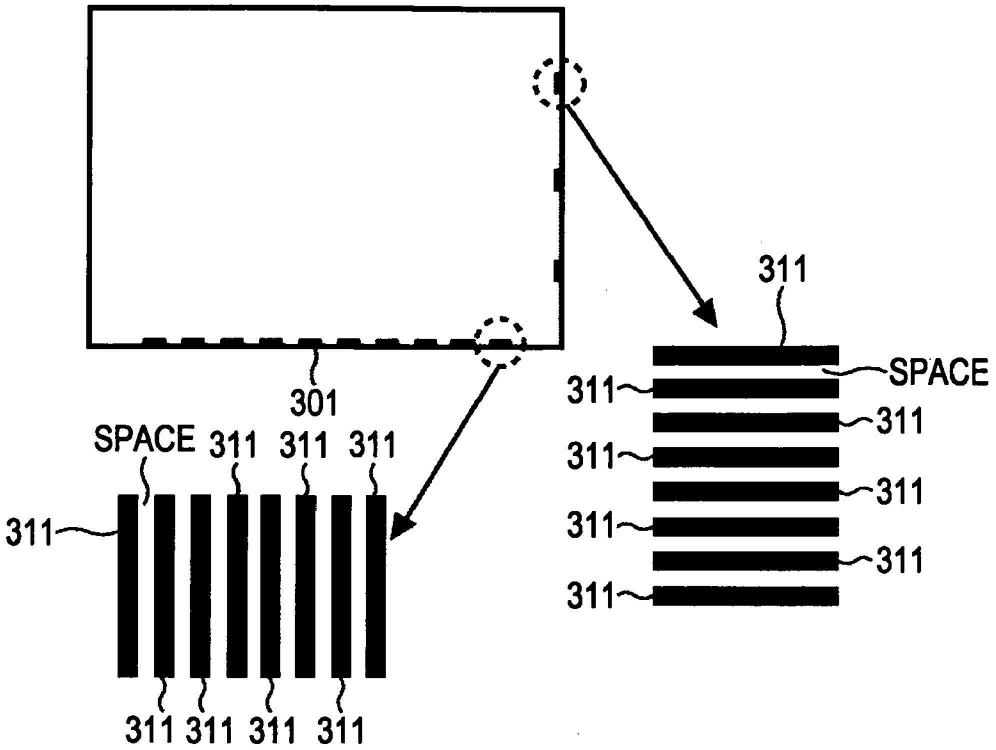
FIG. 18 is a diagram for describing the layout of existing electrode pads.
Figure 19:
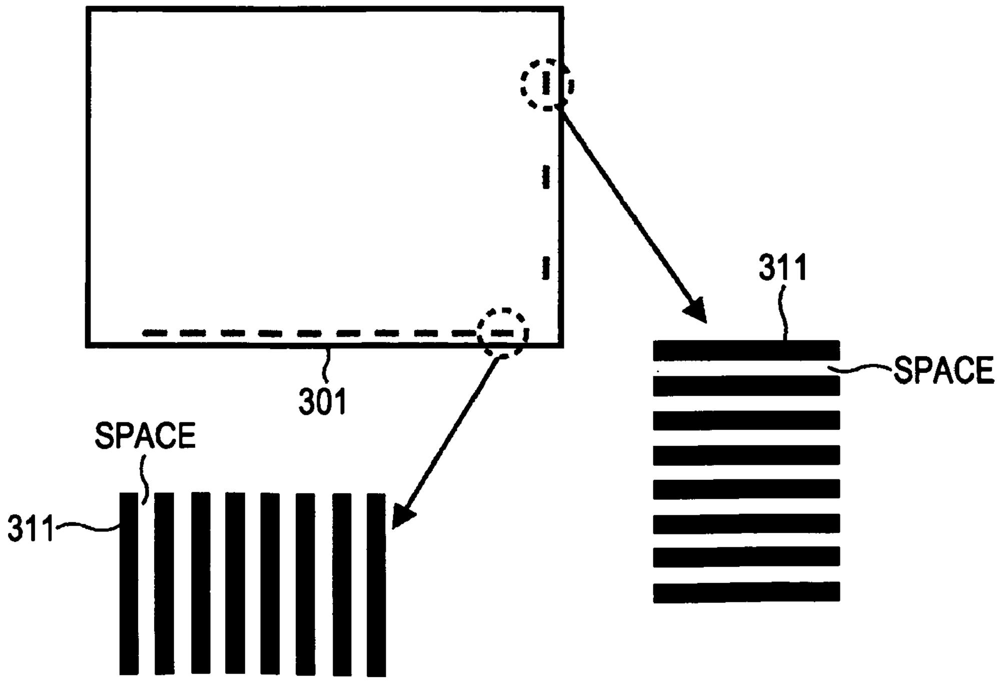
FIG. 19 is a diagram for describing the layout of existing electrode pads.

For example, as shown in FIG. 18, the wiring lines extracted to the end portion of a glass substrate 301 are connected to electrode pads 311 arrayed one-dimensionally along the side edge portion of the glass substrate 301. Also, as shown in FIG. 19, the electrode pads 311 may be provided inner side than the substrate edge portion. As shown in FIGS. 18 and 19, the electrode pads 311 are configured in a line form, and space is provided between lines, whereby leakage between electrodes can be prevented. As shown in FIGS. 18 and 19, in a case wherein electrode pads are provided along the multiple sides of the substrate, the electrode pads can superficially be viewed as if the electrode pads were disposed on the substrate two-dimensionally, but when focusing on a certain side, the electrode pads 311 are provided one-dimensionally. In other words, this can be regarded as a situation wherein with the glass substrate 301, there are multiple sides where electrode pads are one-dimensionally provided.

As described above, with the display device, high image quality and high resolution are requested, and accordingly, it has been expected to increase the number of pixels per unit area. Also, with the above-mentioned display device 101 or 201, an arrangement is made to realize high brightness Wherein the number of scan wiring lines to be driven simultaneously within a unit display field is increased, and display brightness is improved while maintaining moving image properties.

In such a case, there is a need to thin data wiring lines extracted from a pixel array by the worth wherein the absolute area of pixels is reduced, and further, there is a need to thin the data wiring lines by the worth wherein the number of lines to be driven simultaneously. Particularly, with the display portion 122 or 222 wherein color display is performed, and the number of lines to be driven simultaneously is M, there are disposed data wiring lines further M times triple the number of pixels arrayed in the horizontal direction. Accordingly, in a case wherein the electrode pads 311 to be connected to the wiring lines routed to the substrate edge portion are arrayed one-dimensionally along the side edge portion of the glass substrate 301 as described with reference to FIG. 18 or 19, the width of the electrodes is thinned, and the distance between the electrodes is markedly shortened.

Further, in the case of employing LCD as the emission elements 21, in order to improve view angle characteristic, a pixel configuration wherein each sub pixel is divided into two is employed in some cases. In this case, the number of data wiring lines further increases, the width of the electrodes is further thinned, and the distance between the electrodes is further shortened.

Also, the substrate pair making up the display portion 122 or 222, and each driver (e.g., #1 data driver 123, #2 data driver 124, and #3 data driver 125) which is an external driving circuit are connected through a TAB (Tape Automated Bonding) substrate such as a flexible printed circuit (FPC) substrate. The flexible printed circuit substrate is a printed circuit substrate having flexibility which can be deformed greatly, and can maintain its electric characteristic even after deformation. Examples of the flexible printed circuit substrate include a TCP (Tape Carrier Package) and COF (Chip On Film). The electrode pads 311 provided on the substrate making up the display portion 122 or 222, and the TAB substrate such as a flexible printed circuit substrate are generally connected by thermal compression bonding through an anisotropic conductive film (AFC) therebetween. Note however, thermal compression bonding conditions are restricted depending on the distance between the electrodes, pitches, number of electrode, and electrode surface state of the electrode pads 311 to be connected.

Specifically, under certain conditions such that the electrode pitches are equal to or shorter than 50 μm, or the like, a problem is caused from the relation of the diameter of electroconductive particle for ensuring electroconductivity within an AFC member, wherein there is a region where AFC connection itself cannot be performed.

That is to say, under such conditions for connecting a great number of thin wiring lines, conditions for compression bonding connection between the electrode pads 311 provided on the tip portion of the data wiring lines extracted to the outer circumference of the glass substrate 301 and a TAB substrate such as a flexible printed circuit substrate are markedly restricted. Accordingly, at the time of compression bonding connection, it is very difficult to prevent occurrence of inter-electrode leakage and poor positioning due to thinning of electrode pitches, and suppress deterioration in reliability, while satisfying restrictive conditions.

In order to avoid this situation, heretofore, an arrangement has been made wherein the electrode pads 311 arrayed one-dimensionally along the side edge portion of the glass substrate 301 are arrayed two-dimensionally, thereby ensuring the distance between the electrode pads 311.

Figure 20:
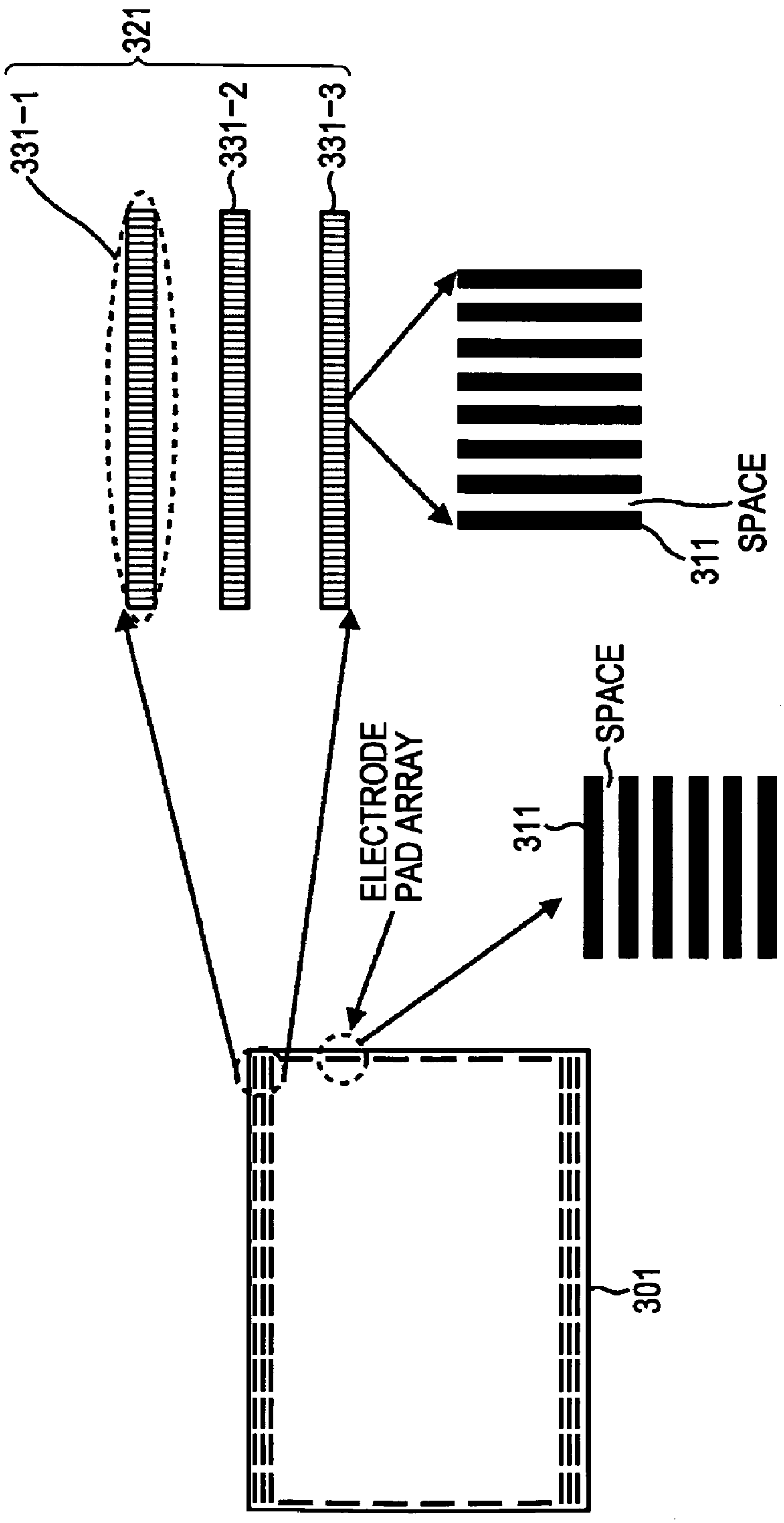
FIG. 20 is a diagram for describing electrode pads arrayed two-dimensionally.

With regard to the data wiring lines, the number of wiring lines are changed depending on whether color display or monochrome display, or the number of lines to be driven simultaneously. For example, as shown in FIG. 20, with a connection portion 321 where the electrode pads 311 of the data wiring lines are provided along the side edge portion in the lateral direction in the drawing of the glass substrate 301, heretofore, an arrangement has been made wherein the electrode pads 311 arrayed one-dimensionally are arrayed two-dimensionally along the side edge portion. With the connection portion 321, electrode pad arrays 331-1 through 331-3 are arrayed three rows in order and provided so as to be in parallel with the closest one side.

Description has been made here assuming that the electrode pad arrays 331 are arrayed multiple rows in order and provided, but this row has different meaning from the lines and columns within an image, and means that multiple arrays are provided, and accordingly, the direction thereof is not restricted to the same direction of the columns of the lines and columns within an image.

With each of the electrode pad arrays 331-1 through 331-3, a predetermined number of electrode pads 311 are arrayed one-dimensionally in the direction in parallel with the corresponding one side. Also, with the edge portion in the vertical direction in the drawing of the glass substrate 301 where the electrode pads 311 of the scan wiring lines of which the number of wiring lines is not changed depending on whether color display or monochrome display, or the number of lines to be driven simultaneously, the electrode pads 311 may be disposed one-dimensionally in the same way as with the related art.

That is to say, basically, the electrode pad arrays 331 are arrayed X rows (X is a multiple integer) in the direction orthogonal to the data wiring lines, on the side edge portion of the glass substrate 301, and each of the electrode pad arrays 331 is connected to a data wiring line at intervals of (X−1) lines, whereby the placement interval of the electrode pads 311 can be alleviated X times as to the interval of the data wiring lines. Thus, the distance between the electrodes can be ensured, and for example, connection employing an AFC can be performed.

Note that as a two-dimensional placement method of the electrode pads 311, FIG. 20 illustrates a case wherein multiple pad arrays each of which is disposed one-dimensionally are arrayed in parallel, but even with arbitrary two-dimensional placement of which the format differs from the case shown in FIG. 20, the electrode pads 311 arrayed one-dimensionally are arrayed two-dimensionally, whereby the distance between the electrode pads 311 can be ensured, and accordingly, connection to an external driving circuit can be performed appropriately by applying an existing thermal compression bonding method.

Also, with the edge portion in the vertical direction in the drawing of the glass substrate 301 where the electrode pads 311 of the scan wiring lines of which the number of wiring lines is not changed depending on whether color display or monochrome display, or the number of lines to be driven simultaneously, the electrode pads 311 may be disposed one-dimensionally in the same way as with the related art. Further, in a case wherein the electrode pitches of the electrode pads 311 of the scan wiring lines needs to be ensured due to other cause, or in a case wherein the place where the electrode pads 311 of the scan wiring lines are provided includes a restriction, or the like, it goes without saying that the electrode pads 311 provided on the side edge portion in the vertical direction in the drawing of the glass substrate 301 may be arrayed two-dimensionally. Also, for example, routing of the data wiring lines is modified, and a part of the electrode pads 311 connected to the data wiring lines are disposed on the side edge portion in the vertical direction in the drawing of the glass substrate 301, room occurs on the place where the electrode pads 311 of the data wiring lines are provided, and on the other hand, in a case wherein the place where the electrode pads 311 of the scan wiring lines are provided includes a great restriction, an arrangement may be made wherein the electrode pads 311 of the data wiring lines are disposed one-dimensionally, and the electrode pads 311 of the scan wiring lines are disposed two-dimensionally.

Description will be made regarding extraction of wiring lines with reference to FIG. 21. For example, with the display device 101 described with reference to FIG. 6, data wiring lines of which the number of lines is the number of pixel columns or the number of integral multiples thereof are extracted to the outer circumferential portion of the glass substrate 301. Subsequently, the extracted data wiring lines are connected to a driving circuit such as an external driver or the like by the electrode pads 311 provided on the connection portion 321.

In a case wherein the width in the column direction of one pixel is set to 0.21 mm tentatively, at the time of three column simultaneous driving and color display, nine data wiring lines are extracted from the pixel column width of 0.21 mm, which means that the data wiring lines are disposed with 21 μm pitches even in the case of the most simple thought. The data Wiring line extracted from a pixel with 21 μm pitches is connected to the connection portion 321 while somewhat expanding the pitches thereof as the data wiring approaches the outer circumferential portion of the glass substrate 301, if possible.

Figure 21:
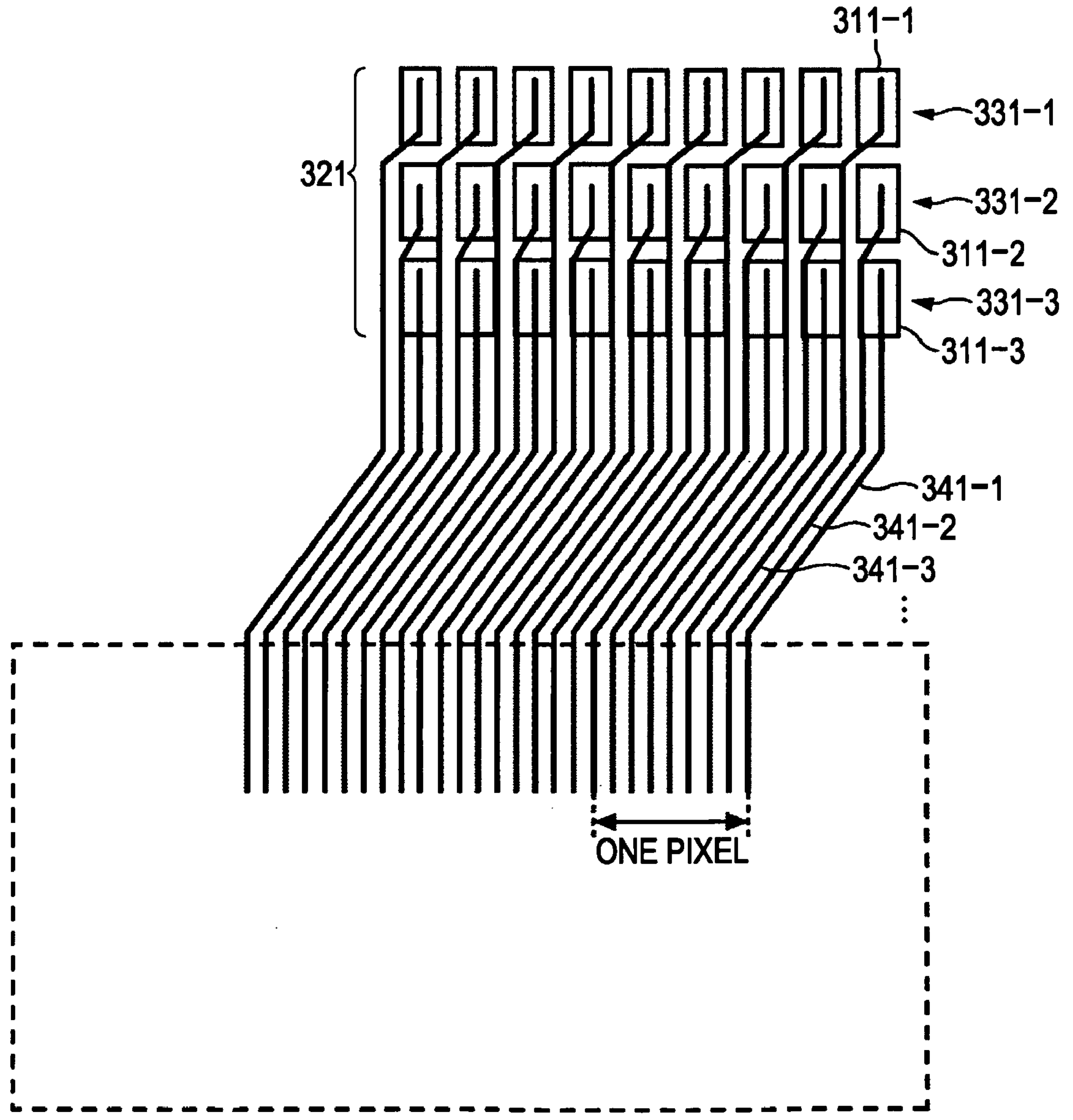
FIG. 21 is a diagram for describing a relation between electrode pads arrayed two-dimensionally and wiring lines.

At this time, as shown in FIG. 21, when assuming that the wiring lines are wiring lines 341-1, 341-2, 341-3, and so on from the right edge in the drawing, it is desirable that wiring lines thinned out at a certain interval make up the same pad array such that the wiring lines 341-1, 341-4, and 341-7 are connected to the electrode pad array 331-3, the wiring lines 341-2, 341-5, and 341-8 are connected to the electrode pad array 331-2, and the wiring lines 341-3, 341-6, and 341-9 are connected to the electrode pad array 1331-1, but an arbitrary order may be employed.

Now, in a case wherein the electrode pads 311 are disposed two-dimensionally, two electrode pad arrays 331 may be provided, or four or more electrode pad arrays 331 may be provided. Note however, in a case wherein the electrode pads 311 of the data wiring lines are arrayed two-dimensionally, when the number of lines to be driven simultaneously is M, it is desirable to provide M electrode pad arrays 331.

For example, in a case wherein with color display, one pixel is configured of three colors of R, G, and B, the number of data wiring lines connected the emission elements 21 corresponding to a certain pixel is three, which corresponds to each of R, G, and B. Also, for example, a case wherein with color display, the number of lines to be driven simultaneously is three, the emission elements 21 provided on the same column are, as described above, connected to one of the three data drivers (#1 data driver 123, #2 data driver 124, and #3 data driver 125). Accordingly, as shown in FIG. 21, the number of data wiring lines wired in the vertical direction in the drawing to the width of one pixel is nine.

Here, the nine data wiring lines wired in the vertical direction in the drawing to the width of one pixel are supplied to the three data drivers three lines to each. Now, for example, let us say that the wiring line 341-1 is a data wiring line corresponding to R of the emission elements disposed on the first line, the wiring line 341-2 is a data wiring line corresponding to R of the emission elements disposed on the second line, and the wiring line 341-3 is a data wiring line corresponding to R of the emission elements disposed on the third line. Also, let us say that the wiring line 341-4 is a data wiring line corresponding to G of the emission elements disposed on the first line, the wiring line 341-5 is a data wiring line corresponding to G of the emission elements disposed on the second line, and the wiring line 341-6 is a data wiring line corresponding to G of the emission elements disposed on the third line. Also, let us say that the wiring line 341-7 is a data wiring line corresponding to B of the emission elements disposed on the first line, the wiring line 341-8 is a data wiring line corresponding to B of the emission elements disposed on the second line, and the wiring line 341-9 is a data wiring line corresponding to B of the emission elements disposed on the third line.

In a case wherein the wiring lines are thus routed, as shown in FIG. 21, when the wiring lines 341-1, 341-4, and 341-7 are connected to the electrode pad array 331-3, the wiring lines 341-2, 341-5, and 341-8 are connected to the electrode pad array 331-2, and the wiring lines 341-3, 341-6, and 341-9 are connected to the electrode pad array 331-1, the data wiring lines connected to each of the electrode pad arrays 331-1, 331-2, and 331-3 are each connected to the emission elements 21 disposed on the same line. Accordingly, each of the electrode pad arrays 331-1, 331-2, and 331-3 needs to be connected to the corresponding data driver of the #1 data driver 123, #2 data driver 124, and #3 data driver 125, i.e., the wiring line to be each connected to a different data driver, whereby facilitating wiring design from the connection portion 321 to the corresponding data driver of the #1 data driver 123, #2 data driver 124, and #3 data driver 125.

In other words, in the case of the wiring lines being routed such as described above, with the connection portion 321 for connecting the on-substrate wiring line extracted from the display portion where M arrays are driven simultaneously externally, the electrode pads 311 which are connection terminals between each wiring line and the outside thereof are arrayed two-dimensionally so as to make up M arrays, and if we say that N is an integer satisfying $0 \leqq N \leqq \{(\text{number of scan lines}-1)/M\}$, a is an integer satisfying $1 \leqq a \leqq M$, and the electrode pads 311 of the a'th array of the M arrays are connected to the emission elements 21 on the (MN+a)'th line, thereby facilitating external wiring design from the connection portion 321.

Also, even in a case wherein as described with reference to FIGS. 15 and 16, the placement of an emission element is a pair of G and either R or B, similarly, and if we say that N is an integer satisfying $0 \leqq N \leqq \{(\text{number of scan lines}-1)/M\}$, a is an integer satisfying $1 \leqq a \leqq M$, and the electrode pads 311 of the a'th array of the M arrays are connected to the emission elements 21 on the (MN+a)'th line, thereby facilitating external wiring design from the connection portion 321.

Also, even in a case wherein the relation between routing of a wiring line and the line on which the corresponding emission element 21 is disposed is not identical to the above-mentioned relation, if we say that the data wiring line connected to one of the electrode pad arrays 331 is the data wiring line connected to the emission element 21 of the same line on the display portion 122 or 222, thereby facilitating external wiring design from the connection portion 321.

Figure 22:
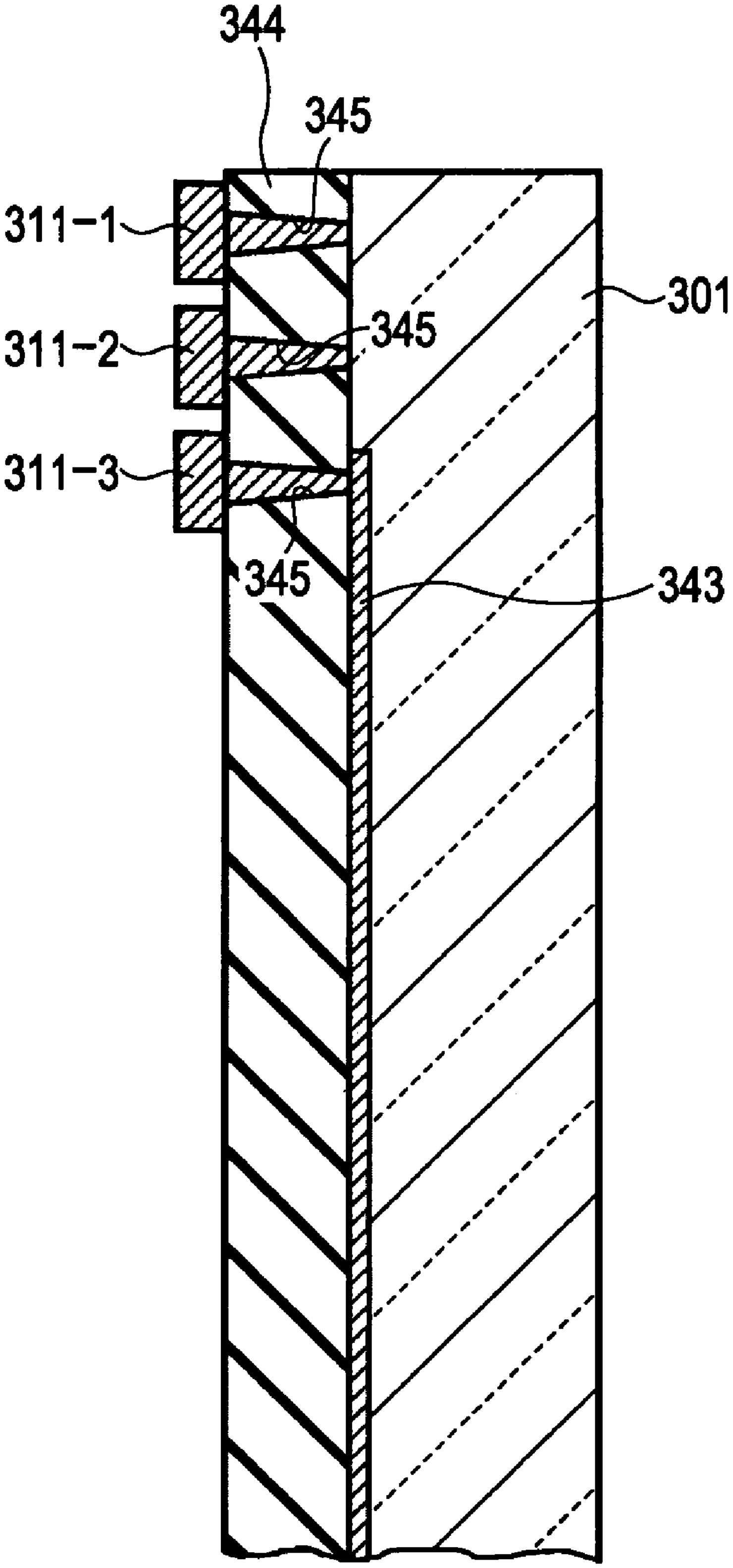
FIG. 22 is a diagram illustrating a configuration example of wiring lines and electrode pads.

FIG. 22 is a cross-sectional view in a case wherein the connection portion 321 periphery portion of the glass substrate 301 described with reference to FIG. 21 is cut away in the thickness direction of the glass substrate 301, and also in the direction in parallel with the wiring direction of the wiring line connected to the electrode pads 311 of the connection portion 321. The configuration for realizing the electrode pads disposed two-dimensionally will be described with reference to the cross-sectional view shown in FIG. 22.

Lower layer wiring lines 343 made up of, for example, metal such as Cu or the like or other electroconductive material are disposed typically using a photo lithography technique or the like. The wiring line illustrated in FIG. 22 is the lower layer wiring line 343 corresponding to the wiring line 341-1 shown in FIG. 21. Subsequently, an insulating layer 344 made up of an insulator such as a resin is typically formed on the lower layer wiring line 343. Subsequently, vias (or through hole) 345 which are fine holes is provided in the insulating layer 344, metal such as Cu or other electroconductive material is filled in the vias 345, and an arrangement is made so as to obtain electroconductivity as to the upper face of the insulating layer 344 from the lower layer wiring line 343 selectively. Subsequently, the electrode pads 311 are formed on the vias 345.

That is to say, of the nine data wiring lines wired in the vertical direction in the drawing at the width of one pixel, the lower layer wiring line 343-1 and thereafter every two lines are thinned out, one third of the overall lower layer wiring lines 343 are connected to the electrode pads 311 of the electrode pad array 331-3 furthest from the outer circumferential portion of the electrode pad arrays 331 through the vias 345. Subsequently, the lower layer wiring line 343-2 and thereafter every two lines are thinned out, one third of the overall lower layer wiring lines 343 are connected to the electrode pads 311 of the electrode pad array 331-2 provided in the middle of the electrode pad arrays 331 through the vias 345. Subsequently, the lower layer wiring line 343-3 and thereafter every two lines are thinned out, one third of the overall lower layer wiring lines 343 are connected to the electrode pads 311 of the electrode pad array 331-2 closest to the outer circumferential portion of the electrode pad arrays 331 through the vias 345.

Thus, while the number of lines is thinned out ⅓ at a time as to the overall data wiring lines, the electrode pads 311 provided on each of the electrode pad arrays 331 provided three rows, and the data wiring lines are connected. Accordingly, with each of the electrode pad arrays 331, electrode pitches can be ensured as compared to the pitches of the data wiring lines. Thus, the width of the connection portion 321 can be prevented from being lengthened, and accordingly, the frame width of the display portion 122 or 222 can be reduced.

The material quality of the electrode pads 311 nay be copper (Cu), or gold (Au) coating may be applied onto copper (Cu). Also, other than this, with regard to the material quality of the electrode pads 311, nickel (Ni) and gold (Au) coating may be applied onto copper (Cu), or tin (Sn) coating may be applied.

Description will be made regarding a configuration example of the electrode pads 311 with reference to FIGS. 23A through 25B.

Figure 23A:
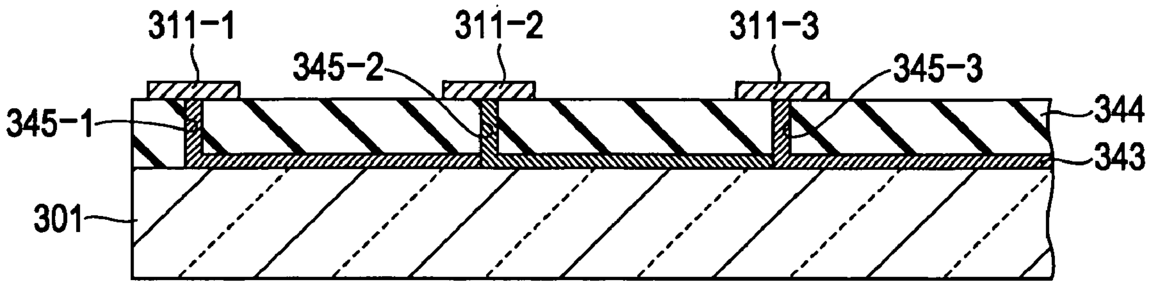
FIGS. 23A and 23B are diagrams illustrating a configuration example of wiring lines and electrode pads.
Figure 23B:
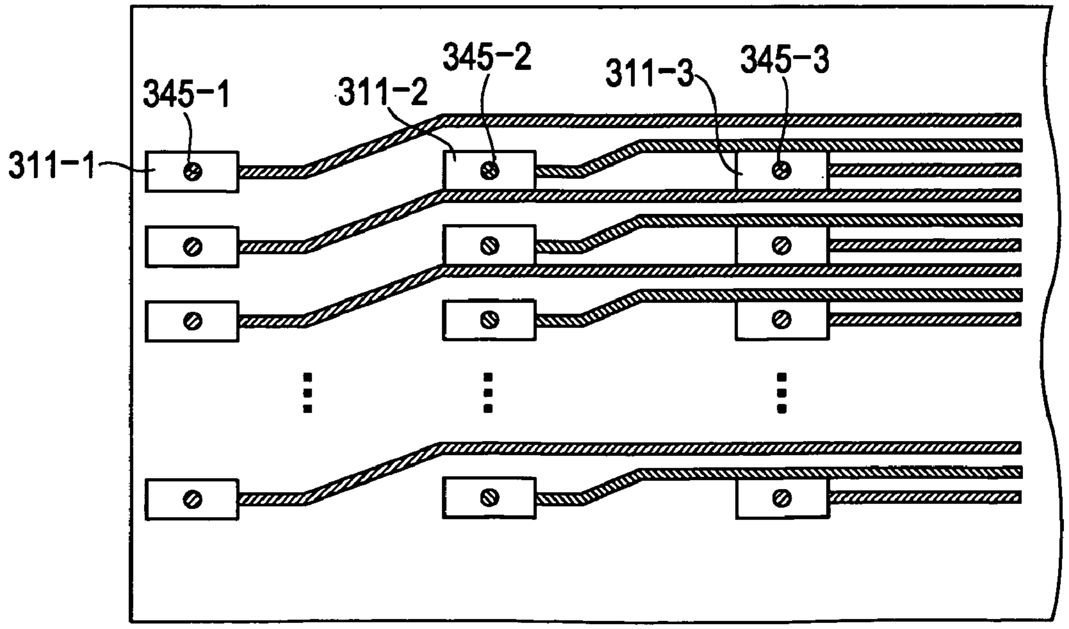

FIG. 23A is a cross-sectional view in a case wherein the connection portion 321 according to a first example of the configuration of the electrode pads 311 is cut away in the thickness direction of the glass substrate 301, and also in the direction in parallel with the wiring direction of the wiring line connected to the electrode pads 311 of the connection portion 321, and FIG. 23B is a plan transparency view illustrating the lower layer Wiring lines 343 by transmitting the insulating layer 344 of the connection portion 321 according to the first example of the configuration of the electrode pads 311 as viewed from the side where the insulating layer 344 is applied to the glass substrate 301. For example, in a case wherein the shapes of the electrode pads 311 are taken as a rectangular, and the positions of the electrode pads 311 and vias 345 are arranged so as to be identical in the vertical direction with each of the electrode pad arrays 331, as shown in FIG. 23B, the lower layer wiring lines 343 are partially bent, and are connected to the electrode pads 311 and vias 345 disposed so as to be identical in the vertical direction with each of the electrode pad arrays 331.

Figure 24A:
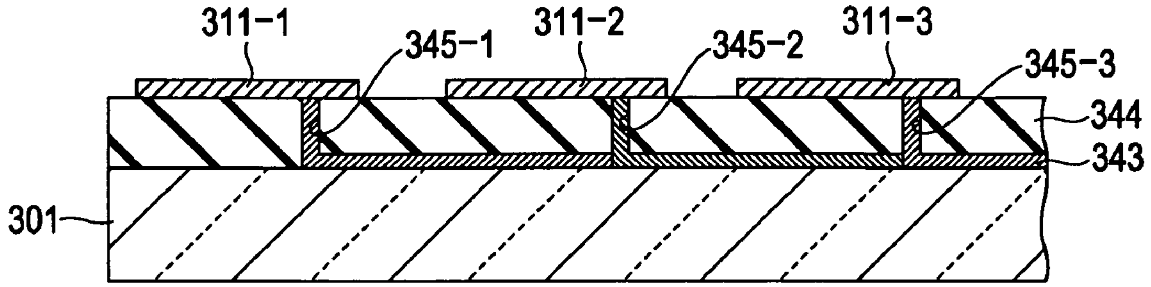
FIGS. 24A and 24B are diagrams illustrating a configuration example of wiring lines and electrode pads.
Figure 24B:
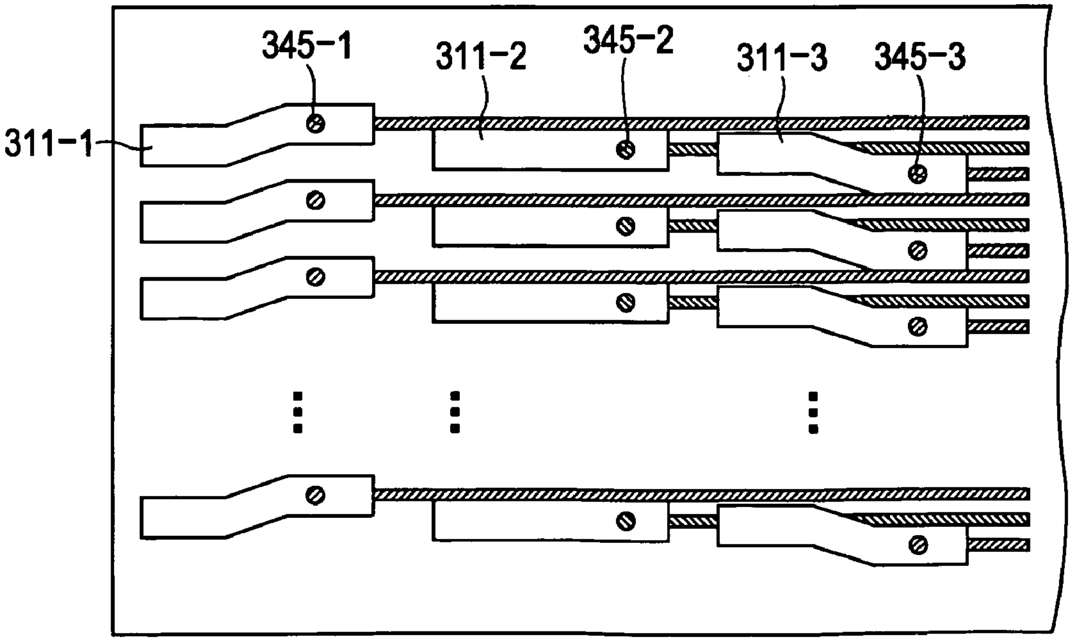

FIG. 24A is a cross-sectional view in a case wherein the connection portion 321 according to a second example of the configuration of the electrode pads 311 is cut away in the thickness direction of the glass substrate 301, and also in the direction in parallel with the wiring direction of the wiring line connected to the electrode pads 311 of the connection portion 321, and FIG. 24B is a plan transparency view illustrating the lower layer wiring lines 343 by transmitting the insulating layer 344 of the connection portion 321 according to the second example of the configuration of the electrode pads 311 as viewed from the side where the insulating layer 344 is applied to the glass substrate 301. For example, in a case wherein the lower layer wiring lines 343 are formed in a linear shape, the positions of the vias 345 are disposed according to the position of the lower layer wiring lines 343 disposed in a linear shape, the electrode pads 311 are each provided widely, and are disposed such that at least a part thereof are identical to each of the corresponding electrode pad arrays 331 in the vertical direction.

As shown in FIGS. 23B and 24B, in a case wherein the electrode pads 311 are disposed such that at least a part of thereof are identical to each of the electrode pad arrays 331 in the vertical direction, mounting of parts, and so forth are facilitated in the case of connecting externally using a later-described flat cable or the like.

Also, one layer configuration generally called as a zigzag pad may be employed instead of the above-mentioned two layer configuration wiring method. In this case, the portions other than the electrode pads 311 need to be covered with an insulating layer 361 such as a cover lay, solder mask, or the like instead of providing the vias 345 in the insulating layer 344.

Figure 25A:
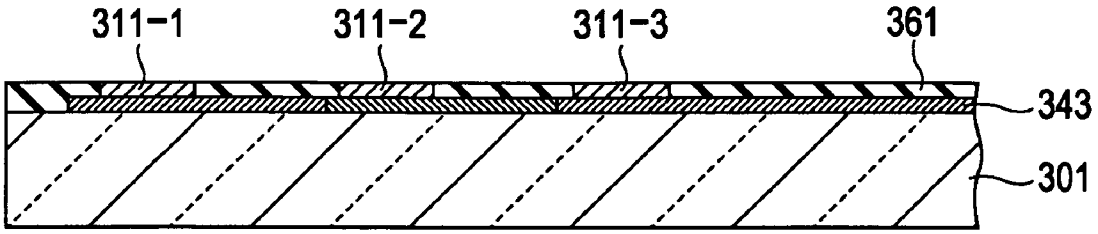
FIGS. 25A and 25B are diagrams illustrating a configuration example of wiring lines and electrode pads.
Figure 25B:
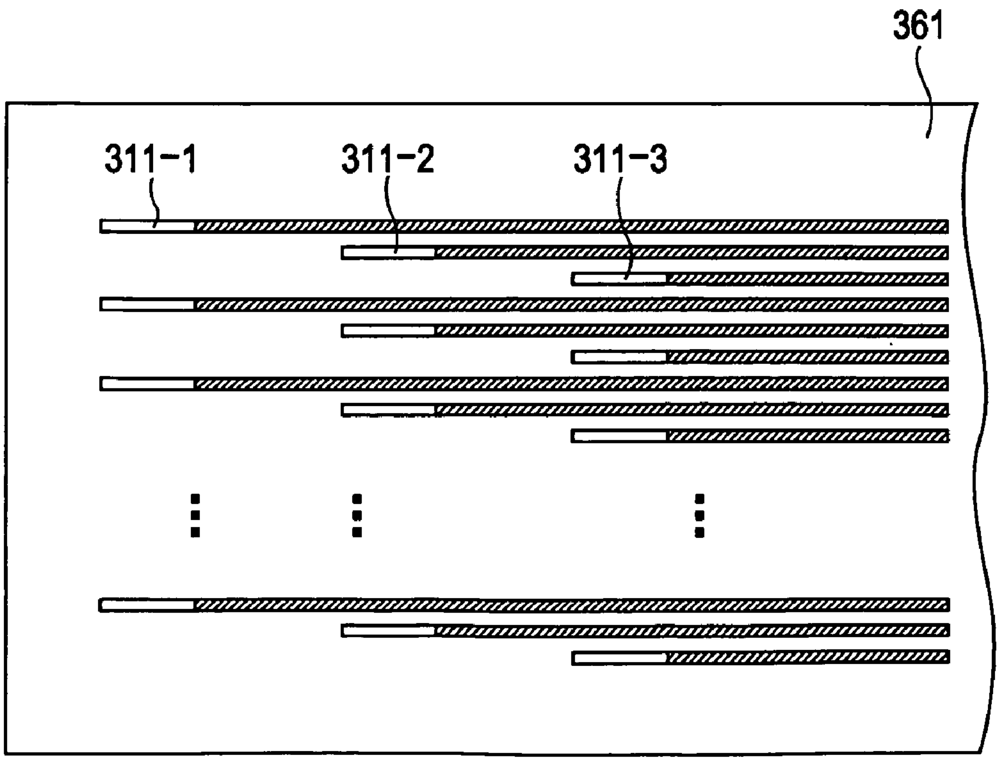

FIG. 25A is a cross-sectional view in a case wherein the connection portion 321 according to a third example of the configuration of the electrode pads 311 is cut away in the thickness direction of the glass substrate 301, and also in the direction in parallel with the wiring direction of the wiring line connected to the electrode pads 311 of the connection portion 321, and FIG. 25B is a plan transparency view illustrating the lower layer wiring lines 343 by transmitting the insulating layer 361 of the connection portion 321 according to the third example of the configuration of the electrode pads 311 as viewed from the side where the insulating layer 361 is applied to the glass substrate 301. In this case, the lower layer wiring lines 343 are formed in a linear shape, and the electrode pads 311 are also disposed on straight lines following the lower layer wiring lines 343, so the electrode pads 311 are not disposed on the same positions of each of the electrode pad arrays 331 in the vertical direction.

Note that a substrate made up of a resin may be employed instead of the glass substrate 301. Also, in a case wherein all of the data wiring lines are connected to one data driver for performing the same driving processing as that in the case of employing multiple data drivers instead of providing data drivers equivalent to the number of lines M to be driven simultaneously in parallel, data signals are not output simultaneously from all of the output terminals of the only data driver thereof, and different data signals are output from the 1/M output terminals of all the output terminals at M types of timing.

Even in such a case, as described above, each of the data wiring lines and the corresponding electrode pad 311 which are terminals for external connection are arrayed two-dimensionally so as to make up M rows, and if we say that N is an integer satisfying $0 \leqq N \leqq \{(\text{number of scan lines}-1)/M\}$, a is an integer satisfying $1 \leqq a \leqq M$, and the electrode pads 311 of the a'th array of the M arrays are connected to the emission elements 21 on the (MN+a)'th line, thereby facilitating external wiring design from the connection portion 321, design of a driving substrate on which a driving data driver (e.g., a data driver having all of the functions of #1 data driver 123, #2 data driver 124, or #3 data driver 125) or data driver is mounted, or design of software for controlling a data driver.

Thus, the electrode pads 311 are disposed two-dimensionally, whereby the distance between the electrode pads 311 can be ensured, an existing thermal compression bonding method can be applied to connection with an external driving circuit, positioning at the time of compression bonding and precise temperature control is eased comparatively, there is no need to provide special performance for the device, and funding cost is suppressed. Also, the unit throughput for connection is reduced, and workability is also improved.

Also, the corresponding electrode pad 311 are arrayed two-dimensionally so as to make up M rows, and if we say that N is an integer satisfying $0 \leqq N \leqq \{(\text{number of scan lines}-1)/M\}$, a is an integer satisfying $1 \leqq a \leqq M$, and the electrode pads 311 of the a'th array of the M arrays are connected to the emission elements 21 on the (MN+a)'th line, thereby facilitating external wiring design from the connection portion 321, design of a driving substrate on which a driving data driver or data driver is mounted, or design of software for controlling a data driver.

The electrode pads 311 provided on the tip portion of a data wiring line extracted to the outer circumference of the glass substrate 301 are connected to the TAB substrate such as a flexible printed circuit substrate by compression bonding, and are connected to each driver (e.g., #1 data driver 123, #2 data driver 124, and #3 data driver 125), which is an external driving circuit, through those.

Figure 26:
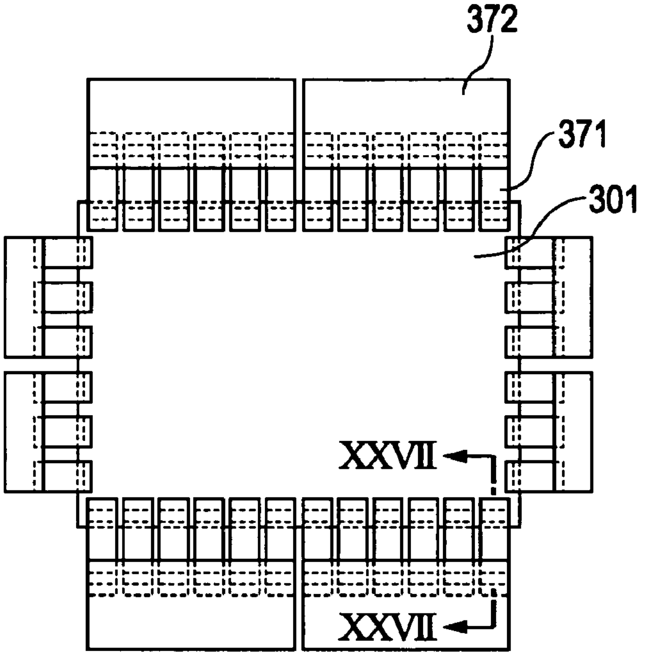
FIG. 26 is a diagram for describing connection between a glass substrate and drive substrates.

For example, as shown in FIG. 26, the glass substrate 301, and multiple drive substrates 372 where a driver is mounted are connected with multiple flexible printed circuit substrates 371. As described above, a connection portion 321 is provided on the periphery of the edge portion of the glass substrate 301, and on at least a part thereof the electrode pads 311 are arrayed two-dimensionally.

Also, of the flexible printed circuit substrates 371 the edge portions on the opposite side of the glass substrate 301 are connected to the drive substrates 372, for example, through AFC compression bonding or a connector. As for the flexible printed circuit substrates 371, there may be employed a both-face FPC wherein a metal layer such as Cu or the like is provided on both faces of a substrate such as polyimide (PI) or the like, or a single-face FPC wherein a metal layer such as Cu or the like is provided on only single face of a substrate such as polyimide (PI) or the like.

Description will be made with reference to FIGS. 27 through 29 regarding an example of a connection method between the glass substrate 301 and drive substrates 372 at a place where the electrode pad arrays 331 are provided on the multiple glass substrates 301, for example, like the place indicated with XXVII in FIG. 26.

Description will be made with reference to FIG. 27 regarding a first example of the connection method between the glass substrate 301 and drive substrate 372.

In the case of employing a both-face FPC as the flexible printed circuit substrate 371, the connection face with the flexible printed circuit substrate 371 can be reversed depending on whether to connect to the glass substrate 301 or drive substrate 372. When embedding a panel module configured of the glass substrate 301, drive substrate 372, and flexible printed circuit substrate 371 in the display device 101 or 201 as a set, the intermediate portion of the flexible printed circuit substrate 371 is frequently folded back around 90 or 180 degrees to reduce the thickness of the display device 101 or 201, so in the case of employing the connection method shown in FIG. 27, consequently, the connection face between the drive substrate 372 and flexible printed circuit substrate 371 can be directed to the set rear face, or set side face outer side, thereby providing an advantage from the perspective of maintenance.

Figure 27:
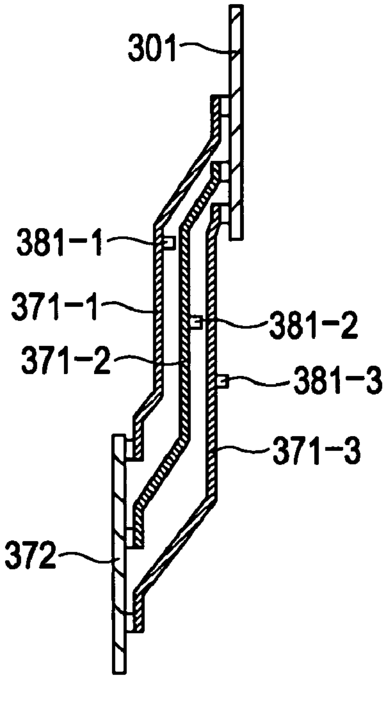
FIG. 27 is a diagram for describing a connection example of flexible printed substrates.

Also, in FIG. 27, with both of the glass substrate 301 and drive substrate 372, connection with the flexible printed circuit substrate 371 is performed using AFC compression bonding.

An ACF compression bonding method is basically the same technique as with the related art, but in the case of connection shown in FIG. 27, compression bonding is performed from the electrode pad arrays 331 on the outer circumferential side of the glass substrate 301 in order (in the order of the flexible printed circuit substrates 371-3, 371-2, and 371-1 in the case of FIG. 27), thereby facilitating fabrication, which is more desirable. In the case of repair or the like, it is desirable to perform ACF compression bonding of the electrode pad array 331 to be connected while tipping up and holding the flexible printed circuit substrate 371 already connected to the electrode pad array 331 on the side inner than the electrode pad array 331 to be connected. Note however, in a case wherein an ACF compression bonding facility does not have such a mechanism, an arrangement may be made wherein the flexible printed circuit substrate 371 already connected to the electrode pad array 331 on the inner side is stripped off, and connection is performed again from the electrode pad array 331 on the outer circumferential side of the glass substrate 301.

Also, a part of the circuits included in each driver (e.g., #1 data driver 123, #2 data driver 124, and #3 data driver 125) which is an external driving circuit may be mounted on the flexible printed circuit substrate 371. Here, driver ICs 381-1 through 381-3 are mounted on the flexible printed circuit substrates 371-1 through 371-3, respectively. Also, it goes without saying that there is no need to mount a component on the flexible printed circuit substrate 371.

Next, description will be made with reference to FIGS. 28A through 28C regarding second through fourth examples of the connection method between the glass substrate 301 and drive substrate 372.

Figure 28A:
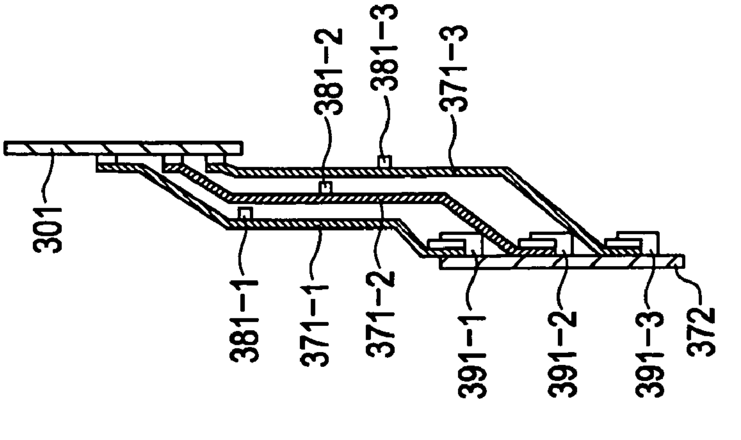
FIGS. 28A through 28C are diagrams for describing a connection example of flexible printed substrates.

FIG. 28A illustrates the second example of the connection method. In FIG. 28A, the connection between the glass substrate 301 and drive substrate 372 is performed with ACF compression bonding, and the connection between the drive substrate 372 and flexible printed circuit substrate 371 is performed with connectors 391-1 through 391-3. In FIG. 28A as well, in the case of employing a both-face FPC as the flexible printed circuit substrate 371, the connection face between the drive substrate 372 and flexible printed circuit substrate 371 can be directed to the set rear face or set side face outer side, and accordingly, the same advantage as that in the case of FIG. 27 can be provided in that there is provided an advantage from the perspective of maintenance. Also, as a part of the circuits included in each driver which is an external driving circuit, the driver ICs 381-1 through 381-3 are mounted on the flexible printed circuit substrates 371-1 through 371-3, respectively.

Figure 28B:
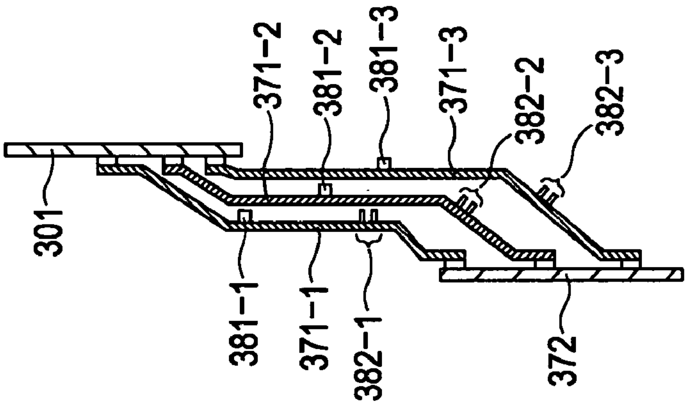

FIG. 28B illustrates the third example of the connection method. In FIG. 28B, with both of the glass substrate 301 and drive substrate 372, connection with the flexible printed circuit substrate 371 is performed with ACF compression bonding. In FIG. 28B as well, in the case of employing a both-face FPC as the flexible printed circuit substrate 371, the connection face between the drive substrate 372 and flexible printed circuit substrate 371 can be directed to the set rear face or set side face outer side, and accordingly, the same advantage as that in the case of FIG. 27 can be provided in that there is provided an advantage from the perspective of maintenance. Also, as a part of the circuits included in each driver which is an external driving circuit, the driver ICs 381-1 through 381-3 and LCR circuits (circuits configured of a resistor, coil, and capacitor) 382-1 through 382-3 are mounted on the flexible printed circuit substrates 371-1 through 371-3, respectively.

Figure 28C:
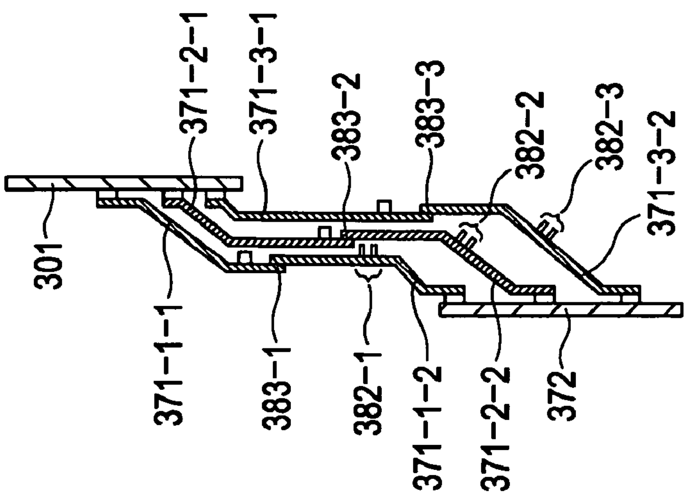

FIG. 28C illustrates the fourth example of the connection method. In FIG. 28C, the glass substrate 301 and drive substrate 372 are connected with the two flexible printed circuit substrates 371 already connected. Specifically, a flexible printed circuit substrate 371-1-1 connected to the glass substrate 301 with ACF compression bonding is connected to a flexible printed circuit substrate 371-1-2 at a substrate connection portion 383-1 with AFC compression bonding, and the flexible printed circuit substrate 371-1-2 is connected to the driver substrate 372 with ACF compression bonding. Subsequently, a flexible printed circuit substrate 371-2-1 connected to the glass substrate 301 with ACF compression bonding is connected to a flexible printed circuit substrate 371-2-2 at a substrate connection portion 383-2 with AFC compression bonding, and the flexible printed circuit substrate 371-2-2 is connected to the driver substrate 372 with ACF compression bonding. Subsequently, a flexible printed circuit substrate 371-3-1 connected to the glass substrate 301 with ACF compression bonding is connected to a flexible printed circuit substrate 371-3-2 at a substrate connection portion 383-3 with AFC compression bonding, and the flexible printed circuit substrate 371-3-2 is connected to the driver substrate 372 with ACF compression bonding.

Also, in FIG. 28C as well, in the case of employing a both-face FPC as the flexible printed circuit substrate 371, the connection face between the drive substrate 372 and flexible printed circuit substrate 371 can be directed to the set rear face or set side face outer side, and accordingly, the same advantage as that in the case of FIG. 27 can be provided in that there is provided an advantage from the perspective of maintenance. Also, as a part of the circuits included in each driver which is an external driving circuit, the driver ICs 381-1 through 381-3 and LCR circuits 382-1 through 382-3 are mounted on the flexible printed circuit substrates 371-1 through 371-3, respectively. The driver ICs 381-1 through 381-3 and LCR circuits 382-1 through 382-3 may be mounted on any one of the two flexible printed circuit substrates 371 connected with a substrate connection portion.

Next, description will be made with reference to FIGS. 29A and 29B regarding fifth and sixth examples of the connection method between the glass substrate 301 and drive substrate 372.

Figure 29A:
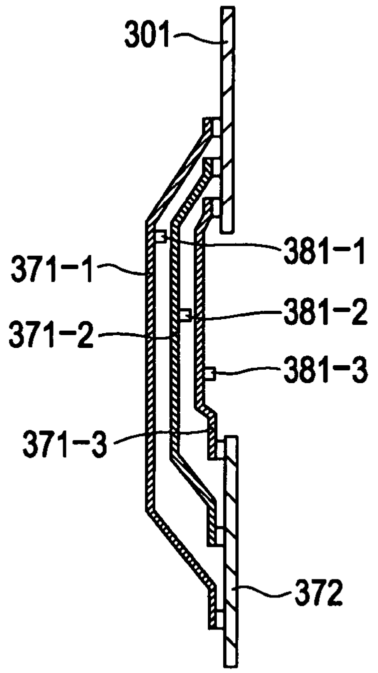
FIGS. 29A and 29B are diagrams for describing a connection example of flexible printed substrates.

FIG. 29A illustrates the fifth example of the connection method. In FIG. 29A, with both of the glass substrate 301 and drive substrate 372, connection to the flexible printed circuit substrate 371 is performed with ACF compression bonding, and a single-face FPC is employed as the flexible printed circuit substrate 371. That is to say, with the flexible printed circuit substrate 371 which is a single-face FPC, wiring can be performed only on the connection face between the glass substrate 301 and drive substrate 372. Accordingly, this method is disadvantageous in a maintenance aspect, but on the other hand is advantageous in a cost aspect, and further, the connection face is a single side, thereby facilitating management at the time of manufacturing. In FIG. 29A as well, as a part of the circuits included in each driver which is an external driving circuit, the driver ICs 381-1 through 381-3 are mounted on the flexible printed circuit substrates 371-1 through 371-3, respectively.

Figure 29B:
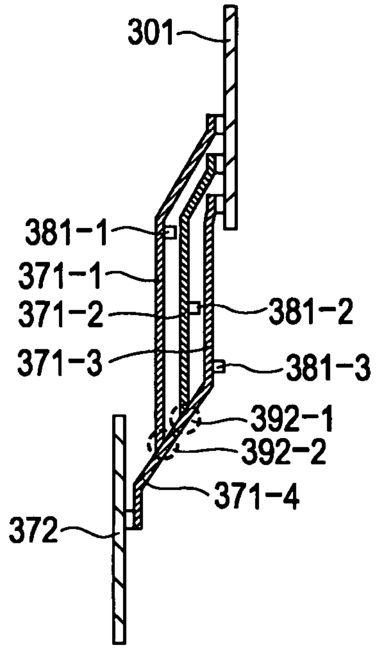

FIG. 29B illustrates the sixth example of the connection method. In FIG. 29B, the flexible printed circuit substrate 371 connected to the electrode pad array 331 is not connected to the drive substrate 372 one on one, but is connected to the driver substrate 372 after the wiring lines are integrated using an FPC having a branched configuration as the flexible printed circuit substrate 371. The FPC having a branched configuration may be made up of multiple FPCs being connected with ACF compression bonding.

That is to say, a flexible printed circuit substrate 371-1 connected to the electrode pad array 331 on the innermost side of the glass substrate 301 with ACF compression bonding, and a flexible printed circuit substrate 371-2 connected to the electrode pad array 331 on the second inner side of the glass substrate 301 with ACF compression bonding are connected to a flexible printed circuit substrate 371-3 connected to the electrode pad array 331 on the outermost side of the glass substrate 301 with ACF compression bonding at substrate connection portions 392-1 and 392-2 with ACF compression bonding, and the flexible printed circuit substrate 371-3 is connected to the driver substrate 372 with ACF compression bonding.

Note that in the case of FIG. 29B, when a both-face FPC is employed as the flexible printed circuit substrate 371-3, even if the flexible printed circuit substrates 371-1 and 371-2 are single-face FPCs, the connection face with the flexible printed circuit substrate 371-3 can be reversed depending on whether to connect to the glass substrate 301 or drive substrate 372. Thus, the connection face between the drive substrate 372 and flexible printed circuit substrate 371-3 can be directed to the set rear face or set side face outer side, and accordingly, thereby providing an advantage from the perspective of maintenance. In the case of FIG. 29B, the area of the drive substrate 372 can be reduced, and assembly man-hours can be reduced.

Note that even if the shape of the electrode pads are another shape such as a square, circle, semisphere, or sphere, even if the layout of the electrode pads is not a linear layout (layout so as to configure the electrode pad array 331) but a rounded layout, however the number of pads making up the electrode pad array is, or however the number of pad arrays is, the glass substrate 301 and drive substrate 372 can be connected in the same way.

Also, it goes without saying that each connection method may be a connection method other than ACF, for example, such as NCP (Non-Conductive Paste), eutectic bonding, or the like. Also, with regard to each of the above-mentioned connections, in the case of research-and-development use, or in the case of putting emphasis on maintenance features, or the like, each of the glass substrate 301, flexible printed circuit substrate 371, and drive substrate 372 can be made detachable by employing the above-mentioned connectors, clips using a spring, or the like, in addition to connection being fixed semipermanently with ACF compression bonding or the like.

Note that, with a display device employing not the simple matrix method but active matrix method as well, there is a tendency wherein in order to improve display image quality, the number of pixels is increased, i.e., pixel pitches are reduced, and accordingly, in the same way as with the above-mentioned case, the number of terminals (electrode pads 311) per unit area provided on a substrate edge portion is apt to increase. Accordingly, with the display device employing the active matrix method as well, as described with reference to FIG. 21, the terminals are arrayed in the two-dimensional direction, whereby the distance between the terminals can be ensured, inter-electrode leakage can be suppressed, and also, for example, connection employing ACF can be performed.

Further, in the case of employing LCD as the emission elements 21, in order to improve view angle characteristic (characteristic wherein brightness and chromaticity change depending on a screen view angle), a pixel configuration wherein each sub pixel is divided into two is employed in some cases. In this case as well, the number of terminals per unit area provided on a substrate edge portion is apt to increase. In such a case, the terminals are arrayed in the two-dimensional direction, whereby the distance between the terminals can be ensured, inter-electrode leakage can be suppressed, and also, for example, connection employing ACF can be performed.

Note that the respective steps according to the present Specification include not only processing performed in time sequence in accordance with the described sequence but also processing not necessarily performed in time sequence but performed in parallel or individually.

Also, with the present Specification, the term "system" represents the entirety of equipment configured of multiple devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display device for displaying an image using matrix driving, comprising:

emission means corresponding to each pixel to be displayed, disposed on L lines, with the scanning direction as lines;

display means whereby a subset of the L lines worth of said emission means are simultaneously driven; and connection means for externally connecting on-substrate wiring lines extracted from each of said emission means of said display means;

wherein said connection means include connection terminals for connecting each of said on-substrate wiring lines externally, and at least a part of said connection terminals are arranged two-dimensionally so as to make up a plurality of M columns with a plurality of X rows in each column;

wherein the X rows are arranged in a direction orthogonal to the on-substrate wiring lines;

wherein with N as an integer which is $0 \leqq N \leqq \{(\text{number of scanning lines}-1)/X\}$ and a as an integer of $1<a\leqq X$, said connection terminals included in the a'th row of the X rows worth of said connection terminals are connected to said emission means on the (XN+a)'th line of the L lines, and wherein each of the M columns worth of said connection terminals is connected with said on-substrate wiring lines.

2. The display device according to claim 1, wherein said emission means provided on the same line are connected to said connection terminals on the same row of the X rows worth of said connection terminals.

3. The display device according to claim 1, further comprising:

scanning driving means configured to scan and drive said emission means; and

X rows worth of data signal driving means configured to drive said emission means to be scanned and driven by said scanning driving means to display a predetermined image;

wherein said connection terminals on the same row of the X rows worth of said connection terminals are connected to said same data signal driving means of said X rows worth of data signal driving means.

4. The display device according to claim 1, wherein said connection means are connected to a plurality of TAB substrates;

and wherein a single TAB substrate is connected to said connection terminals on the same row of the X rows worth of said connection terminals.

5. A wiring routing method of a display device for displaying an image using matrix driving, said method comprising:

arranging emission means corresponding to each pixel to be displayed by a display means, wherein the emission means are disposed on L lines, with the scanning direction as lines, and a subset of the L lines worth of said emission means are simultaneously driven; and connecting on-substrate wiring lines extracted from each of said emission means to connection means;

wherein said connection means include connection terminals for connecting each of said on-substrate wiring lines externally, and at least a part of said connection terminals are arrayed two-dimensionally so as to make up a plurality of M columns with a plurality of X rows in each column;

wherein the X rows are arranged in a direction orthogonal to the on-substrate wiring lines;

wherein with N as an integer which is $0 \leqq N \leqq \{(\text{number of scanning lines}-1)/X\}$ and a as an integer of $1<a\leqq X$, said connection terminals included in the a'th row of the X rows worth of said connection terminals are connected to said emission means on the (XN+a)'th line of the L lines, and wherein each of the M columns worth of said connection terminals is connected with said on-substrate wiring lines.

6. A display device for displaying an image using matrix driving, comprising:

emission means corresponding to each pixel to be displayed, disposed on L lines, with the scanning direction as lines;

display means whereby a subset of the L lines worth of said emission means are simultaneously driven; and connection means for externally connecting on-substrate wiring lines extracted from each of said emission means of said display means;

wherein said connection means include connection terminals for connecting each of said on-substrate wiring lines externally, and at least a part of said connection terminals are arrayed two-dimensionally so as to make up a plurality of M columns with a plurality of X rows in each column;

wherein the X rows are arranged in a direction orthogonal to the on-substrate wiring lines; and wherein said emission means provided on the same line are connected to said connection terminals on the same row of the X rows worth of said connection terminals, and wherein with N as an integer which is 0≦N≦{(number of scanning lines−1)/X} and a as an integer of 1<a≦X, said connection terminals included in the a'th row of the X rows worth of said connection terminals are connected to said emission means on the (XN+a)'th line of the L lines.

7. The display device according to claim 6, further comprising:

scanning driving means configured to scan and drive said emission means; and

X rows worth of data signal driving means configured to drive said emission means to be scanned and driven by said scanning driving means to display a predetermined image;

wherein said connection terminals on the same row of the X rows worth of said connection terminals are connected to said same data signal driving means of said X rows worth of data signal driving means.

8. The display device according to claim 6, wherein said connection means are connected to a plurality of TAB substrates;

and wherein a single TAB substrate is connected to said connection terminals on the same row of the X rows worth of said connection terminals.

9. A wiring routing method of a display device for displaying an image using matrix driving, said method comprising:

arranging emission means corresponding to each pixel to be displayed within a display means, wherein the emission means are disposed on L lines, with the scanning direction as lines, and a subset of the L lines worth of said emission means are simultaneously driven; and connecting on-substrate wiring lines extracted from each of said emission means to connection means;

wherein said connection means include connection terminals for connecting each of said on-substrate wiring lines externally, and at least a part of said connection terminals are arrayed two-dimensionally so as to make up a plurality of M columns with a plurality of X rows in each column wherein the X rows are arranged in a direction orthogonal to the on-substrate wiring lines;

wherein with N as an integer which is 0≦N≦{(number of scanning lines−1)/X} and a as an integer of 1<a≦X, said connection terminals included in the a'th row of the X rows worth of said connection terminals are connected to said emission means on the (XN+a)'th line of the L lines, and wherein said emission means provided on the same line are connected to said connection terminals on the same row of the X rows worth of said connection terminals.

10. A display device for displaying an image using matrix driving, comprising:

at least one emission element corresponding to each pixel to be displayed, disposed on L lines, with the scanning direction as lines;

a display portion whereby a subset of the L lines worth of said emission elements are simultaneously driven; and at least one connection unit for externally connecting on-substrate wiring lines, wherein each said on-substrate wiring line is extracted from each said emission element of said display portion;

wherein said connection units include connection terminals for connecting each of said on-substrate wiring lines externally, and at least a part of said connection terminals are arrayed two-dimensionally so as to make up a plurality of M columns with a plurality of X rows in each column;

wherein the X rows are arranged in a direction orthogonal to the on-substrate wiring lines;

wherein with N as an integer which is 0≦N≦{(number of scanning lines−1)/X} and a as an integer of 1<a≦X, said connection terminals included in the a'th row of the X rows worth of said connection terminals are connected to said emission elements on the (XN+a)'th line of the L lines, and wherein each of the M columns worth of said connection terminals is connected with said on-substrate wiring lines.

11. A wiring routing method of a display device for displaying an image using matrix driving, said method comprising:

arranging at least one emission element corresponding to each pixel to be displayed within a display portion, wherein said emission elements are disposed on L lines, with the scanning direction as lines, and a subset of the L lines worth of said emission elements are simultaneously driven; and connecting on-substrate wiring lines to at least one connection unit, wherein each said on-substrate wiring line is extracted from each of said emission element;

wherein said connection units include connection terminals for connecting each of said on-substrate wiring lines externally, and at least a part of said connection terminals are arrayed two-dimensionally so as to make up a plurality of M columns with a plurality of X rows in each column wherein the X rows are arranged in a direction orthogonal to the on-substrate wiring lines;

wherein with N as an integer which is 0≦N≦{(number of scanning lines−1)/X} and a as an integer of 1<a≦X, said connection terminals included in the a'th row of the X rows worth of said connection terminals are connected to said emission elements on the (XN+a)'th line of the L lines, and wherein each of the M columns worth of said connection terminals is connected with said on-substrate wiring lines.

12. A display device for displaying an image using matrix driving, comprising:

at least one emission element corresponding to each pixel to be displayed, disposed on L lines, with the scanning direction as lines;

a display portion whereby a subset of the L lines worth of said emission elements are simultaneously driven; and at least one connection unit for externally connecting on-substrate wiring lines, wherein each said on-substrate wiring line is extracted from each said emission element of said display portion;

wherein said connection units include connection terminals for connecting each of said on-substrate wiring lines externally, and at least a part of said connection terminals are arrayed two-dimensionally so as to make up a plurality of M columns with a plurality of X rows in each column;

wherein the X rows are arranged in a direction orthogonal to the on-substrate wiring lines;

wherein with N as an integer which is $0 \leqq N \leqq \{(\text{number of scanning lines}-1)/X\}$ and a as an integer of $1<a \leqq X$, said connection terminals included in the a'th row of the X rows worth of said connection terminals are connected to said emission elements on the (XN+a)'th line of the L lines, and wherein said emission elements provided on the same line are connected to said connection terminals on the same row of the X rows worth of said connection terminals.

13. A wiring routing method of a display device for displaying an image using matrix driving, said method comprising:

arranging at least one emission element corresponding to each pixel to be displayed within a display portion, wherein said emission elements are disposed on L lines, with the scanning direction as lines, and a subset of the L lines worth of said emission elements are simultaneously driven; and connecting on-substrate wiring lines to at least one connection unit, wherein each said on-substrate wiring line is extracted from each said emission element;

wherein said connection units include connection terminals for connecting each of said on-substrate wiring lines externally, and at least a part of said connection terminals are arrayed two-dimensionally so as to make up a plurality of M columns with a plurality of X rows in each column wherein the X rows are arranged in a direction orthogonal to the on-substrate wiring lines;

wherein with N as an integer which is $0 \leqq N \leqq \{(\text{number of scanning lines}-1)/X\}$ and a as an integer of $1<a \leqq X$, said connection terminals included in the a'th row of the X rows worth of said connection terminals are connected to said emission means on the (XN+a)'th line of the L lines, and wherein said emission elements provided on the same line are connected to said connection terminals on the same row of the X rows worth of said connection terminals.

* * * * *